United States Patent
Kubo

(10) Patent No.: US 9,436,027 B2
(45) Date of Patent: Sep. 6, 2016

(54) DISPLAY DEVICE AND TELEVISION RECEIVER DEVICE

(71) Applicant: Sharp Kabushiki Kaisha, Osaka (JP)

(72) Inventor: Katsuhiro Kubo, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/427,569

(22) PCT Filed: Sep. 13, 2013

(86) PCT No.: PCT/JP2013/074807
§ 371 (c)(1),
(2) Date: Mar. 11, 2015

(87) PCT Pub. No.: WO2014/046026
PCT Pub. Date: Mar. 27, 2014

(65) Prior Publication Data
US 2015/0248035 A1    Sep. 3, 2015

(30) Foreign Application Priority Data

Sep. 20, 2012 (JP) ................. 2012-206931

(51) Int. Cl.
*G02F 1/1333* (2006.01)
*H04N 5/44* (2011.01)
*H04N 5/64* (2006.01)

(52) U.S. Cl.
CPC .......... *G02F 1/133308* (2013.01); *H04N 5/44* (2013.01); *H04N 5/64* (2013.01); *G02F 2001/13332* (2013.01); *G02F 2001/133317* (2013.01); *G02F 2001/133322* (2013.01); *G02F 2001/133328* (2013.01)

(58) Field of Classification Search
CPC .............. G02F 1/133308; G02F 2001/133328
USPC ........................................................ 349/58
See application file for complete search history.

(56) References Cited

U.S. PATENT DOCUMENTS

| | | | | |
|---|---|---|---|---|
| 2003/0098840 A1* | 5/2003 | Nagatani | ........... | G02F 1/133604 345/102 |
| 2008/0074349 A1* | 3/2008 | Hong | ................. | G02F 1/133308 345/55 |
| 2008/0192168 A1* | 8/2008 | Sudo | ................. | G02F 1/133308 349/58 |
| 2008/0297681 A1* | 12/2008 | Yang | ................. | G02F 1/133308 349/58 |
| 2010/0142128 A1* | 6/2010 | Takechi | ............ | G02F 1/133308 361/679.01 |
| 2011/0317400 A1* | 12/2011 | Chen | .................... | G02B 6/0088 362/97.1 |
| 2013/0114005 A1* | 5/2013 | Suzuki | ...................... | F21V 7/00 348/836 |
| 2013/0128506 A1* | 5/2013 | Huang | ................. | G02B 6/0086 362/97.1 |
| 2014/0063698 A1* | 3/2014 | Huang | .............. | G02F 1/133308 361/679.01 |

FOREIGN PATENT DOCUMENTS

| | | | | |
|---|---|---|---|---|
| JP | 2006-235124 | * | 9/2006 | ........... G02F 1/1333 |
| JP | 2006-235124 A | | 9/2006 | |

* cited by examiner

*Primary Examiner* — Sang V Nguyen
(74) *Attorney, Agent, or Firm* — Chen Yoshimura LLP

(57) ABSTRACT

A display device is provided with an LED; a rectangular liquid crystal panel that uses light from the LED for display; a bezel; and a frame. The bezel forms a rectangular frame following along the outer peripheral edges of the liquid crystal panel, and is configured such that a length thereof in a first direction is variable, or lengths thereof in a first direction and a second direction are variable. The frame forms a rectangular frame following along the outer peripheral edges of the liquid crystal panel, and together with the bezel clamps the outer peripheral edges of the liquid crystal panel.

10 Claims, 44 Drawing Sheets

DISPLAY DEVICE AND TELEVISION RECEIVER DEVICE

TECHNICAL FIELD

The present invention relates to a display device and a television receiver.

BACKGROUND ART

The display elements provided in display devices including television receivers have been transitioning from the traditional cathode ray tube to thin display panels such as liquid crystal panels and plasma display panels, allowing the display panel to become thinner. Configurations such as those described in Patent Document 1 are known for holding such display panels. Patent Document 1 provides an example of a configuration where the outer peripheral edges of a display panel (liquid crystal panel) are clamped between a pair of frame members (panel fittings and panel holders).

RELATED ART DOCUMENT

Patent Document

Patent Document 1: Japanese Patent Application Laid-Open Publication No. 2006-235124

Problems to be Solved by the Invention

Incidentally, display panels of various sizes (contour dimensions) are provided in the above described display devices corresponding with differences in screen size (size of the display region), and the like. Note that the size of the display panel may change slightly due to the specification or method of producing the display panel even if the display region (active area) is the same size on the display panel.

The above described frame members clamp the outer peripheral edge of the display panel; therefore, the frame members must be a size corresponding to the size of the display panel. Thus, traditionally, frame members of different sizes had to be respectively manufactured to coincide with display panels of different sizes. As a result, the types of frame members increased, problematically increasing production costs. For instance, different kinds of molds must be produced when the frame members are manufactured using molds, and the cost increases for the amount of different kinds of frame members. The increase in the kinds of frame members is also undesirable in terms of managing the components.

SUMMARY OF THE INVENTION

Developed in light of the foregoing, the present invention proposes a display device provided with a frame member capable of suppressing an increase in the types of frame members needed while being adaptable to display panels of different sizes. The invention also proposes a television receiver equipped with such a display device.

Means for Solving the Problems

To address the above described defects, a display device according to the present invention includes: a light source; a display panel having a rectangular shape and using light from the light source for display; a first frame member having a rectangular frame-shape along peripheral edges of the display panel and configured such that a length thereof is variable in a first direction; a second frame member having a rectangular frame-shape along the peripheral edges of the display panel, the second frame member and the first frame member clamping the peripheral edges of the display panel therebetween.

In embodiments of the invention, the first frame member is configured to have a variable length in a first direction. Thus, a length of the first frame member may be varied to match the size of the display panel, so that the outer peripheral edges of a display panel may be clamped between the first frame member and the second frame member. In other words, there is no need to produce each size of a first frame member corresponding to each size of a display panel, and thus it is possible to suppress the actual increase in the types of first frame members.

In the above-mentioned configuration, the first frame member can be provided a pair of extension portions extending in the first direction and respectively forming sides of the first frame member, wherein the extension portions are configured to extend and retract in the first direction.

Further, extending and retracting the extension portions configuring first sides of the first frame member varies the length of the first frame member in the first direction.

Each of the extending portions can a first extending end portion including a first edge along the first direction; and a second extending end portion including a second edge along the first direction, the second extending end portion being attached so as to slide relative to the first extending end portion along the first direction.

Adopting such a configuration allows the extension portions of the first frame member to extend and retract by sliding a second extending end portion relative to a first extending end portion along the first direction.

The display device of the present invention can be further provided with a fixing screw for securing the second extending end portion to the first extending end portion; wherein the first extending end portion includes a first screw insertion hole formed therethrough and extending along the first direction, the first screw insertion hole being configured to receive the fixing screw, and wherein the second extending end portion includes a second screw insertion hole formed therethrough to which the fixing screw is configured to engage.

According to embodiments of the invention, the fixing screw may be inserted into the first screw insertion hole and attached to the second screw insertion hole to secure the second extending end portion to the first extending end portion. The first screw insertion hole extends along the first direction. Therefore, the location for attaching the fixing screw may be varied within the extension length of the first screw insertion hole. Thus, the length of the extending portion may be continuously varied by sliding the second extending end portion relative to the first extending end portion for the extension length of the first screw insertion hole.

The first frame member may be modularly configured from the pair of extension portions; and a pair of second extension portions extending in a second direction, and respectively configuring second sides of the first frame member. The adjacent extension portions and second extension portions are coupled at the corner sections of the first frame member.

Modular configuration of the first frame member from the pair of extension portions and the pair of second extension portions increases the ease of molding the first frame member compared to when the pair of extension portions and the pair of second extension portions are molded as a single piece. The modular configuration makes it easier to provide extension portions that can extend and retract along the first direction.

The first frame member may be configured to have a variable length in a second direction.

Thus, the display panel may be clamped between the first frame member and the second frame member even when the length of the display panel varies in the first direction and the second direction respectively.

The second frame member may be configured to have a variable length in a first direction.

When the size of the display panel varies, a length of the second frame member may be varied to match the change in the display panel size. Therefore, there is no need to produce each size of a second frame member corresponding to each size of a display panel, thereby reducing the costs associated with production.

The second frame member may be configured to have a variable length in a second direction.

The size of the first frame member and the second frame member may be respectively varied, even when the length of the display panel varies in the first direction and the second direction respectively, so that display panel may be clamped between the first frame member and the second frame member.

The first frame member may be a bezel disposed on a display surface side of the display panel, and the second frame member may be a frame disposed on a light source side of the display panel.

Moreover, a liquid crystal panel is an example of the display panel. As a liquid crystal display device, this kind of a display device may be adopted for various purposes such as a screen and the like for a mobile device, a television, or a personal computer, and the like.

Next, a television receiver according to embodiments of the present invention is provided with the above described display device to address the above described defects.

Effects of the Invention

The present invention proposes a display device provided with a frame member capable of suppressing an increase in the types of frame members needed while the frame member is adaptable to display panels of different sizes. The present invention also proposes a television receiver equipped with such a display device.

DETAILED DESCRIPTION OF EMBODIMENTS

Embodiment 1

Figure 2:
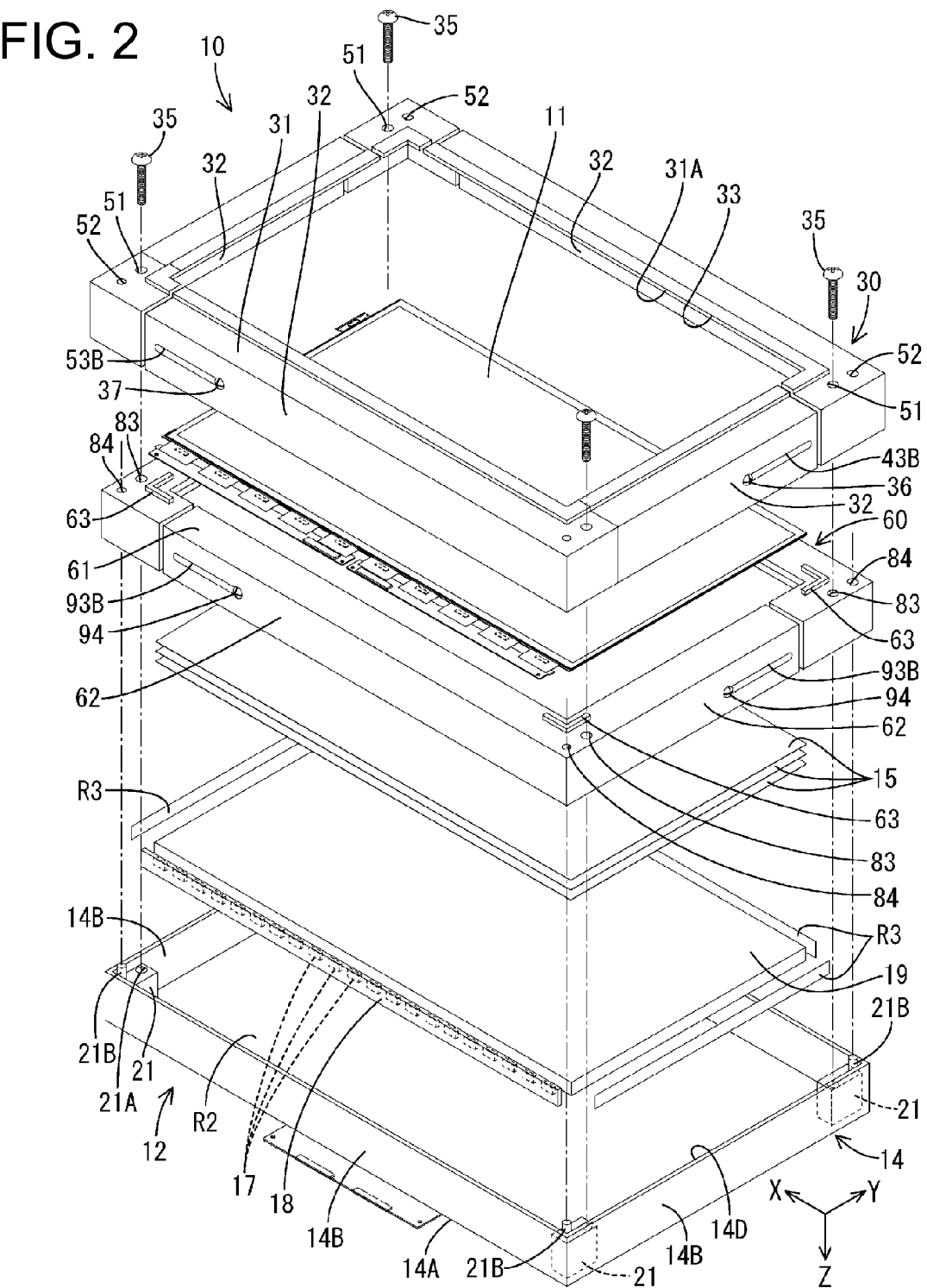
FIG. 2 is an exploded perspective view illustrating a schematic configuration of a liquid crystal display device provided in the television receiver illustrated in FIG. 1.
Figure 3:
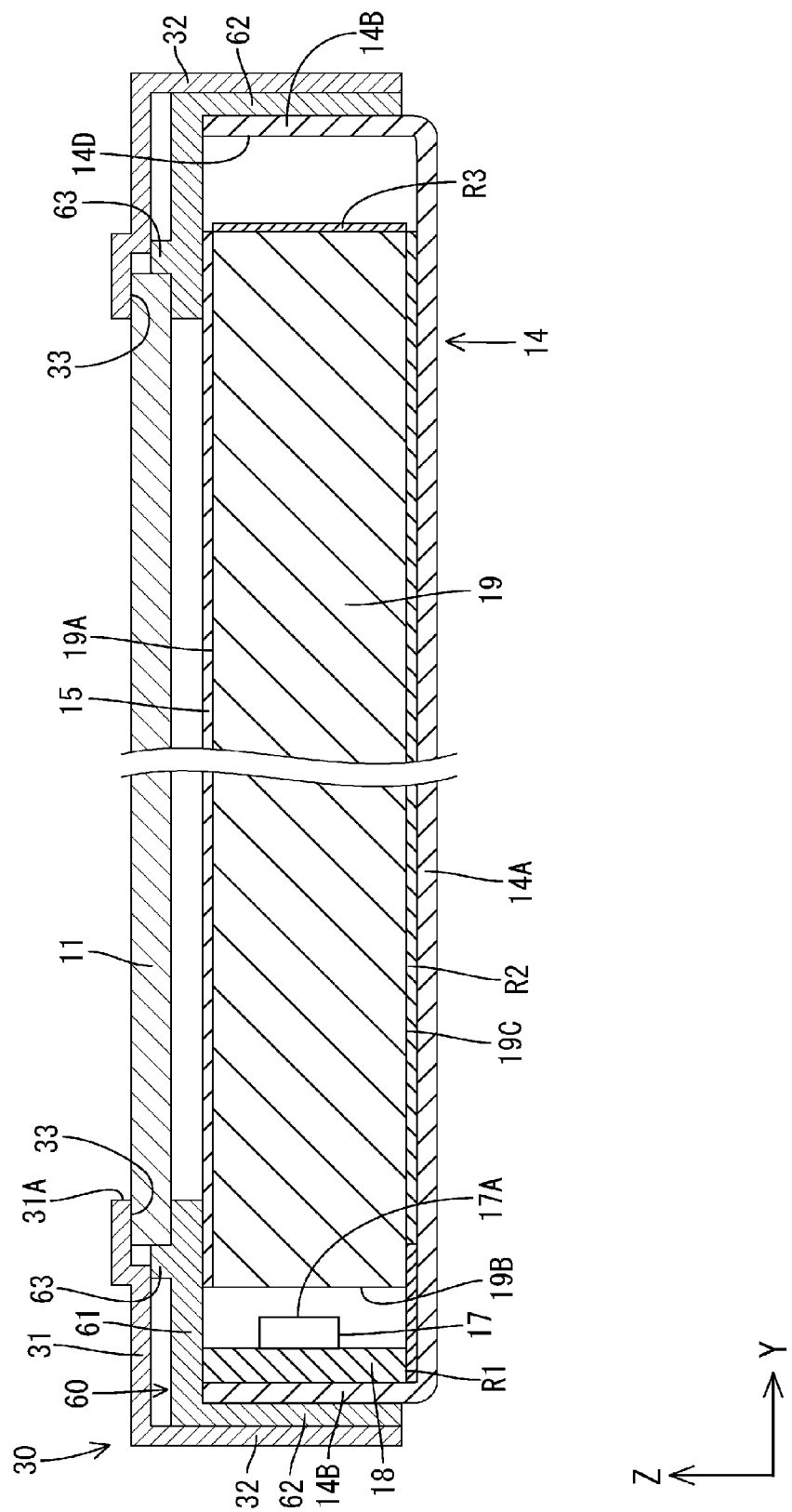
FIG. 3 is a cross-sectional view illustrating the configuration of a cross-section along the short side of the liquid crystal display device in FIG. 2 (corresponding to a view cut along the line A-A in FIG. 7)

Embodiment 1 of the present invention is described using FIGS. 1 to 19. An example is given of a liquid crystal display device 10 in the present embodiment. Note that the X-, Y-, and Z-axes are illustrated on a portion of each drawing; each axis direction corresponds to the direction depicted in each drawing. Additionally, the upper part illustrated in FIG. 3 is taken as the front side, and the lower part illustrated in FIG. 3 is taken as the rear side.

Figure 1:
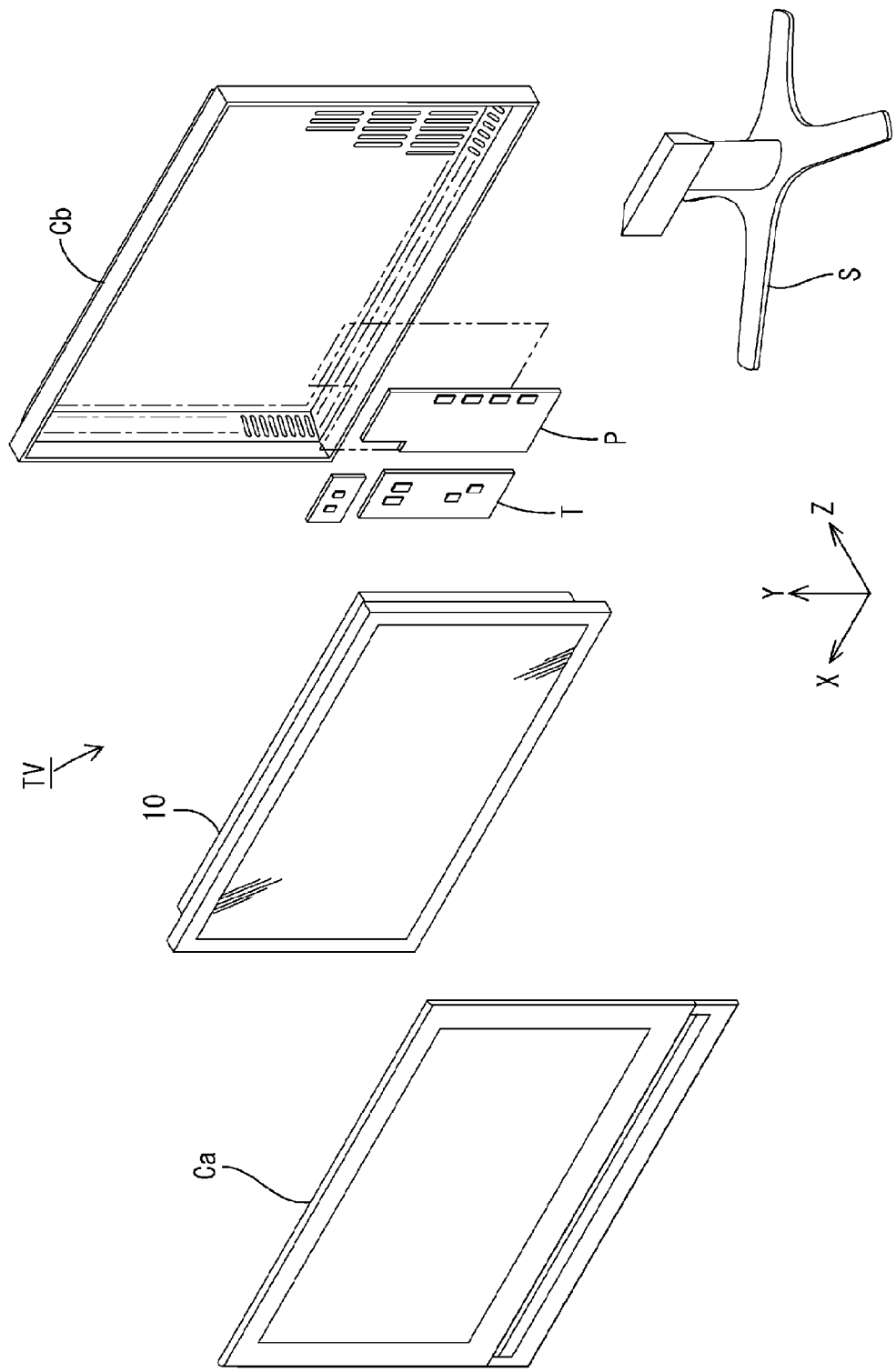
FIG. 1 is an exploded perspective view illustrating a schematic configuration of a television receiver according to Embodiment 1 of the present invention.

As illustrated in FIG. 1, a television receiver TV according to the present embodiment is provided with a liquid crystal display device 10, front and rear cabinets Ca and Cb that clamp and house the aforementioned liquid crystal display device 10, a power supply P, a tuner T, and a stand S.

The liquid crystal display device 10 (display device) is in general an oblong (lengthwise) square shape (rectangle), and is housed standing upright. As illustrated in FIG. 2, the liquid crystal display device 10 is provided with a liquid crystal panel 11 which is the display panel, and a backlight device 12 which is the external light source (illumination device).

The liquid crystal panel 11 is configured to use light from the backlight device 12 (the LEDs 17) for display. The outer peripheral edges of liquid crystal panel 11 are clamped between the bezel 30 and the frame 60 and thereby the liquid crystal panel 11 is held together with the backlight device 12.

The liquid crystal panel 11 is configured by a pair of transparent (highly transparent) glass substrates adhered together with a prescribed gap therebetween, and a liquid crystal layer (not shown) encapsulated between the glass substrates. One of the glass substrates is provided with switching elements (such as TFTs), pixel electrodes, an alignment film, and the like. The switching elements connect mutually orthogonal source wiring and gate wiring, with the pixel electrodes connected to the switching elements. The other of the glass substrates is provided with a color filter or an opposite electrode, an alignment film, and the like. The color filter has colored portions of red (R), green (G), blue (B), and the like arranged in a prescribed sequence thereon. Furthermore, a driving circuit substrate (not shown) supplies the source wiring, the gate wiring, and the opposite electrode with image data or various control signals required for displaying an image. Note that, a polarizing plate (not shown) is arranged on the outside of both glass substrates.

Next, the backlight device 12 is described in detail. As illustrated in FIG. 2, the backlight device 12 is provided with a chassis 14, and an optical component 15. The substantially box-shaped chassis 14 includes light emitting portions 14D opened in the front side thereof, namely, the side near the light emitting surface of the backlight device 12 (near the liquid crystal panel 11). The optical component 15 is arranged over the light emitting portions 14D of the chassis 14.

An LED substrate 18 (light source substrate), and a light guide plate 19 are housed within the chassis 14. The light emitting diodes (LEDs 17) are mounted on the LED substrate 18 and act as a light source. Light from the LEDs 17 is introduced in the light guide plate 19 and the light guide plate 19 directs the light towards the optical element 15 (toward the liquid crystal panel 11, the light emitting side).

The LED substrate 18 including the LEDs 17 is arranged on one end portion of the long side of the backlight device 12. The plurality of LEDs 17 mounted on each LED substrate 18 is extensively distributed close to one end portion on the long side of the liquid crystal panel 11, and is arranged along the direction of that end portion, namely, along the long side direction (X-axis direction). In this manner, the backlight device 12 according to the present embodiment is a so-called edge-lit (side-lit) backlight. Each constituent component of the backlight device 12 is described below in detail.

The chassis 14 is made from metal sheeting such as aluminum sheeting, or an electro-galvanized, cold-rolled, coil (SECC). As illustrated in FIG. 2, similar to the liquid crystal panel 11, the chassis 14 is constituted by an oblong rectangular bottom panel 14A, and side panels 14B on each of the outer ends of each side (one pair long, one pair short) of the bottom panel rising from the bottom panel 14A toward the front side. In this embodiment, the long side direction and the short side direction of the chassis 14 (bottom panel 14A) coincides with the X-axis direction and the Y-axis direction respectively. Various kinds of substrates such as a control substrate (not shown) or LED drive circuit substrate (not shown) may be attached to the rear surface of the bottom panel 14A.

As illustrated in FIG. 2, the optical component 15 is also an oblong rectangle in plan view, similar to the liquid crystal panel 11 and the chassis 14. The optical component 15 is placed on the front side (light emitting side) of the light guide plate 19 interposed between the liquid crystal panel 11 and the light guide plate 19; the optical component 15 thereby transmits light emitted from the light guide plate 19, gives the transmitted light prescribed optical effects, and emits the light toward the liquid crystal panel 11.

The optical component 15 is composed of a plurality of sheet members (three sheets, in this embodiment) laminated to each other. The specific type of the optical component 15 (optical sheets) used may be appropriately selected from among, for example, a diffusion sheet, a lens sheet, or a reflective polarizing sheet. In FIG. 3, the three sheets of the optical component 15 are depicted simply as a single sheet.

As illustrated in FIG. 3, the LEDs 17 are mounted on the front surface of the LED substrate 18 with a light-exiting surface 17A opposite the LED substrate 18 and thus are the so-called top emitting LEDs. The LED 17 is an LED chip sealed with a resin material on a substrate portion adhered to the LED substrate 18.

The LED chip mounted to the substrate portion primarily emits light of a single wavelength; more specifically, the LED chip emits monochromatic blue light. At the same time, the resin material used to seal the LED chip may have phosphors dispersed throughout. These phosphors, excited by the blue light emitted from the LED chip, emit a prescribed color. Therefore, generally the LEDs 17 emit white light on the whole. The phosphors may be an appropriate combination of yellow phosphors emitting yellow light, green phosphors emitting green light, and red phosphors emitting red light. Alternatively, any of these phosphors may be used independently.

The LED substrate 18 with a plurality of the above described LEDs 17 mounted thereon forms a lengthwise panel. The LED substrate 18 extends along the long side direction of the chassis 14 (at the liquid crystal panel 11 and the light guide plate 19, the extension direction of the edge portion near the LEDs 17, X-axis direction) as illustrated in FIG. 2. Namely, the LED substrate 18 is oriented such that the long side direction and the short side direction of the LED substrate 18 in the plane of the panel coincide with the X-axis and Z-axis directions respectively, and the thickness direction of the panel orthogonal to the plane of the panel coincides with the Y-axis direction.

The light guide plate 19 is made of a substantially transparent synthetic resin (such as acrylic resin) having a refractive index suitably higher than air. As illustrated in FIG. 2 and FIG. 3, the light guide plate 19 is a flat panel that is an oblong rectangle in plan view, similar to the liquid crystal panel 11 and the bottom panel 14A of the chassis 14. The surface of the light guide plate 19 is opposite and parallel to a panel surface of the liquid crystal panel 11 and the optical component 15 respectively.

Namely, the light guide plate 19 is oriented such that the long side direction and the short side direction of the surface coincide with the X-axis and Y-axis directions respectively, and the thickness direction orthogonal to the surface corresponds to the Z-axis direction. As illustrated in FIG. 2, the light guide plate 19 is arranged immediately below the liquid crystal panel 11 and the optical component 15 within the chassis 14 and the pair of end faces of the peripheral end faces on the long side of the light guide plate 19 are arranged facing the LEDs 17 on the LED substrate 18.

Light emitted from the LEDs 17 along the Y-axis direction enters the end face on the long side of the light guide plate 19. As the light enters, the light guide plate 19 propagates the light internally, and orients the light upward toward the optical component 15 (toward the front side, light emitting side), and emits the light from the panel surface thereof. The frame 60 holds the peripheral edges of the light guide plate 19.

The panel surface of the light guide plate 19 facing the front side (the surface opposite the liquid crystal panel 11 and the optical component 15) is a light-exiting surface 19A. As illustrated in FIG. 2 and FIG. 3, the light-exiting surface 19A orients and emits the light inside the light guide plate 19 toward the optical component 15 and the liquid crystal panel 11.

The surface of the light guide plate 19 facing the LEDs 17 is arranged at a prescribed gap away from the LEDs 17, and acts as a light incidence surface 19B through which light emitted from the LEDs 17 enters the light guide plate 19. A light-reflecting sheet R1 is disposed at a location on the bottom panel 14A of the chassis 14 toward the rear side (lower part in FIG. 3) of a space maintained between the LEDs 17 and the light incidence surface 19B. The light-reflecting sheet R1 reflects light from the LEDs 17 to allow the light to efficiently enter the light incidence surface 19B.

A light-reflecting sheet R2 covers the entire panel surface 19C of the light guide plate that faces the light emitting surface 19A. As illustrated in FIG. 3, the light-reflecting sheet R2 reflects the light inside the light guide plate 19 upward, toward the front side of the light guide plate 19. In other words, the light-reflecting sheet R2 is sandwiched between the bottom panel 14A of the chassis 14 and the light guide plate 19.

A light-reflecting sheet R3 is also provided covering each of the three faces besides the light incidence face 19B at the side faces of the light guide plate 19. Thus, the light oriented towards the three faces besides the light incident face 19B of the light guide plate 19 are reflected by the light reflecting sheets R2 and R3, and are reflected inside the light guide plate 19.

At least one of the panel surface 19C of the light guide plate 19, and the front surface of the light reflecting sheet R2 may be given an internally distributed prescribed pattern. For example, the prescribed pattern may be a light diffusion portion (not shown) that diffuses light within the light guide plate and the patterning may be controlled such that the light emitted from the light-exiting surface 19A has a uniform distribution.

Next, the construction of the bezel 30 and the frame 60 is described in detail. The bezel 30 and the frame 60 respectively form oblong square frames (rectangular frames) along the outer peripheral edges of the liquid crystal panel 11; the bezel 30 and the frame 60 are configured to clamp the outer peripheral edges of the liquid crystal panel 11 therebetween. The bezel 30 and the frame 60 in the present embodiment are configured to be variable in length (able to extend and retract) along the respective long side directions and short side directions thereof.

Figure 4:
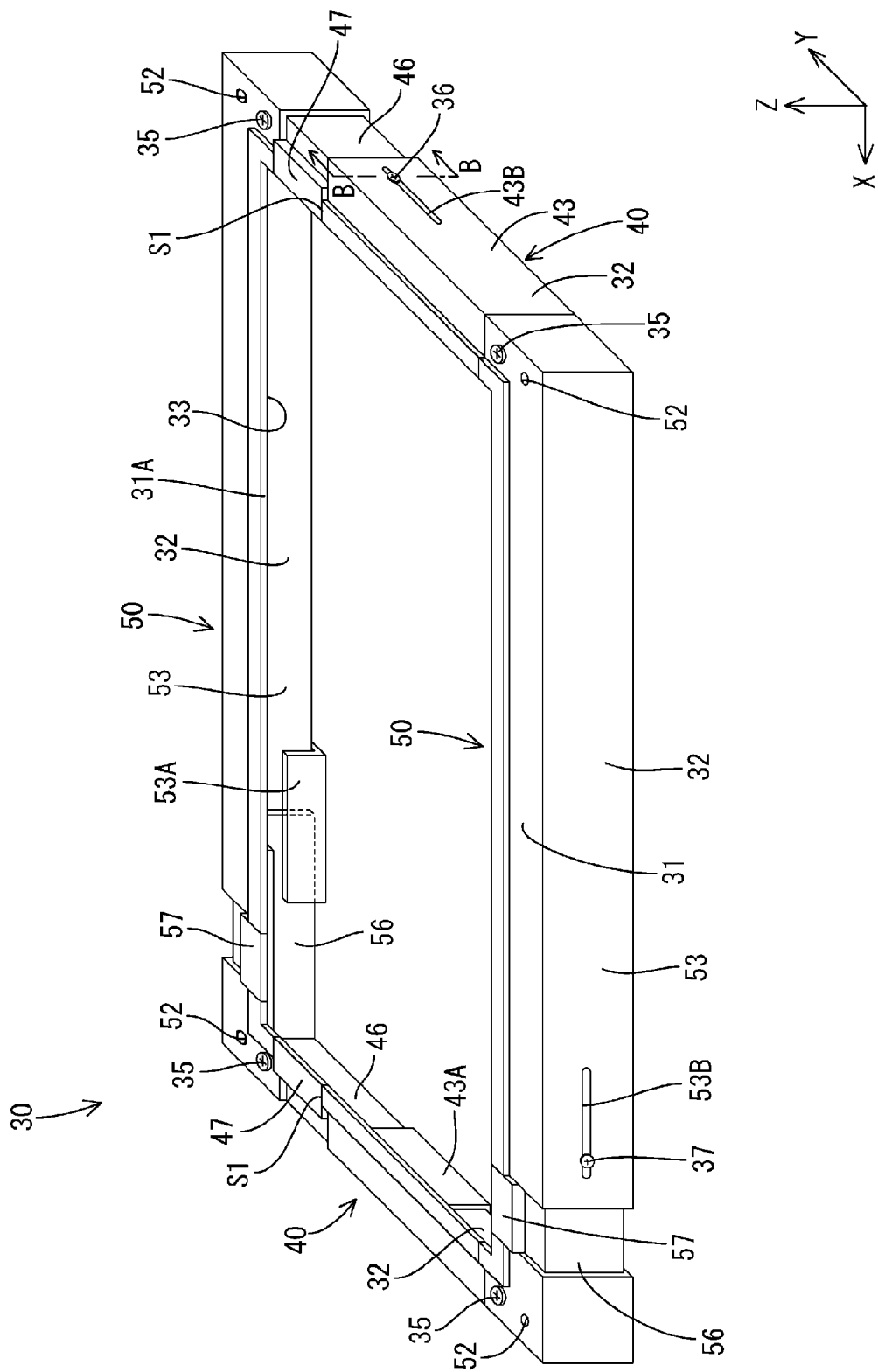
FIG. 4 is a perspective view illustrating a bezel according to Embodiment 1 of the present invention.

The bezel 30 (first frame member, panel fitting) is made from metal, for instance, and is arranged on the display surface side of the liquid crystal panel 11. The bezel 30 is provided with a main wall portion 31, and four sidewall portions 32 as illustrated in FIG. 2 and FIG. 4. The main wall portion 31 forms a rectangular frame extending along the front surface of the liquid crystal panel 11. The sidewalls portions 32 are arranged upright respectively on each of the four edges of the main wall portions 31 towards the chassis 14.

As illustrated in FIG. 3, the main wall portion 31 includes an opening 31A that exposes the display surface of the liquid crystal panel 11, and the peripheral end portions of the opening 31A (the inner peripheral end portions of the main wall portion 31) are stepped portions 33 that are further away from liquid crystal panel 11 than the outer periphery of the opening 31A. The stepped portions 33 are configured so that the outer peripheral edges of the liquid crystal panel 11 fit into the stepped portions 33. Additionally, a rubber material (not shown) may be interposed between the liquid crystal panel 11 and the stepped portion 33 to prevent the liquid crystal panel 11 from breaking if the panel is subject to impact.

Figure 5:
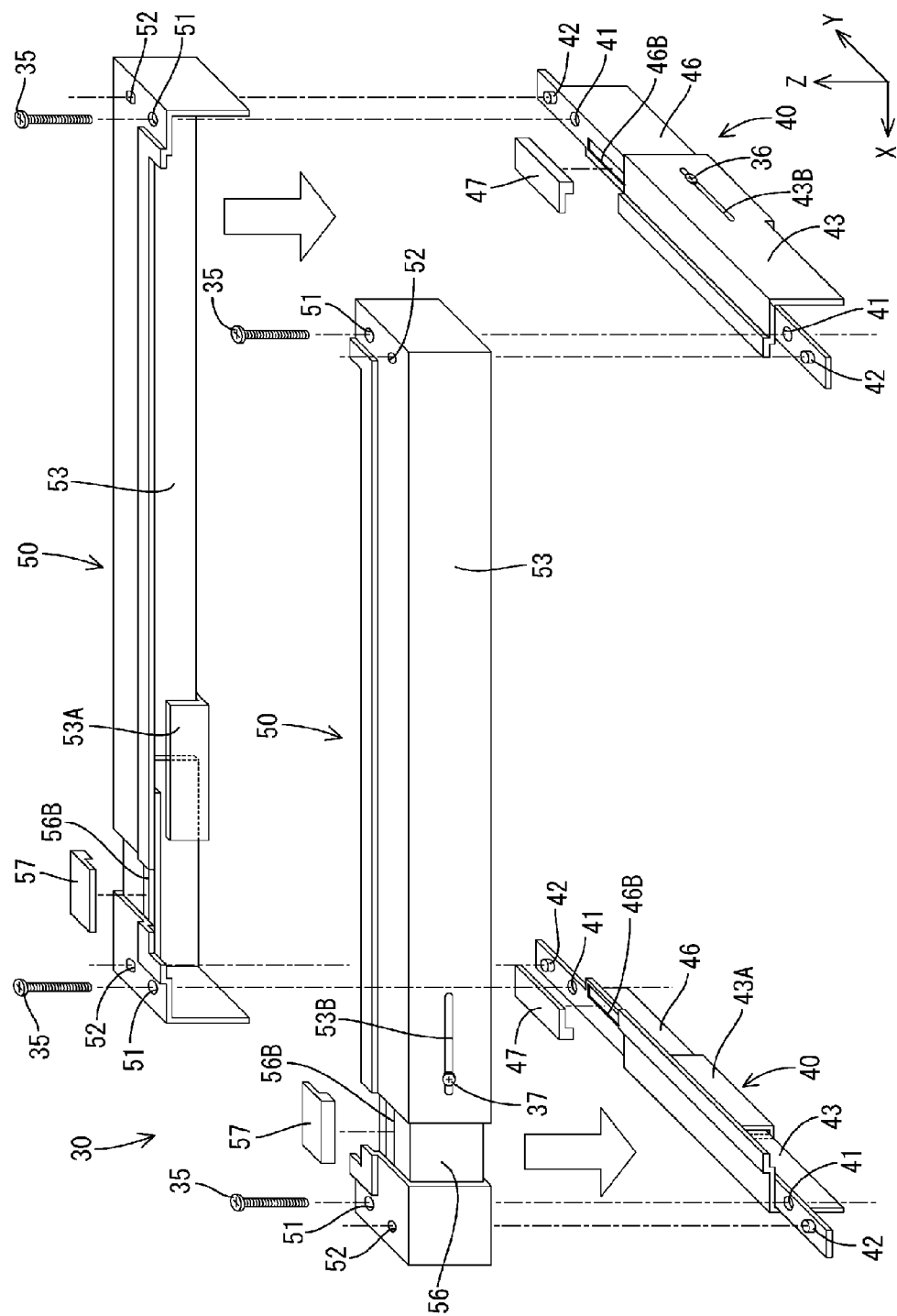
FIG. 5 is an exploded perspective view illustrating a bezel according to Embodiment 1.

As illustrated in FIG. 5, the bezel 30 is modularly configured from a pair of bezel short sides 40 (a pair of extension portions) and a pair of bezel long sides 50 (a pair of second extension portions). The bezel short sides 40 respectively configures the short sides (first direction) of the bezel 30, and the bezel long sides 50 respectively configures the long sides (second direction) of the bezel 30.

The pair of the bezel short sides 40 respectively extends along the short side direction (Y-axis direction) of the bezel 30 and is arranged along the long side direction (X-axis direction) of the bezel 30. The pair of bezels short sides 40 is symmetrical in the long side direction of the bezel 30. Additionally, the pair of bezel long sides 50 respectively extends along the long side direction of the bezel 30 and is arranged along the short side direction of the bezel 30. The pair of bezel long sides 50 is symmetrical in the short side direction of the bezel 30.

As illustrated in FIG. 5, screw insertion holes 41, and columnar protrusions 42 are respectively formed in each end portion in the extension direction of the bezel short sides 40. The screw insertion holes 41 pass through the end portions in the Z-axis direction, and the protrusions 42 protrude toward bezel long sides 50. Further, a protrusion through hole 52 is formed in each end portion in the extension direction of the bezel long sides 50, and is configured to fit the protrusions 42 thereinto. Screw insertion holes 51 are also formed in the bezel long sides 50 next to the protrusion through holes 52. Note, the protrusions 42 are not limited to being columns and may be modified as appropriate; for instance the protrusions 42 may be polygonal. Additionally, the shape of the protrusion through holes 52 may also be appropriately modified insofar as the protrusions 42 fit into the protrusion through holes 52.

Inserting the protrusions 42 into the protrusion through holes 52 positions the adjacent bezel short sides 40 and bezel long sides 50. Furthermore, the screw insertion holes 51 and the screw insertion holes 41 may be overlapped in plan view so that a coupling screw 35 may be inserted through the screw insertion holes 41 and the screw insertion holes 51. Hereby, the adjacent bezel short sides 40 and bezel long sides 50 are respectively coupled at the four corner sections of the bezel 30 using coupling screws 35.

The coupling screw 35 and the protrusion 42 couple the adjacent bezel short sides 40 and bezel long sides 50 at two places (two points). This coupling at two points prevents the bezel long side 50 from rotating relative to the bezel short side 40 about the coupling location, for instance. In this manner, the bezel short sides 40 and the bezel long sides 50 are more reliably coupled.

Figure 6:
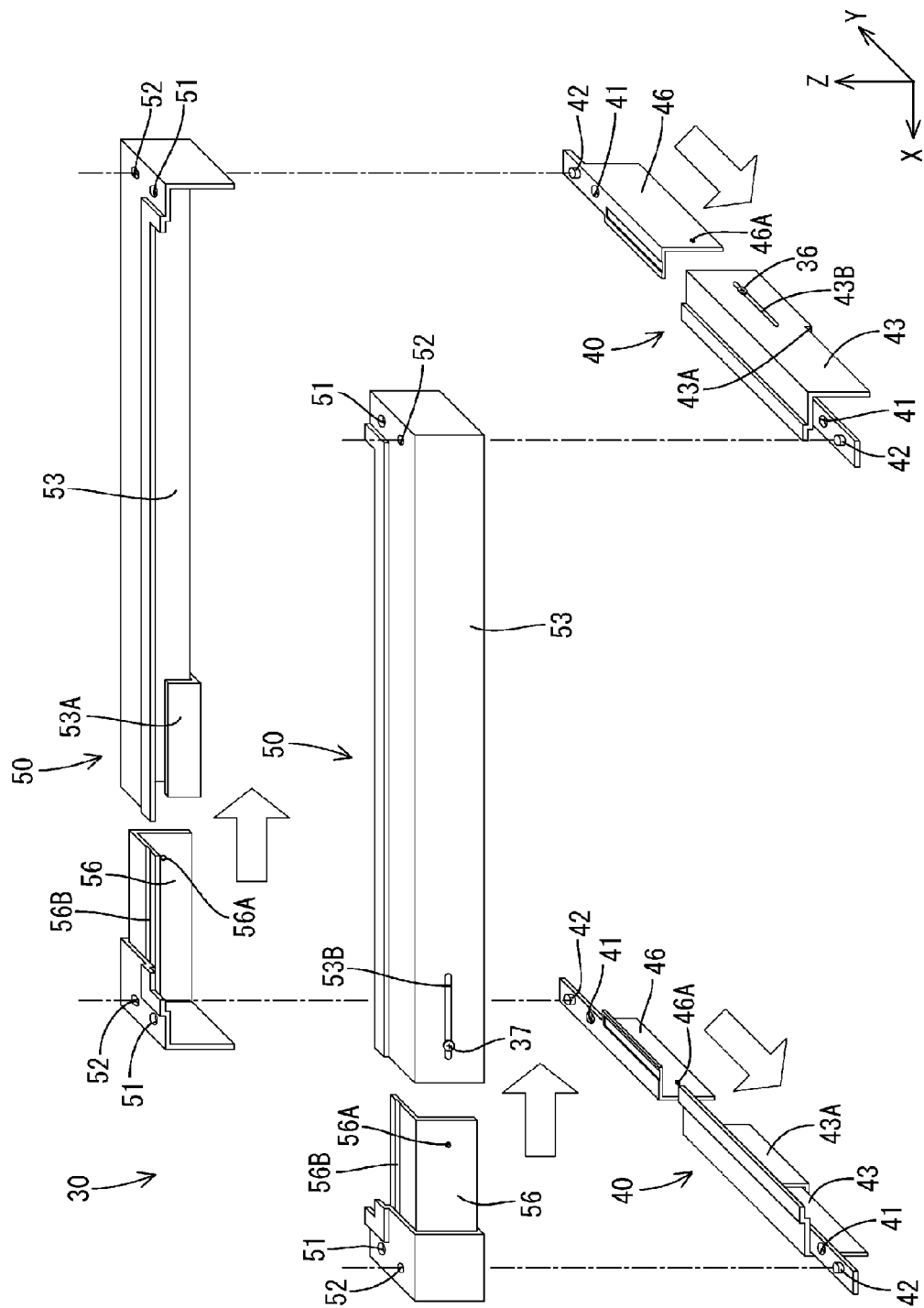
FIG. 6 is an exploded perspective view illustrating a bezel according to Embodiment 1 (exploded views of the long sides and the short sides of the bezel, respectively)

The bezel short sides 40 are modularly configured from two components as illustrated in FIG. 6, and configured to be extendable and retractable along the extension direction (the short side direction of the bezel 30, Y-axis direction). More specifically, a bezel short side 40 is modularly configured from a first short-side end 43 (first extending end portion), and a second short-side end 46 (second extending end portion). The first short-side end 43 includes one end portion, and the second short-side end 46 includes the other end portion in the extension direction of the bezel short side 40.

Figure 11:
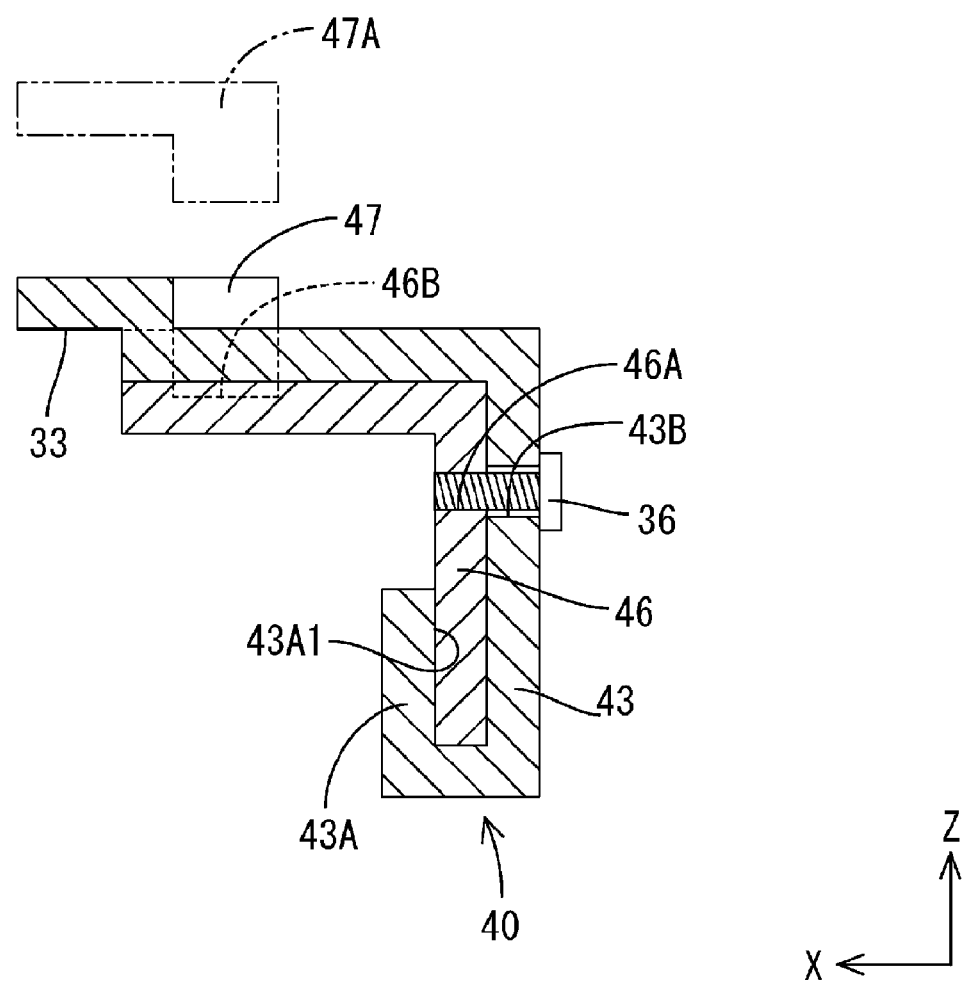
FIG. 11 is a cross-sectional view illustrating the bezel according to Embodiment 1 (corresponding to a view cut along the line B-B in FIG. 4)

The first short-side end 43 and the second short-side end 46 are each panel-like members each forming an L-shaped cross-section, with the alternating end portions being coupled by overlapping with each other. As illustrated in FIG. 6 and FIG. 11, the section of the end portion of the first short-side end 43 toward the chassis 14 (the lower end portion in FIG. 11) near the second short-side end 46 includes a bent section 43A folded back toward the inside of the bezel 30.

The bent section 43A configures a recess 43A1 opened toward the front side as illustrated in FIG. 11. An end portion of the second short-side end 46 is arranged to fit inside the recess 43A1. Hereby, the second short-side end 46 is attached to the first short-side end 43 to slide along the extension direction of the first short-side end 43.

A first screw insertion hole 43B is formed passing through the sidewall portion of the first short-side end 43 (the wall portion along the Y-axis and the Z-axis) for receiving the fixing screw 36 therethrough. Similarly, a second screw insertion hole 46A is formed passing through the sidewall portion of the second short-side end 46 along the X direction (the thickness direction of the second short-side end 46) for receiving the fixing screw 36 therethrough.

As illustrated in FIG. 6, the first screw insertion hole 43B is a slit along the extension direction of the first short-side end 43, and the width of the first screw insertion hole 43B is slightly larger than the shaft diameter of the fixing screw 36, and smaller than the diameter of the head of the fixing screw 36. Hereby the fixing screw 36 may move inside the first screw insertion hole 43B along the extension direction thereof.

On adopting this configuration, the fixing screw 36 is inserted into the first screw insertion hole 43B and subsequently attached to the second screw insertion hole 46A; thus, the fixing screw 36 secures the first short-side end 43 and the second short-side end 46 to each other. Given that the first screw insertion hole 43B is a slit, the distance the second short-side end 46 slides relative to the first short-side end 43 may be adjusted within the extension length of the first screw insertion hole 43B. That is, the bezel short side 40 is configured to be extendable and retractable for the extension length of the first screw insertion hole 43B, so that sliding the second short-side end 46 relative to the first short-side end 43 extends or retracts the bezel short side 40 for the extension length of the first screw insertion hole 43B. In other words, the first short-side end 43 and the second short-side end 46 are configured to slide relative to each other.

A recess 46B is formed in the surface (upper part in FIG. 5) on the front side of the second short-side end 46, extending along the extension direction of the second short-side end 46. One end portion of a covering member 47 having an L-shaped cross-section fits into the recess 46B as illustrated in FIG. 11. The other end portion of the covering member 47 configures a part of the stepped portion 33 in the bezel 30. Note, a double-dot dashed line in FIG. 11, represents the covering member 47 prior to fitting into the recess 46B; the pre-fitted covering member is assigned the reference sign 47A.

As illustrated in FIG. 4, the covering member 47 fills in a gap S1 created between an adjacent bezel long side 50 and first short-side end 43. The extension length of the gap S1 is proportional to the distance the second short-side end 46 (and the entire length of the bezel short side 40) slides relative to the first short-side end 43. The extension length of the covering member 47 is established as a value equivalent to the length of the gap S1.

As illustrated in FIG. 6, the bezel long side 50 is modularly configured from two members, similar to the bezel short side 40. The bezel long side 50 is configured to be extendable and retractable along the extension direction (the long side direction of the bezel 30, the X-axis direction) thereof. More specifically, the bezel long side 50 is modularly configured from a first long-side end 53, and a second long-side end 56. The first long-side end 53 includes a first end portion in the extension direction, and the second long-side end 56 includes a second end portion in the extension direction.

The first short-side end 53 and the second short-side end 56 are each panel-like members each forming an L-shaped cross-section, with the alternating end portions being coupled by overlapping with each other. As illustrated in FIG. 6, the section of the end portion on the first long-side end 53 toward the chassis 14 (the lower end portion in FIG. 6) near the second long-side end 56 includes a folded-back section 53A folded back toward the inside of the bezel 30.

The folded-back section 53A is arranged so that an end portion of the second long-side end 56 fits inside the folded-back section 53A. Hereby, the second short-side end 56 is attached to the first long-side end 53 to slide along the extension direction of the first long-side end 53.

A first screw insertion hole 53B is formed passing through the sidewall portion of the first long-side end 53 for receiving the fixing screw 37 therethrough. Similarly, a second screw insertion hole 56A is formed passing through the sidewall portion of the second long-side end 56 for receiving the fixing screw 37 therethrough.

The first screw insertion hole 53B is a slit along the extension direction of the first long-side end 53; the width of the first screw insertion hole 53B is slightly larger than the shaft diameter of the fixing screw 37, and smaller than the diameter of the head of the fixing screw 37. Hereby the fixing screw 37 may move inside the first screw insertion hole 53B along the extension direction thereof.

On adopting this configuration, the fixing screw 37 is inserted into the first screw insertion hole 53B and subsequently attached to the second screw insertion hole 56A; thus, the fixing screw 37 couples the first long-side end 53 and the second long-side end 56 to each other. The first screw insertion hole 53B is a slit; therefore, the distance the second short-side end 56 slides relative to the first short-side end 53 may be adjusted within the extension length of the first screw insertion hole 53B. That is, the bezel long sides 50 are configured to be extendable and retractable for the extension length of the first screw insertion hole 53B.

A recess 56B is formed in the surface (upper part in FIG. 6) on the front side of the second long-side end 56, extending along the extension direction of the second long-side end 56. One end portion of a covering member 57 having an L-shaped cross-section fits into the recess 56B as illustrated in FIG. 5. The other end portion of the covering member 57 configures a part of the stepped portion 33 in the bezel 30. The extension length of the covering member 57 is established in accordance with the length of the bezel long side 50, similar to the configuration of the covering member 47 with respect to the bezel short side 40.

Figure 7:
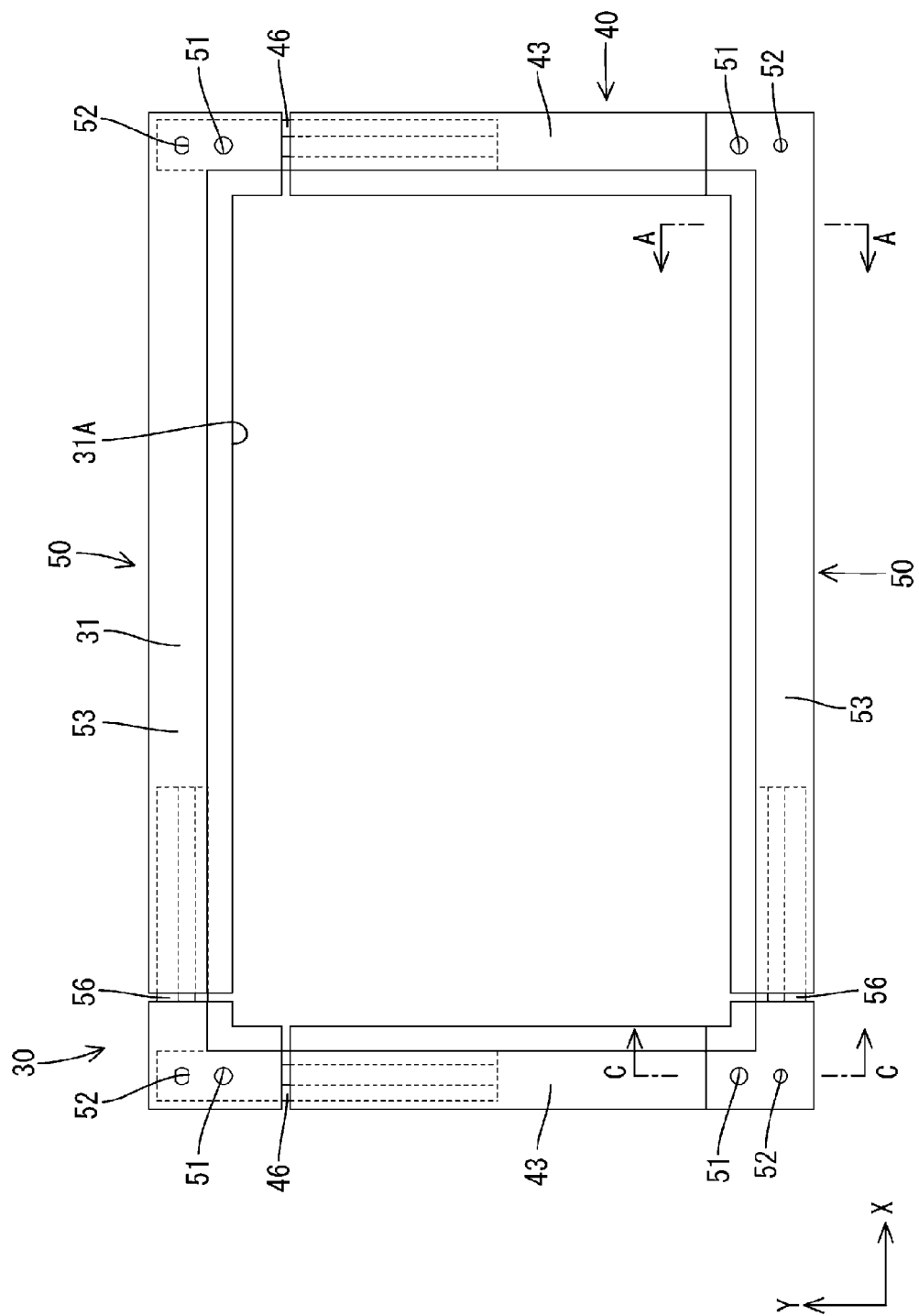
FIG. 7 is a plan view of the bezel according to Embodiment 1 when viewed from the front.
Figure 8:
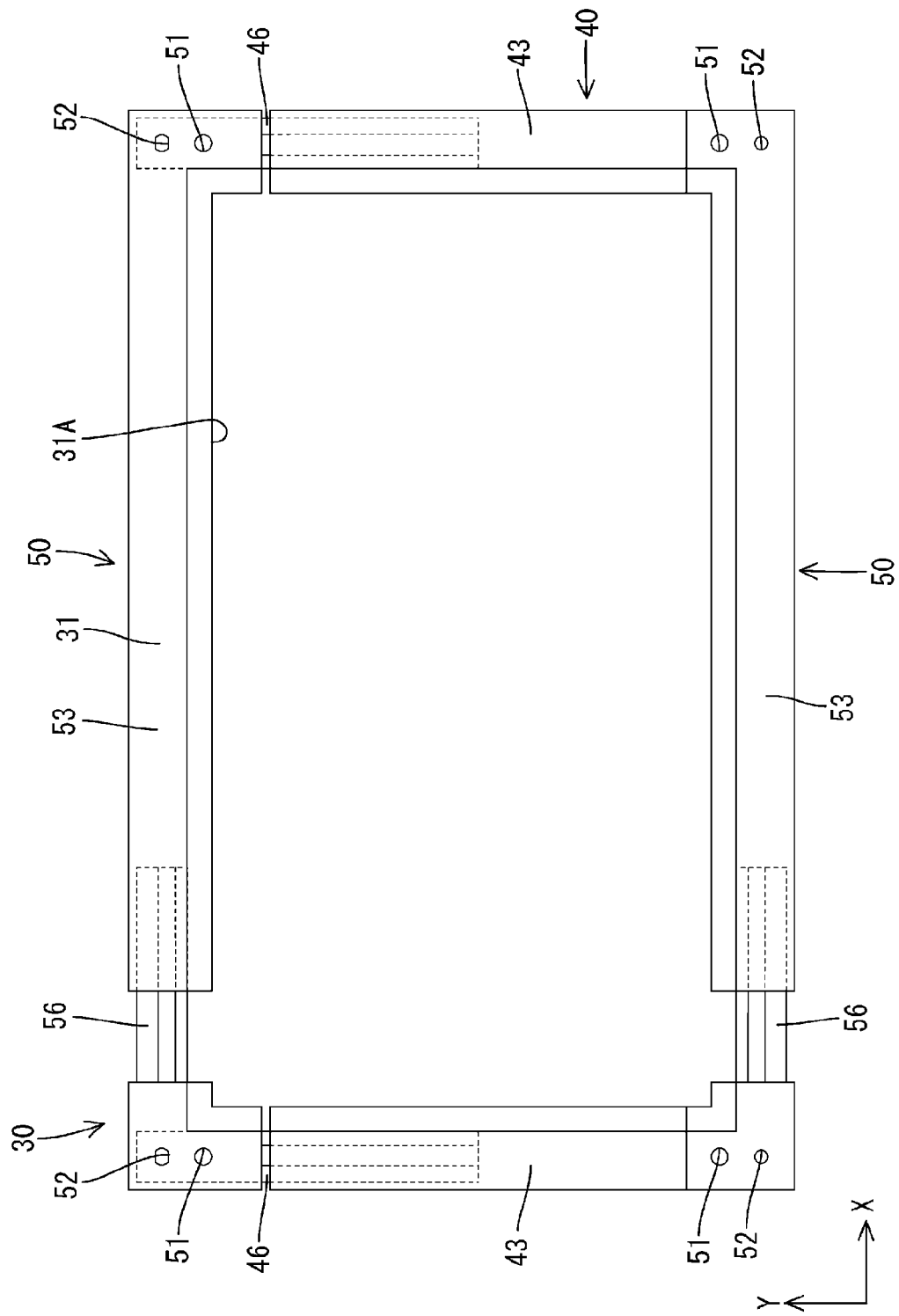
FIG. 8 is a plan view of the bezel in FIG. 7 illustrating when the bezel is extended on the long sides.
Figure 9:
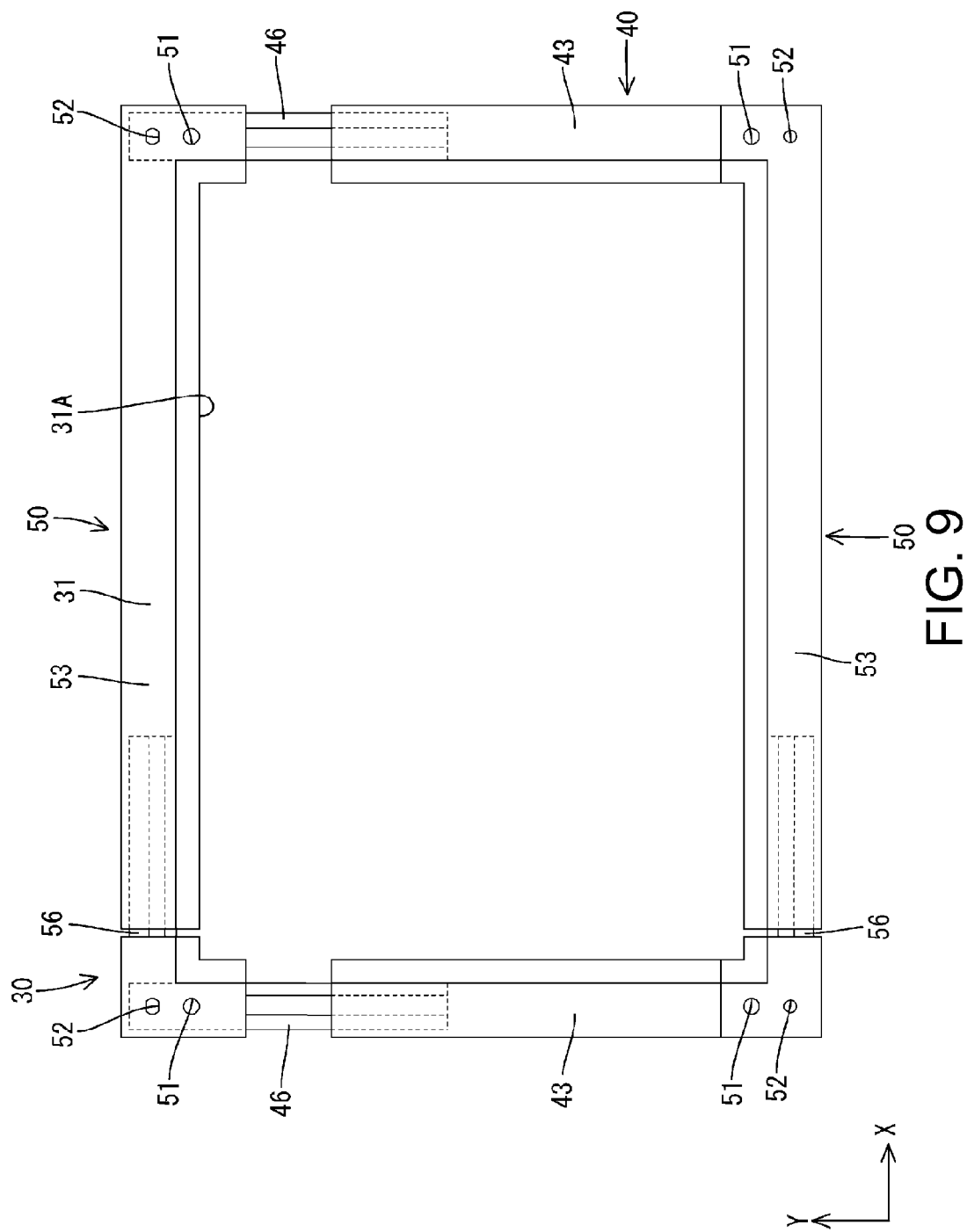
FIG. 9 is a plan view of the bezel in FIG. 7 illustrating when the bezel is extended on the short sides.
Figure 10:
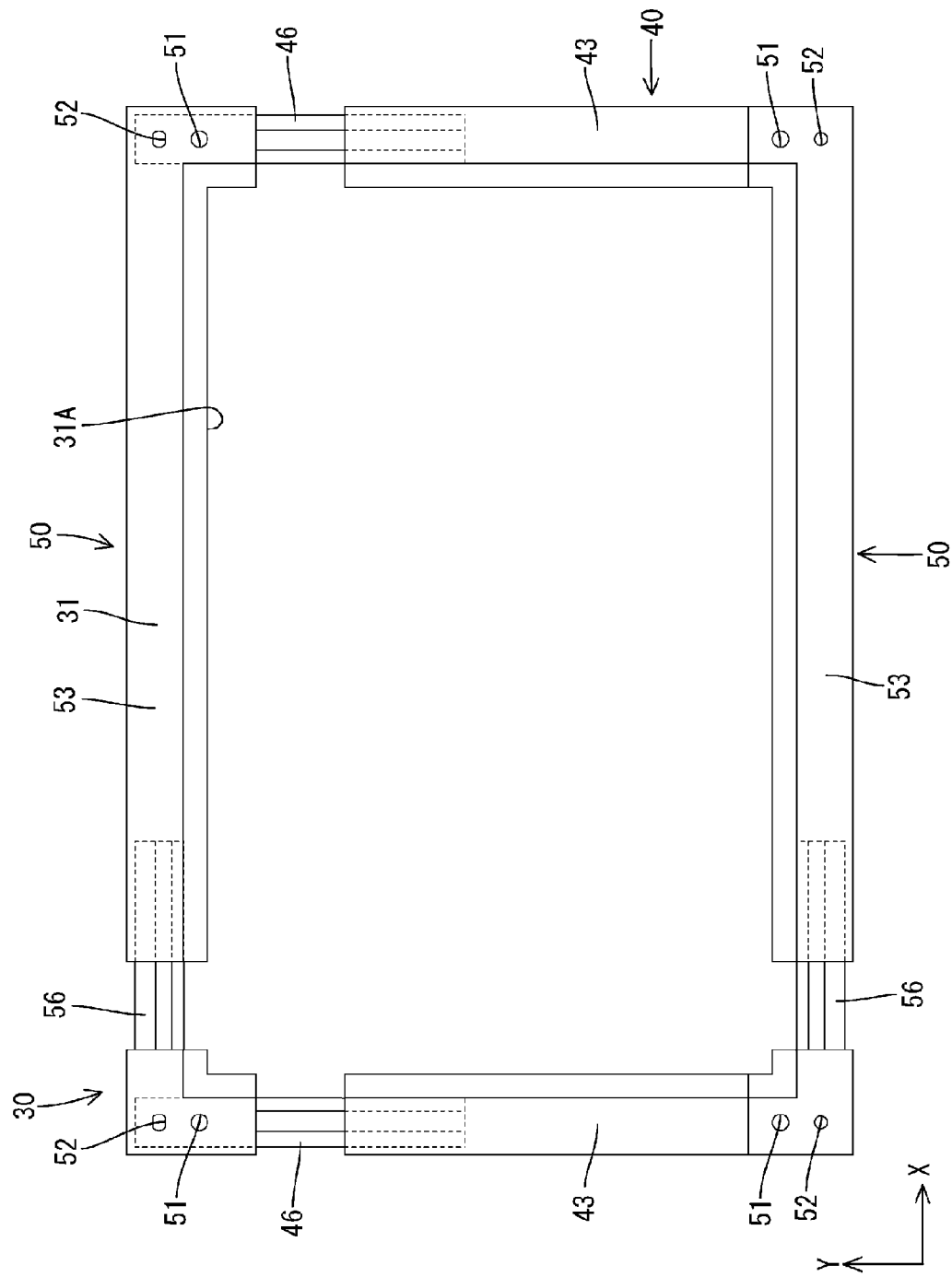
FIG. 10 is a plan view of the bezel in FIG. 7 illustrating when the bezel is extended on the long and the short sides.

With the above described configuration, the length of the bezel 30 is respectively variable along the short side direction and the long side direction as illustrated in FIGS. 7 to 10. FIG. 7 illustrates the bezel 30 when the short sides and the long sides are at a minimum length. FIG. 8 illustrates the bezel 30 when the long sides are at a maximum length; FIG. 9 illustrates the bezel 30 when the short sides are at a maximum length. Finally, FIG. 10 illustrates the bezel 30 when the short sides and the long sides are at a maximum length.

Figure 12:
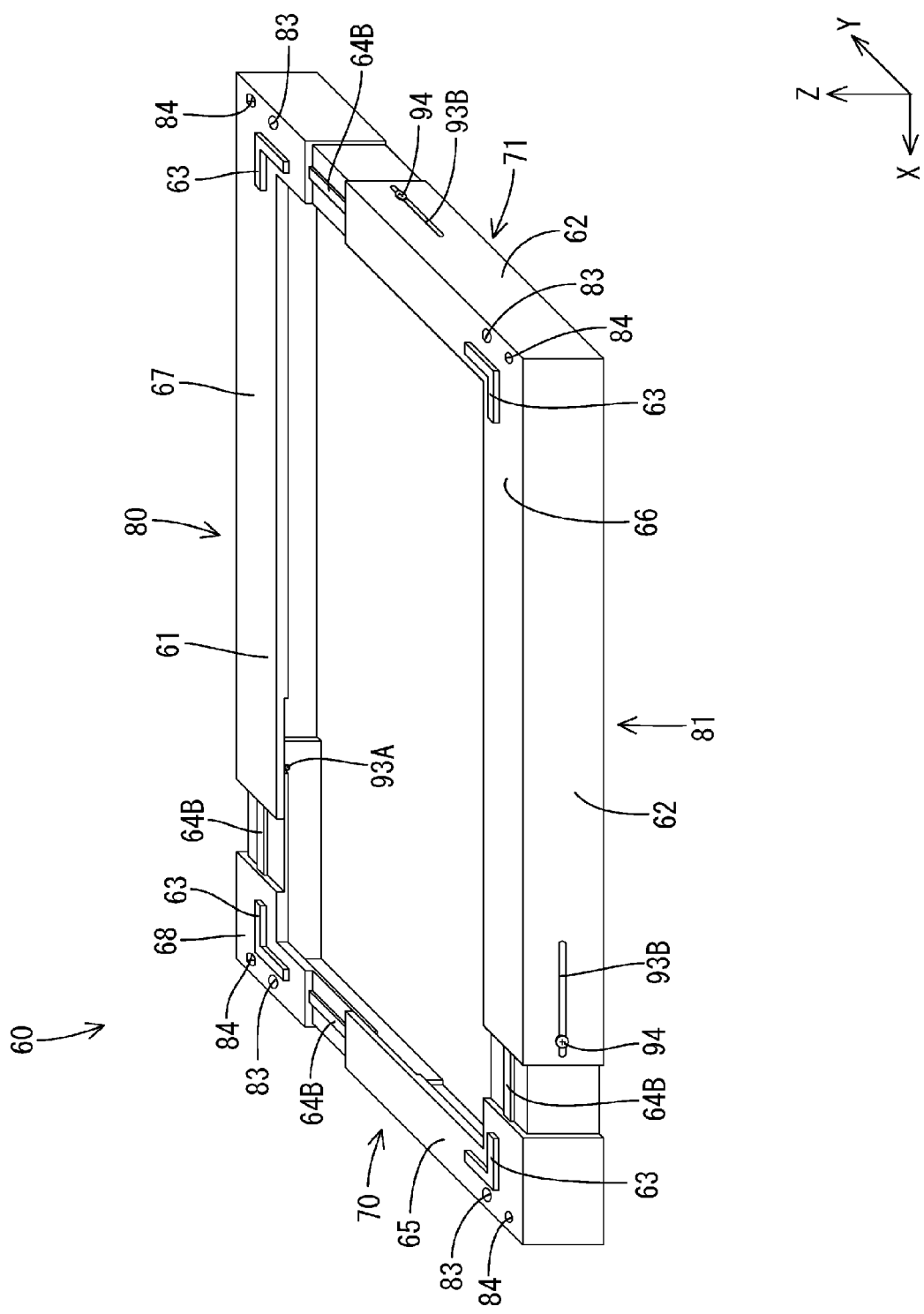
FIG. 12 is a perspective view illustrating a frame according to Embodiment 1.

The frame 60 (second frame member, panel holder) may be made from, for instance, a synthetic resin. As illustrated in FIG. 2, the frame 60 is arranged on the rear side (toward the backlight device 12, and LEDs 17) of the liquid crystal panel 11. The frame 60 is provided with a main wall portion 61, and four sidewall portions 62 as illustrated in FIG. 2 and FIG. 12. The main wall portion 61 forms a rectangular frame extending along the rear surface of the liquid crystal panel 11. The sidewall portions 62 are arranged upright respectively on each of the four edges of the main wall portions 61 towards the chassis 14. As illustrated in FIG. 3, the frame 60 is one size smaller than the bezel 30, such that the frame 60 may be housed on the inner portion of the bezel 30.

A holder protrusion 63 is formed in the front surface of the main wall portion 61 on the frame 60. The holder protrusion 63 is a planar L-shape that can fit the corner sections of the liquid crystal panel 11. A holder protrusion 63 is provided at each of the four corners of the frame 60; each holder protrusion 63 is configured to fit one of the four corner sections of the liquid crystal panel 11.

The outer peripheral edges of the liquid crystal panel 11 fits on each of the four holder protrusions 63 on the frame 60; as the liquid crystal panel is fitted onto the holder protrusions, the stepped portion 33 of the bezel 30 and the frame 60 clamp the outer peripheral edges of the liquid crystal panel 11 therebetween, as illustrated in FIG. 3. The extension surface (X-Y plane) of the liquid crystal panel 11 is thusly positioned.

As further illustrated in FIG. 3, the frame 60 forms a rectangular frame extending along the outer peripheral edges of the light guide plate 19 and the optical component 15. This allows the frame 60 to press along almost the entire periphery of the outer peripheral edges of the optical component 15 (and the light guide plate 19) from the front side.

Figure 13:
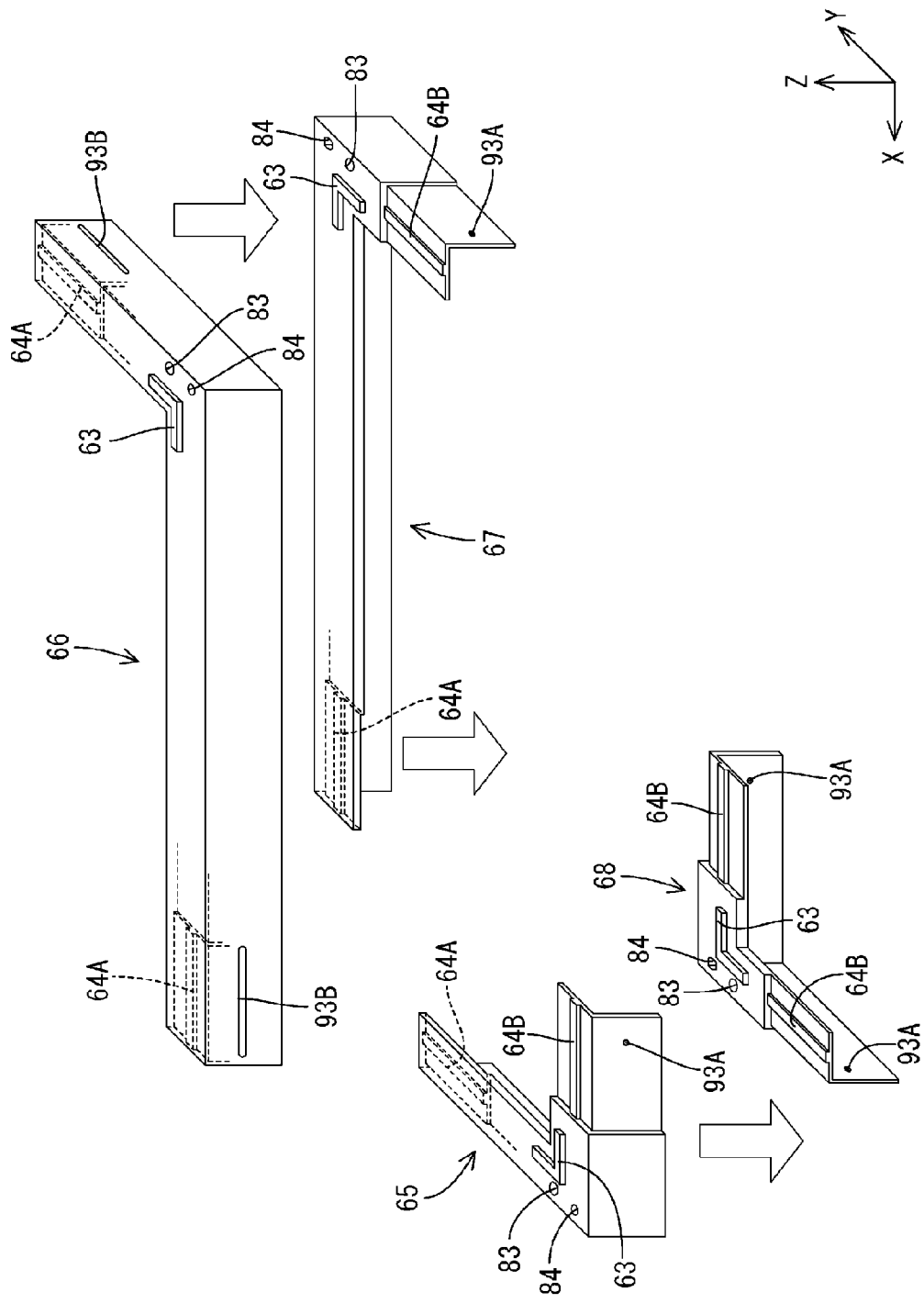
FIG. 13 is an exploded perspective view illustrating a frame according to Embodiment 1.

As illustrated in FIG. 12, the frame 60 is provided with a pair of frame short sides 70, 71 constituting each of the short sides thereof, and a pair of frame long sides 80, 81 constituting each of the long sides thereof. As illustrated in FIG. 13, the frame 60 is configured by combining four frame components 65, 66, 67, 68; the frame components are L-shaped in a plan view.

The frame components 65, 66, 67, 68 are each panel-like members each forming an L-shaped cross-section. The frame component 65 configures a portion of the frame long side 81, and a portion of the frame short side 70 as illustrated in FIG. 12; the frame component 66 configures a portion of the frame long side 81 and a portion of the frame short side 71. The frame component 67 configures a portion of the frame long side 80, and a portion of the frame short side 71; and the frame component 68 configures a portion of the frame long side 80 and a portion of the frame short side 70.

An end portion of a frame component is arranged to overlap with an end portion of an adjacent frame component in a plan view. Furthermore, each overlapping portion of the two adjacent frame components forms a guide groove 64A or a guide protrusion 64B.

Figure 18:
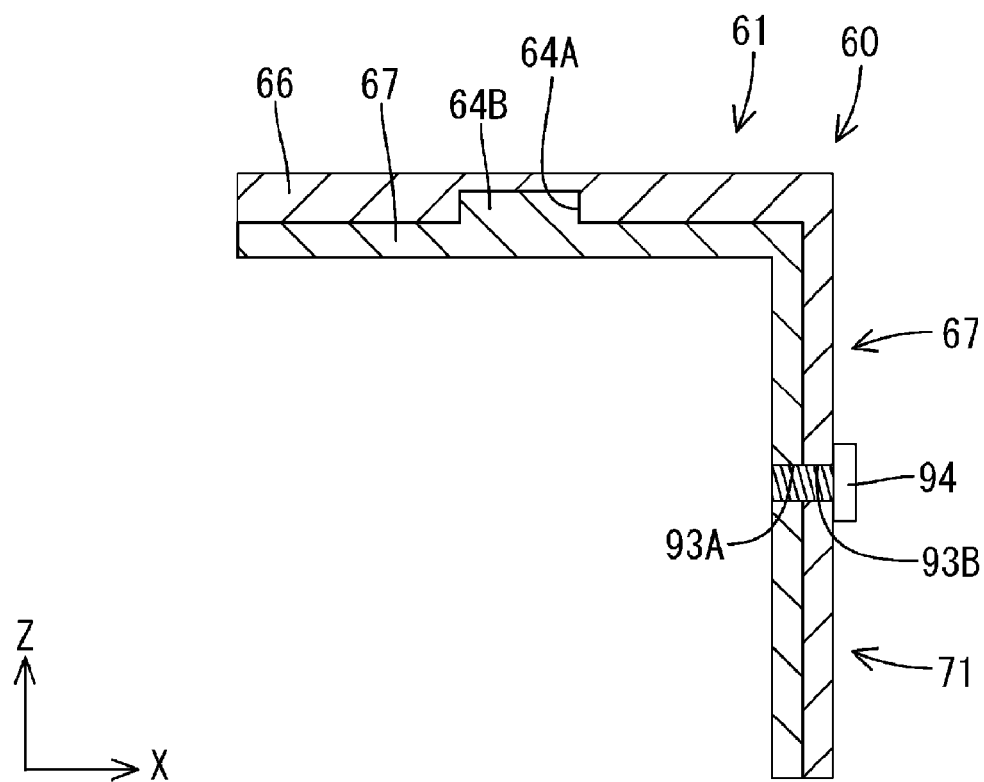
FIG. 18 is a cross-sectional view illustrating the frame according to Embodiment 1 (corresponding to a view cut along the line D-D in FIG. 15)

For instance, one end portion of the front surface of the frame component 67 near the frame component 66 may form the guide protrusion 64B; and, as illustrated in FIG. 18, the guide protrusion 64B may fit into the guide groove 64A formed on the rear surface of the frame component 66. The frame component 66 may thereby slide relative to the frame component 67 in the extension direction of the frame short side 71 (the extension direction of the guide protrusion 64B), allowing the frame short side 71 to have a variable length.

Additionally, for instance, another end portion of the rear surface of the frame component 67 near the frame component 68 may form a guide groove 64A; and, the guide protrusion 64B formed in the front surface of the frame component 68 may fit into the guide groove 64A. The frame component 67 and the frame component 68 may thereby slide relative to each other along the extension direction of the frame long side 80, allowing the frame long side 80 to have a variable length.

Note that the frame long side 81 and the frame short side 70 are also configured to have variable lengths due to the engagement structure of the guide groove 64A and the guide protrusion 64B.

A first screw insertion hole 93B is formed passing through one of the sidewalls in the two adjacent frame components for receiving the fixing screw 94; a second screw insertion hole 93A is formed passing through the other sidewall for receiving and attaching the fixing screw 94. The first screw insertion hole 93B is a slit extending along the sliding direction of the two adjacent frame components as illustrated in FIG. 12; the first screw insertion hole 93B is slightly larger than the shaft diameter of the fixing screw 94. Hereby the fixing screw 94 may move inside the first screw insertion hole 93B along the extension direction thereof.

On adopting this configuration, the fixing screw 94 is inserted into the first screw insertion hole 93B and subsequently attached to the second screw insertion hole 93A; thereby coupling two adjacent frame components (such as the frame components 66, 67. Given that the first screw insertion hole 93B is a slit, the distance that one of the frame components (e.g., frame component 66) slides relative to the other frame component (e.g., frame component 67) may be adjusted within the extension length of the first screw insertion hole 93B. That is, the frame long side 80, the frame long side 81, frame short side 70, and frame short side 71 are configured to extend and retract along the extension direction of the first screw insertion hole 93B for the extension length thereof.

With the above described configuration, the lengths in the long side direction (X-axis direction) and the short side direction (Y-axis direction) of the frame 60 are each variable as illustrated in FIGS. 14 to 17. Hereby, the gaps in the X-axis direction and the Y-axis direction at each of the holder protrusions 63 in the frame 60 are each adjustable so that the frame 60 may hold liquid crystal panels 11 of different sizes.

Figure 14:
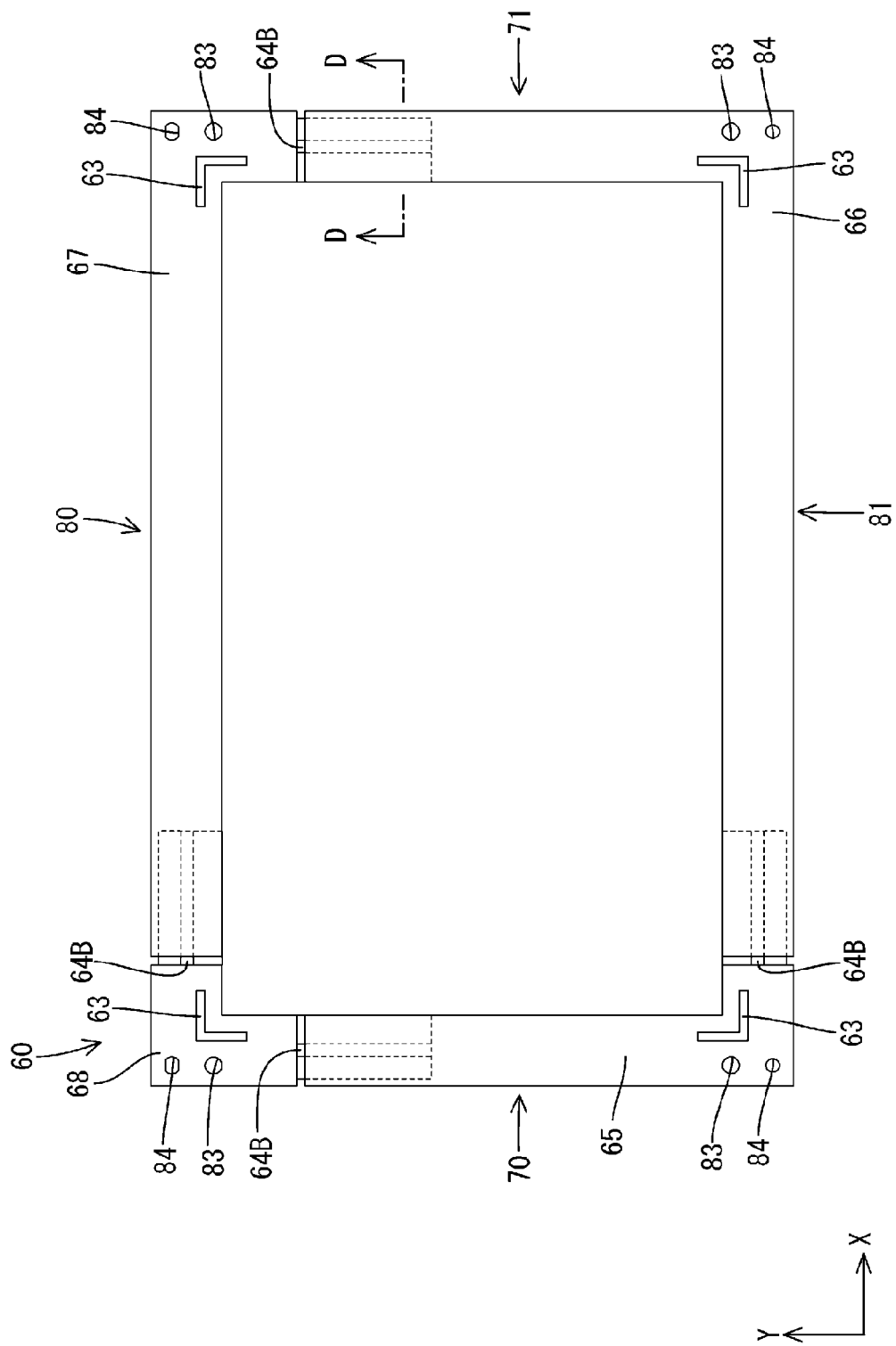
FIG. 14 is a plan view of the frame according to Embodiment 1 when viewed from the front.
Figure 15:
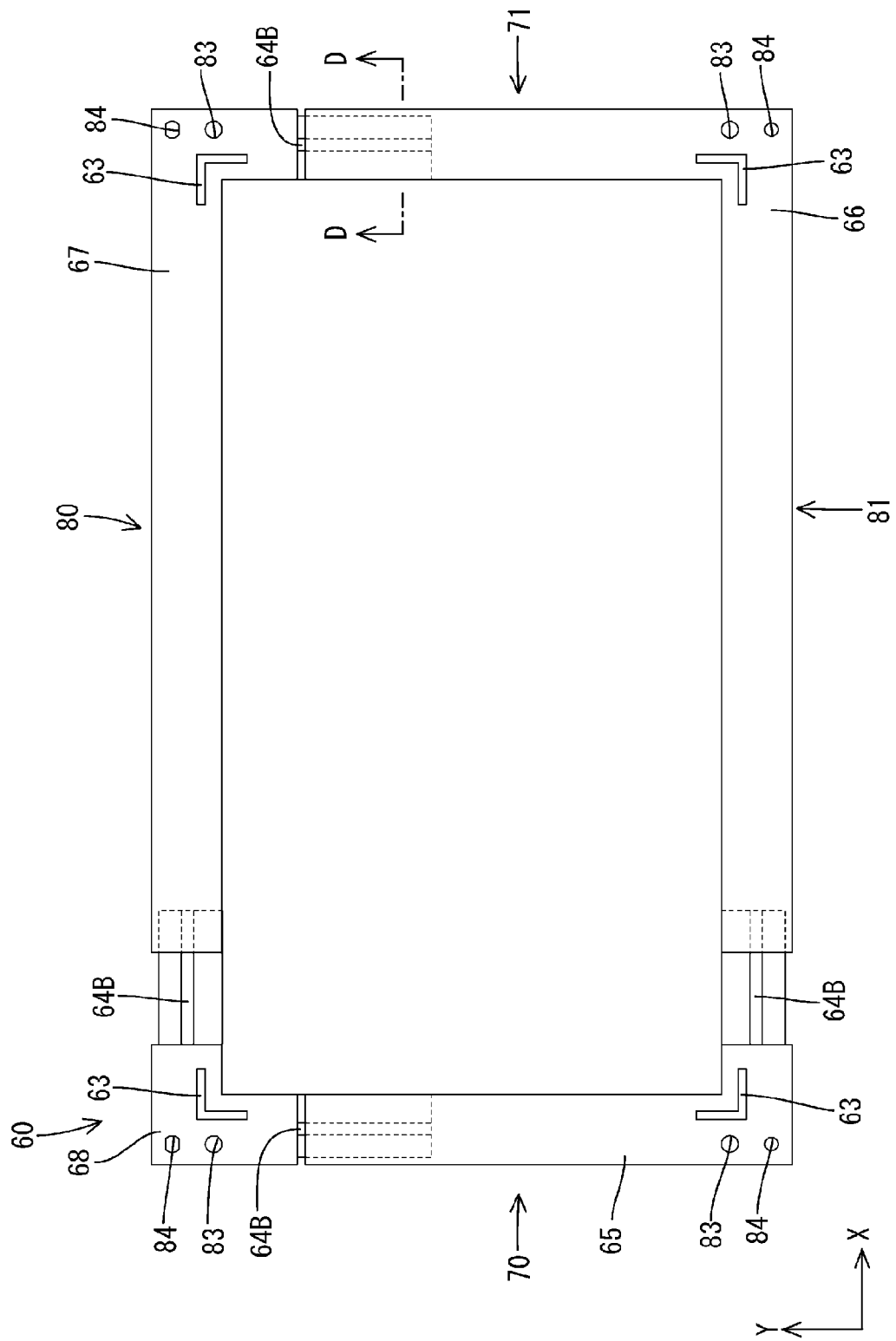
FIG. 15 is a plan view of the frame in FIG. 14 illustrating when the frame is extended on the long sides.
Figure 16:
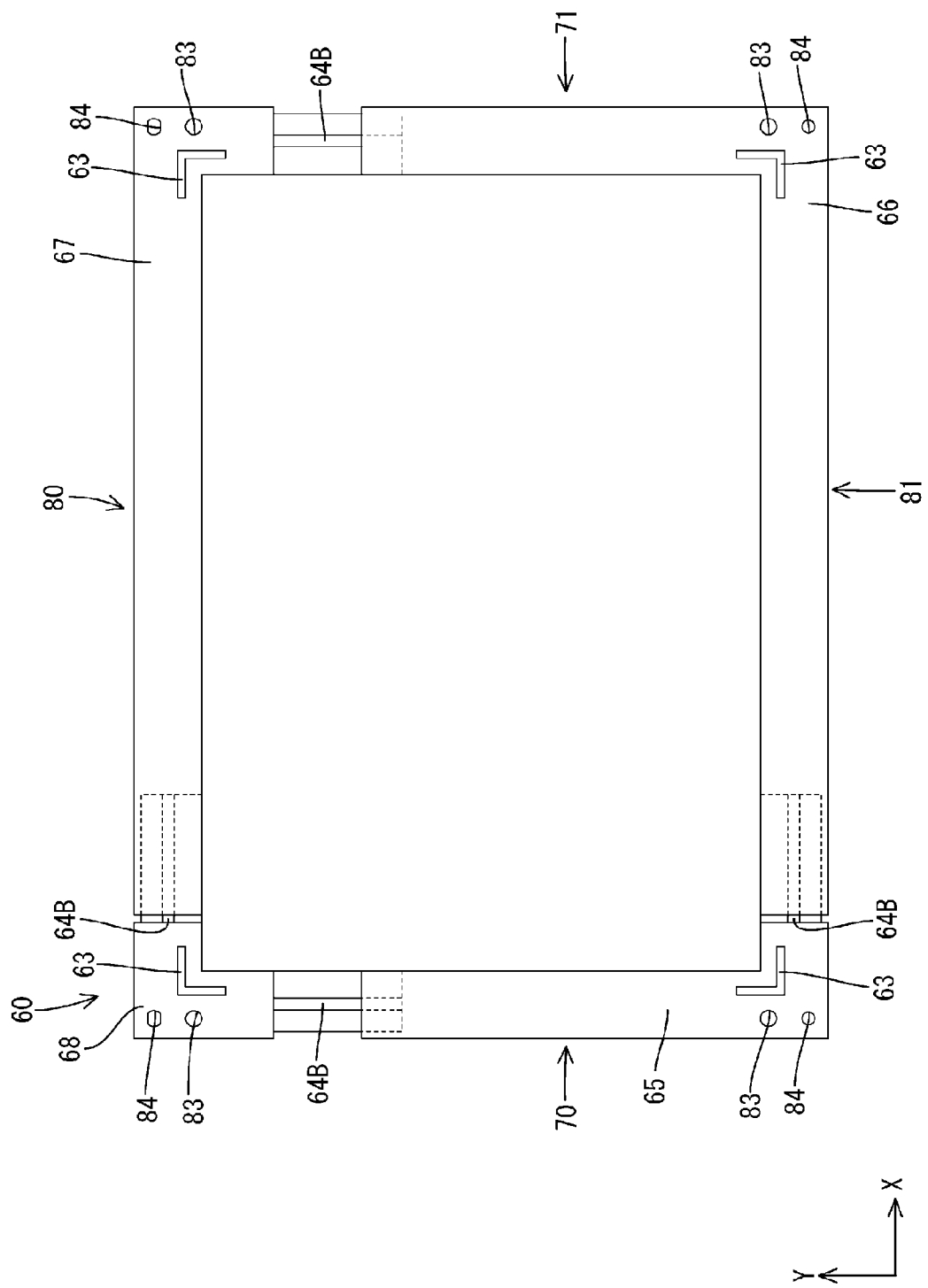
FIG. 16 is a plan view of the frame in FIG. 14 illustrating when the frame is extended on the short sides.
Figure 17:
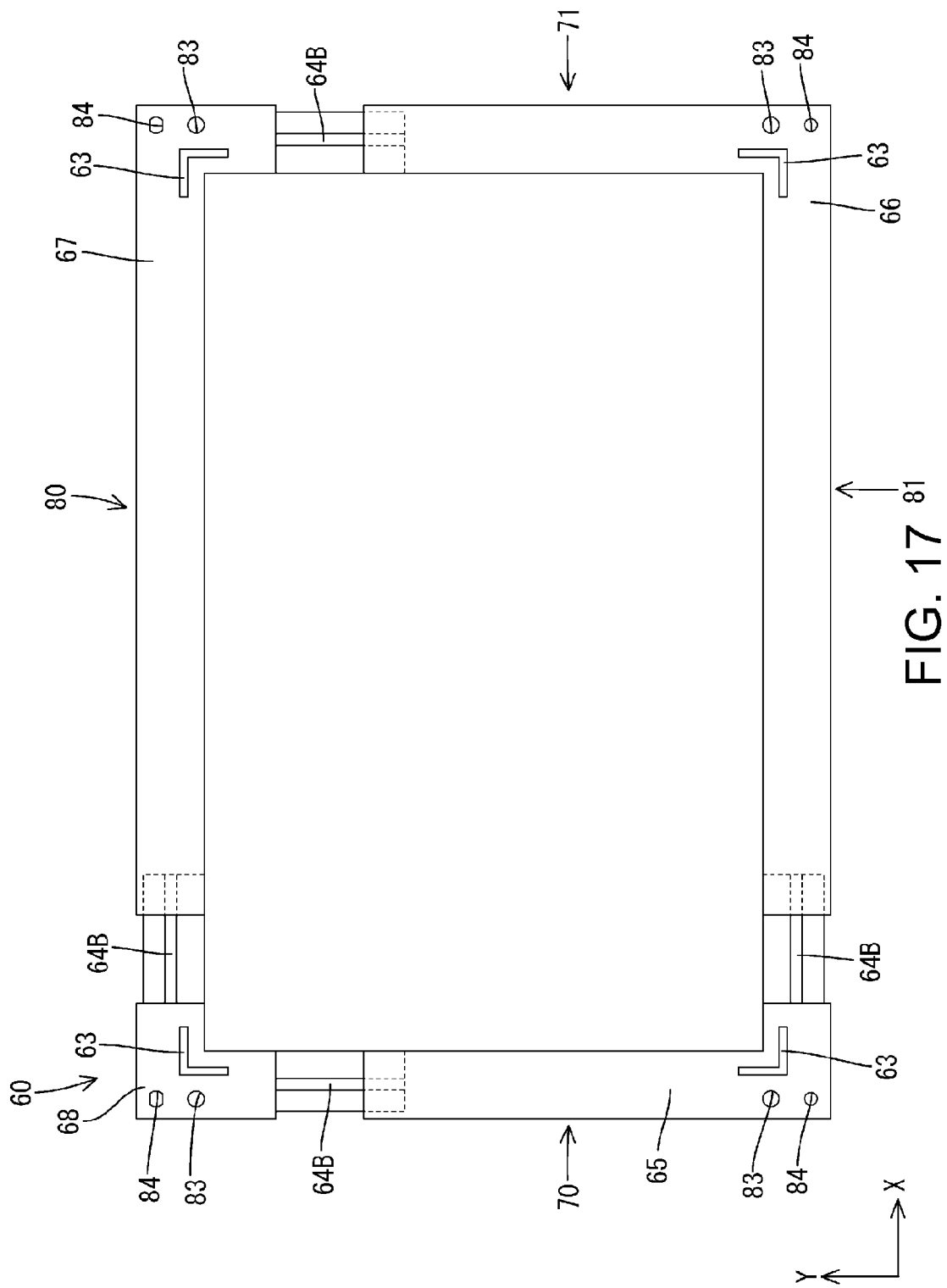
FIG. 17 is a plan view of the frame in FIG. 14 illustrating when the frame is extended on the long and the short sides.

FIG. 14 illustrates the frame 60 when the short sides and the long sides are at a minimum length. FIG. 15 illustrates the frame 60 when the long sides are at a maximum length; FIG. 16 illustrates the frame 60 when the short sides are at a maximum length. Finally, FIG. 17 illustrates the frame 60 when the short sides and the long sides are at a maximum length.

The frame 60 according to the present embodiment may be attached to the chassis 14. Screw insertion holes 83 may be formed passing through each of the corner sections of the frame 60 at a location overlapping with the screw insertion holes 51 and the screw insertion holes 41 in the bezel 30 as illustrated in FIG. 12. Additionally, as illustrated in FIG. 2, a block-shaped holder 21 may be provided at each of the corner sections in the chassis 14.

Figure 19:
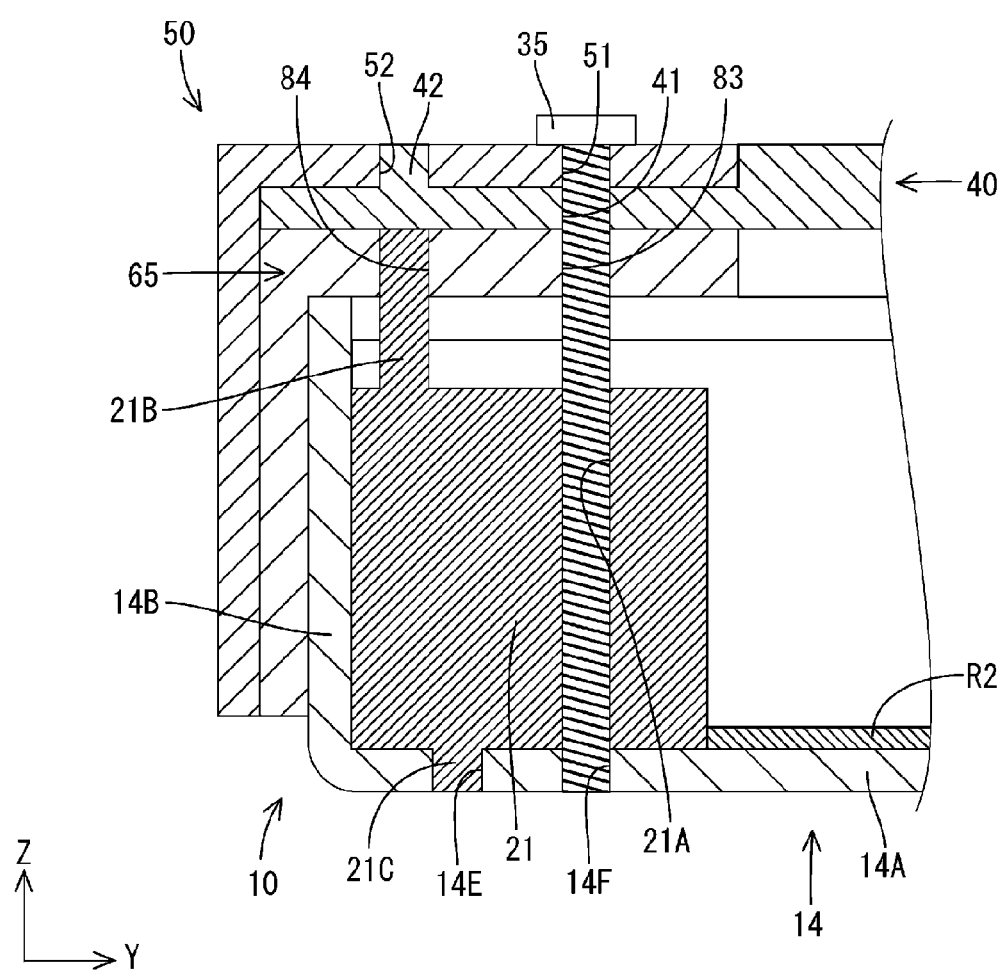
FIG. 19 is a cross-sectional view illustrating the attachment structure of the bezel and the frame in relation to the chassis (corresponding to a view a cut along the line C-C in FIG. 7)

A screw attachment hole 21A is provided in each holder 21 overlapping with the screw insertion holes 51, 41, 83 in plan view. Hereby, as illustrated in FIG. 19, the coupling screw 35 is inserted into the screw insertion holes 51, 41, and 83 in that order, and subsequently further inserted into the screw attachment hole 21A. Thereafter, the coupling screw 35 is attached to a screw attachment hole 14F formed in the bottom panel 14A of the chassis 14. As a result, the frame 60 and the bezel 30 are fastened together to the chassis 14.

As illustrated in FIG. 2 and FIG. 19, each holder 21 on the chassis 14 includes a columnar protrusion 21B formed protruding from the front side thereof. The protrusion 21B fits into a protrusion through hole 84 formed adjacent to the screw insertion hole 83 in the frame 60 as illustrated in FIG. 19. A projection 21C is also formed on a holder 21; the projection 21C fits into an attachment hole 14E formed in the bottom panel 14A in the chassis 14. A holder 21 is thereby positioned on the chassis 14. Thus, fitting the protrusion 21B into the protrusion through hole 84 positions the frame 60 on the chassis 14.

Next, effects of the present embodiment are described. In the present embodiment, a display device is provided with an LED 17; a rectangular liquid crystal panel 11 that uses light from the LED 17 for display; a bezel 30; and a frame 60. The bezel 30 forms a rectangular frame following along the outer peripheral edges of the liquid crystal panel 11, and is configured such that a length thereof in a first direction (long side direction or short side direction) is variable. The frame 60 forms a rectangular frame following along the outer peripheral edges of the liquid crystal panel 11, and together with the bezel 30 clamps the outer peripheral edges of the liquid crystal panel 11.

In the present embodiment, the length of the bezel 30 is variable in a first direction (long side direction or short side direction). Therefore the length of the bezel 30 may be varied to coincide with the size of the liquid crystal panel 11, to thereby clamp the outer peripheral edges of the liquid crystal panel 11 between the bezel 30 and the frame 60. In other words, there is no need to produce each size of the bezel 30 corresponding to each size of the liquid crystal panel 11, to thereby suppress an increase in the types of bezels 30. Thus, for instance, when the bezel 30 is produced using a mold, it is possible to reduce the types of molds used.

Additionally the bezel 30 is equipped with a pair of bezel short sides 40 each configured as the short sides of the bezel 30 and extending along the short side direction of the bezel 30. The bezel short sides 40 are configured to be extendable and retractable in the short side direction of the bezel 30.

Extending or retracting the bezel short sides 40 constituting the short sides of the bezel 30 thereby varies the length of the bezel 30 in the short side direction thereof.

Additionally, the bezel short sides 40 are equipped with a first short-side end 43 and a second short-side end 46; the first short-side end 43 includes one end portion of the bezel 30 in the short side direction, and the second short-side end 46 includes the other end portion of the bezel 30 in the short side direction. The second short-side end 46 is attached to the first short-side end 43 so that the second short-side end 46 may slide along the short side direction of the bezel 30 relative to the first short-side end 43.

Sliding the second short-side end 46 along the short side direction of the bezel 30 relative to the first short-side end 43 allows the bezel short sides 40 of the bezel 30 to extend and retract.

A fixing screw 36 is provided for securing the second short-side end 46 to the first short-side end 43. A first screw insertion hole 43B is formed passing through the first short-side end 43 extending along the short side direction of the bezel 30 for receiving the fixing screw 36. A second screw insertion hole 46A is formed in the second short-side end 46 for receiving and attaching the fixing screw 36 thereto.

According to the present embodiment, the fixing screw 36 is inserted into the first screw insertion hole 43B and subsequently attached to the second screw insertion hole 46A; thus, the fixing screw 36 secures the second short-side end 46 to the first short-side end 43. The first screw insertion hole 43B extends along the short side direction of the bezel 30. Therefore, the location for attaching the fixing screw 36 may vary within the extension length of the first screw insertion hole 43B. Thus, the length of the bezel short sides 40 may be continuously varied by sliding the second short-side end 46 relative to the first short-side end 43 for the extension length of the first screw insertion hole 43B.

The bezel 30 is modularly configured from a pair of bezel short sides 40, and a pair of bezel long sides 50; the bezel long sides 50 extend along the long side direction of the bezel 30, configuring each of the long sides of the aforementioned bezel 30. Adjacent bezel short sides 40 and bezel long sides 50 are coupled at the corner sections of the bezel 30.

Given that the bezel 30 is modularly configured by the pair of bezel short sides 40, and the pair of bezel long sides 50, the ease of molding the bezel short sides 40 and the bezel long sides 50 increases compared to when, for instance, the pair of bezel short sides 40 and the pair of bezel long sides 50 are respectively molded as a single piece. The modular configuration makes it easier to provide bezel short sides 40 and bezel long sides 50 configured to extend and retract along an extension direction.

The bezel 30 is configured to have a variable length along the long side direction. Thus, even when the respective lengths in the short side direction and the long side direction of the liquid crystal panel 11 vary, the liquid crystal panel 11 may be clamped between the bezel 30 and the frame 60.

The frame 60 is also configured to have a variable length along the short side direction. When the size of the liquid crystal panel 11 changes, the length of the frame 60 may be varied in accordance with the change in the liquid crystal panel 11. Therefore, there is no need to produce each size of a frame 60 corresponding to each size of a liquid crystal display panel, thereby reducing the costs associated with production. Thus, for instance, when the frame 60 is produced using a mold, it is possible to reduce the types of molds used.

The frame 60 is also configured to have a variable length in the long side direction. The size of the bezel 30 and the frame 60 may each be varied even when the respective lengths in the short side direction and the long side direction of the liquid crystal panel 11 varies, thus allowing the frame 60 along with the bezel 30 to clamp the liquid crystal panel 11 therebetween.

In the present embodiment, the size of the bezel 30 and the frame 60 must be adjusted to coincide with the size of the liquid crystal panel 11 provided in the liquid crystal display device 10. For instance, when adjusting the size of the bezel 30 and the frame 60, the bezel 30 and the frame 60 are preferably assembled while held at the desired size using an assembly jig. The assembly jig may be a rectangular panel having the same size as the liquid crystal panel 11 to be used. The backlight device 12 selected may be of an appropriate size corresponding to the size of the liquid crystal panel 11 to be used.

Embodiment 2

Figure 20:
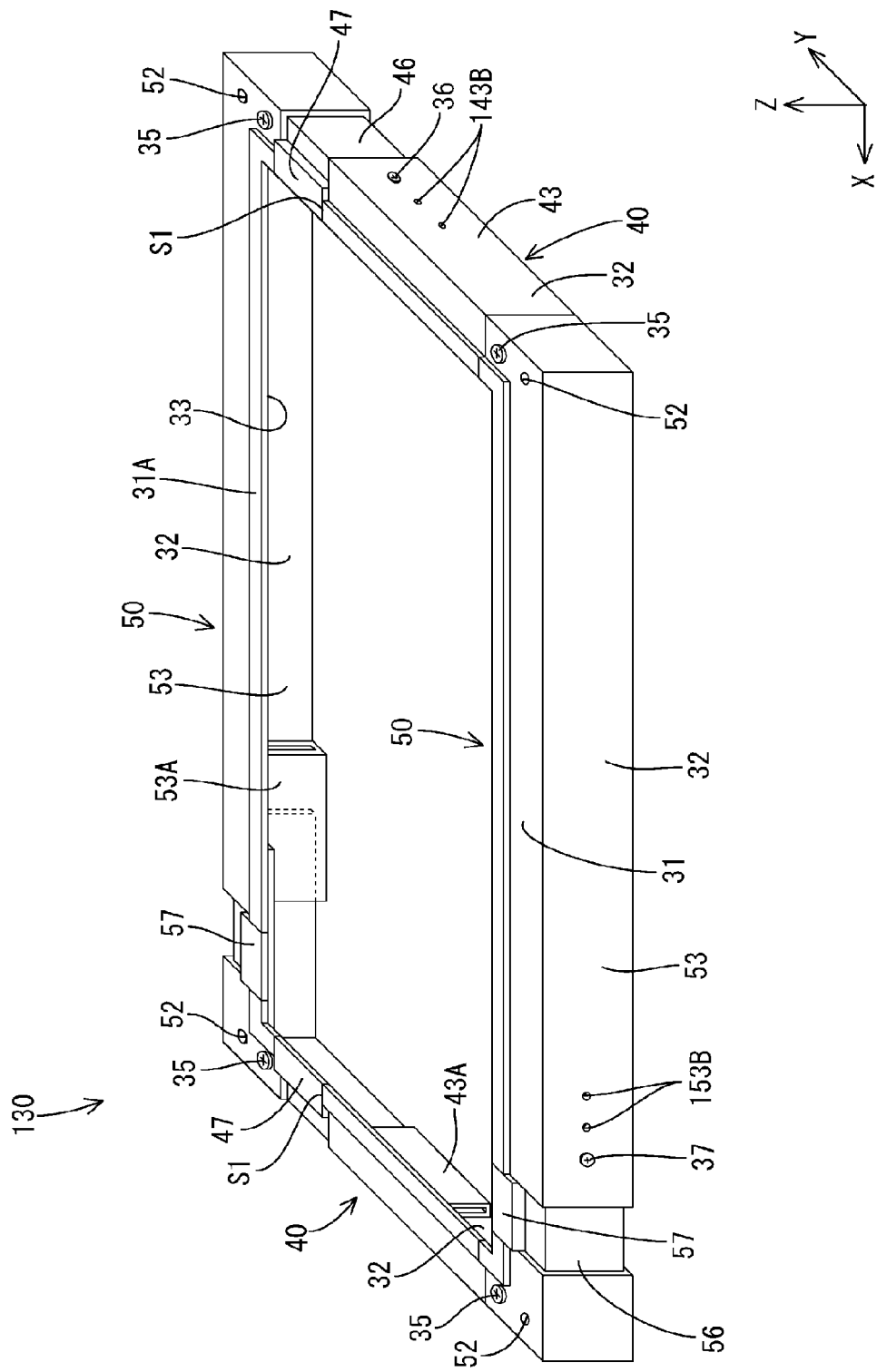
FIG. 20 is a perspective view illustrating a bezel according to Embodiment 2 of the present invention.

Embodiment 2 of the present invention is described using FIG. 20. The configuration of the bezel 130 in Embodiment 2 differs from the bezel in Embodiment 1. The above-mentioned Embodiment 1 presents an example of the first screw insertion holes 43B, 53B as slits. In contrast in Embodiment 2, the first screw insertion hole 143B (and the first screw insertion hole 153B) are not slits, but are, for instance, circular dots, which differ from Embodiment 1.

As illustrated in FIG. 20, a plurality of first screw insertion holes 143B (three dots in FIG. 20) is arranged in the bezel short sides 40 in the extension direction of the first short-side end 43 (Y-axis direction). Hereby, the fixing screw 36 may be inserted into any one of the first screw insertion holes 143B, to couple the first short-side end 43 and the second short-side end 46. In this manner, the length of the bezel short side 40 may be varied in three steps along the extension direction thereof by including the three first screw insertion holes 143B.

A plurality of first screw insertion holes 153B (three dots in FIG. 20) is also arranged in the bezel long sides 50 in the extension direction of the first long-side end 53 (X-axis direction). Hereby, the fixing screw 37 may be inserted into any one of the first screw insertion holes 153B, to couple the first long-side end 53 and the second long-side end 56. In this manner, the length of the bezel long sides 50 may be varied in three steps along the extension direction thereof by including the three first screw insertion holes 153B.

Note, the number of first screw insertion holes 143B, and first screw insertion holes 153B formed are not limited to three. The number of first screw insertion holes 143B, 153B may be modified as appropriate. Additionally, the configuration in Embodiment 2 may also be adopted for the frame 60 (second frame member); that is the configuration of gradually varying the length in the short side direction and the long side direction by providing a plurality of screw insertion holes.

Embodiment 3

Embodiment 3 of the present invention is described using FIGS. 21 to 32. In the above-mentioned Embodiment 1, in the example given, the length of each side (bezel short side, bezel long side) configuring the bezel increases and decreases via a slide mechanism (e.g., a mechanism where the second short-side end 46 slides relative to the first short-side end 43). The length of the bezel in the short side direction and the long side direction may be varied thereby. In contrast, in Embodiment 2 each of the sides (bezel long side 250) configuring the bezel may be exchanged to allow the length of the bezel in the short side direction and the long side direction to be variable.

Figure 21:
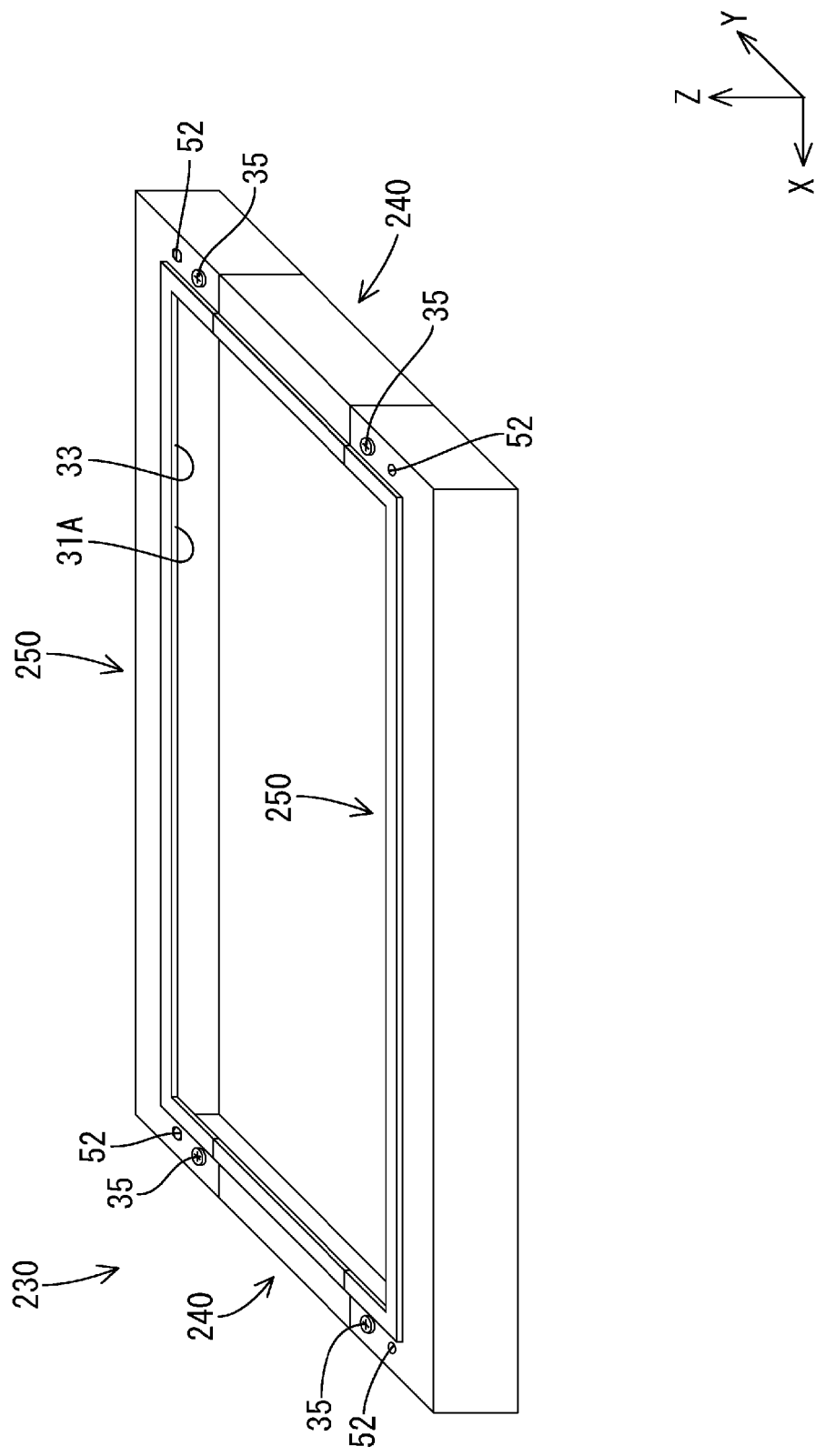
FIG. 21 is a perspective view illustrating a bezel according to Embodiment 3 of the present invention.
Figure 22:
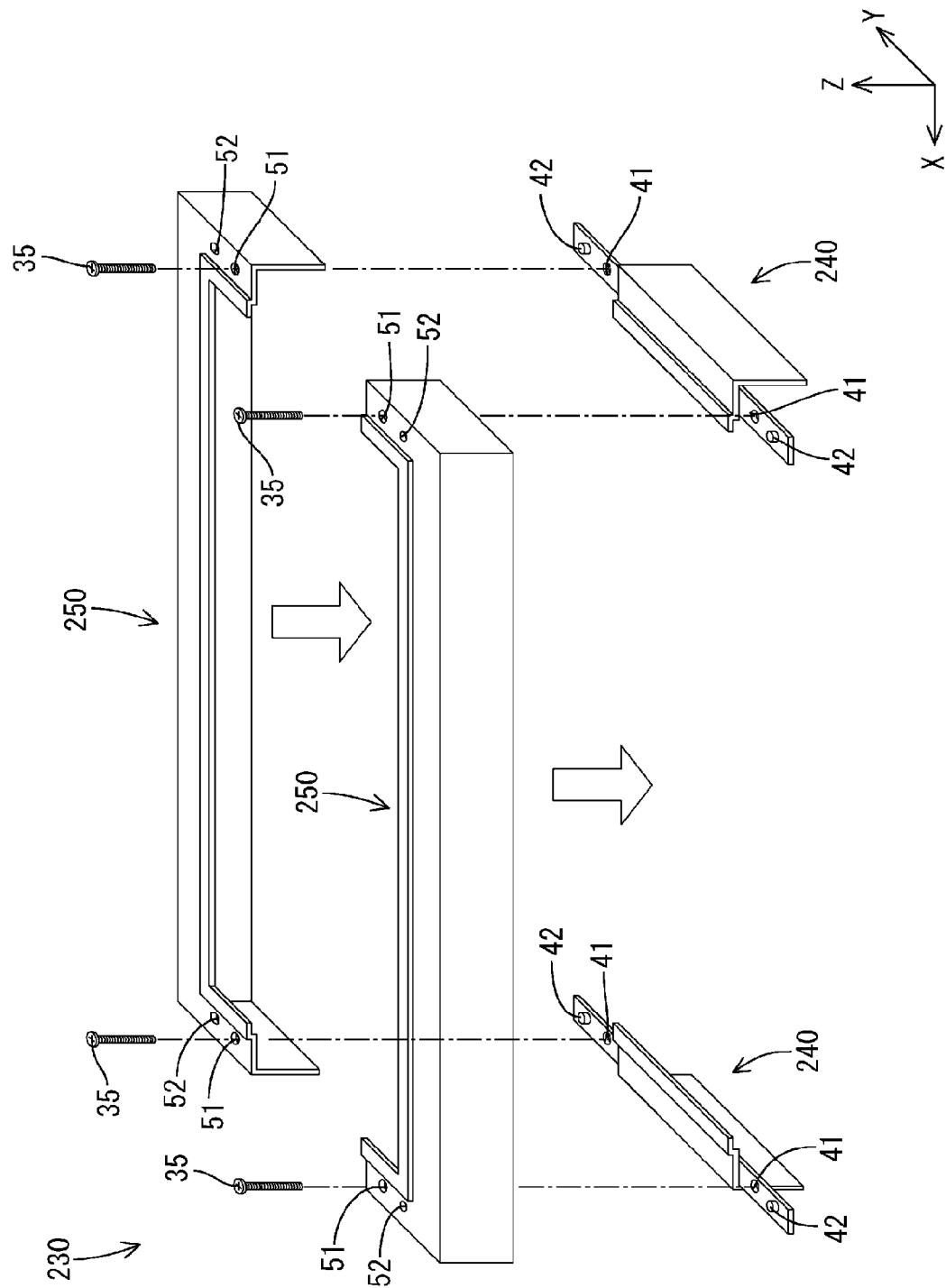
FIG. 22 is an exploded perspective view illustrating the bezel according to Embodiment 3.

The bezel 230 in Embodiment 3 is modularly configured from a pair of bezel short sides 240, and a pair of bezel long sides 250 as illustrated in FIG. 21 and FIG. 22. Similar to the above-mentioned embodiments, the adjacent bezel short side 240 and the bezel long side 250 are coupled to each other by inserting the protrusions 42 into the protrusion through holes 52 and thereafter inserting the coupling screws 35.

Figure 23:
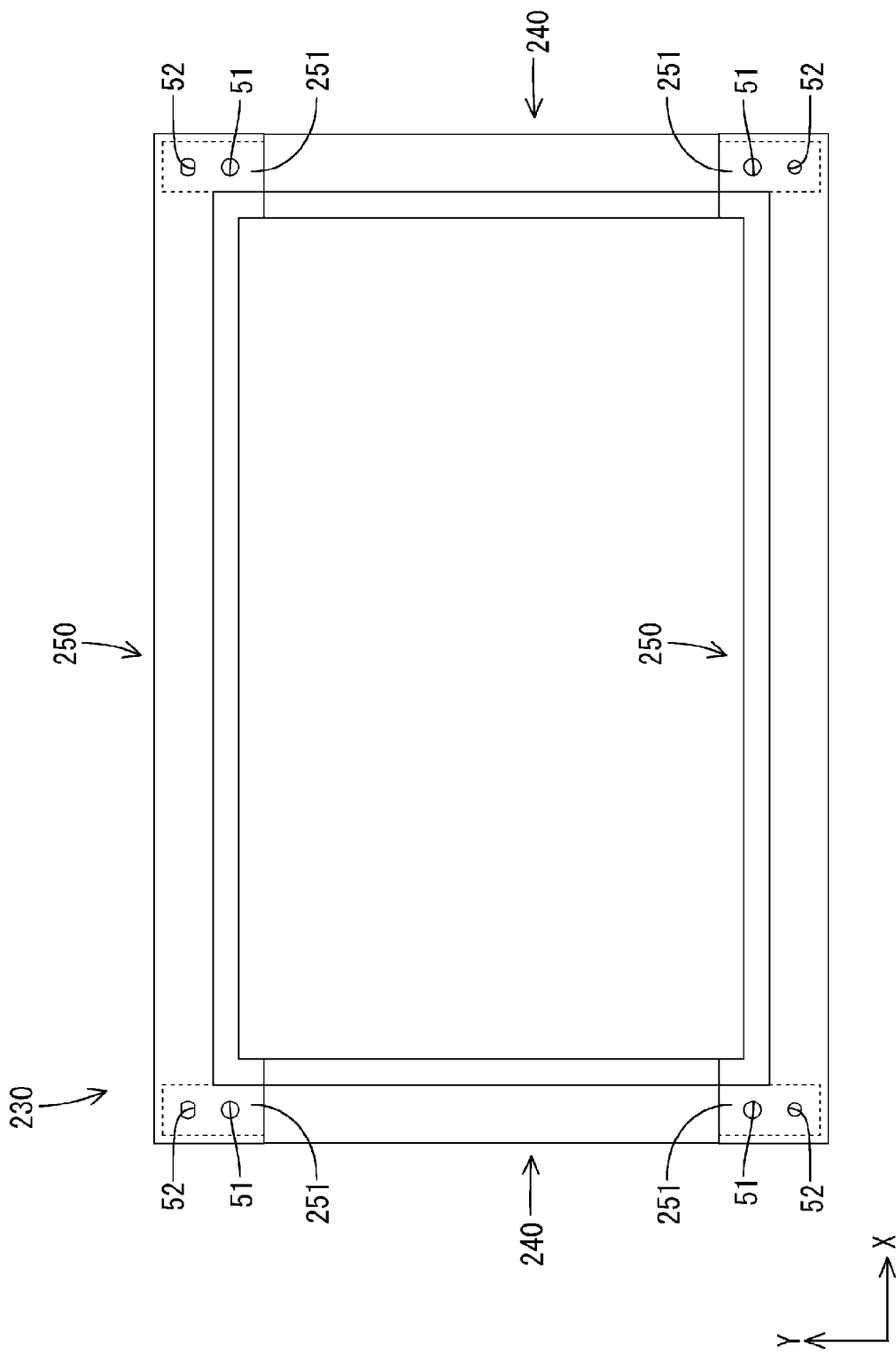
FIG. 23 is a plan view of the bezel according to Embodiment 3 when viewed from the front.

In Embodiment 3, the pair of bezel long sides 250 illustrated in FIG. 23 is exchanged to vary the length of the bezel 230 in the short side direction and the long side direction respectively.

Figure 24:
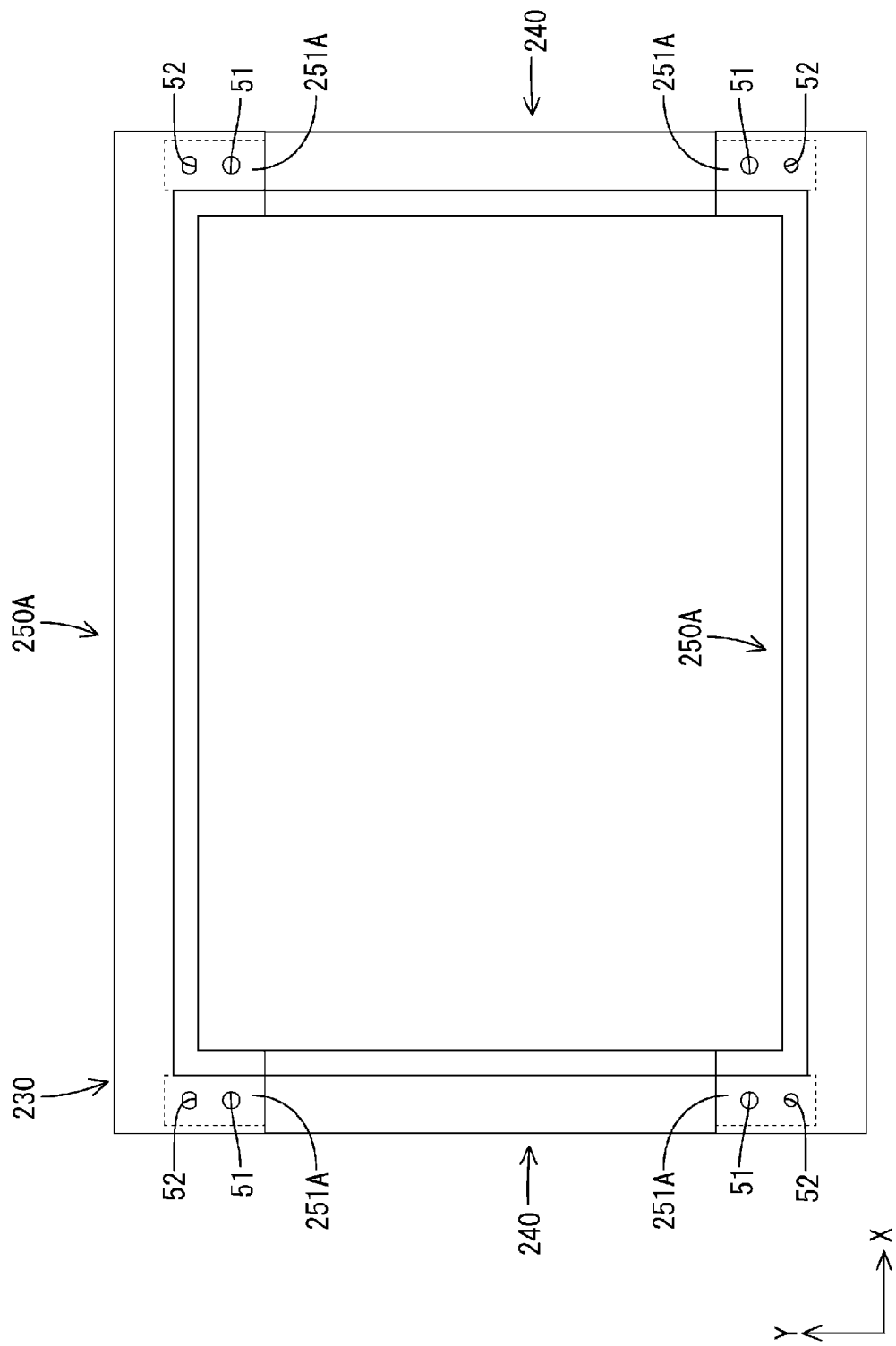
FIG. 24 is a plan view of the bezel in FIG. 23 illustrating when the bezel is extended on the short sides.

For example, as illustrated in FIG. 24, using the bezel long side 250A instead of the bezel long side 250 increases the length of the bezel 230 in the short side direction (Y-axis direction). In plan view, each of the end portions of the bezel long side 250 and the bezel long side 250A in the X-axis direction are bent with respect to the center portion of the bezel long sides to face the bezel short sides 240. Each of the end portions 251A, 251A (bent portions) of the bezel long side 250 in the X-axis direction are longer in the Y-axis direction than each of the end portions 251, 251 of the bezel long side 250 in the X-axis direction.

Figure 25:
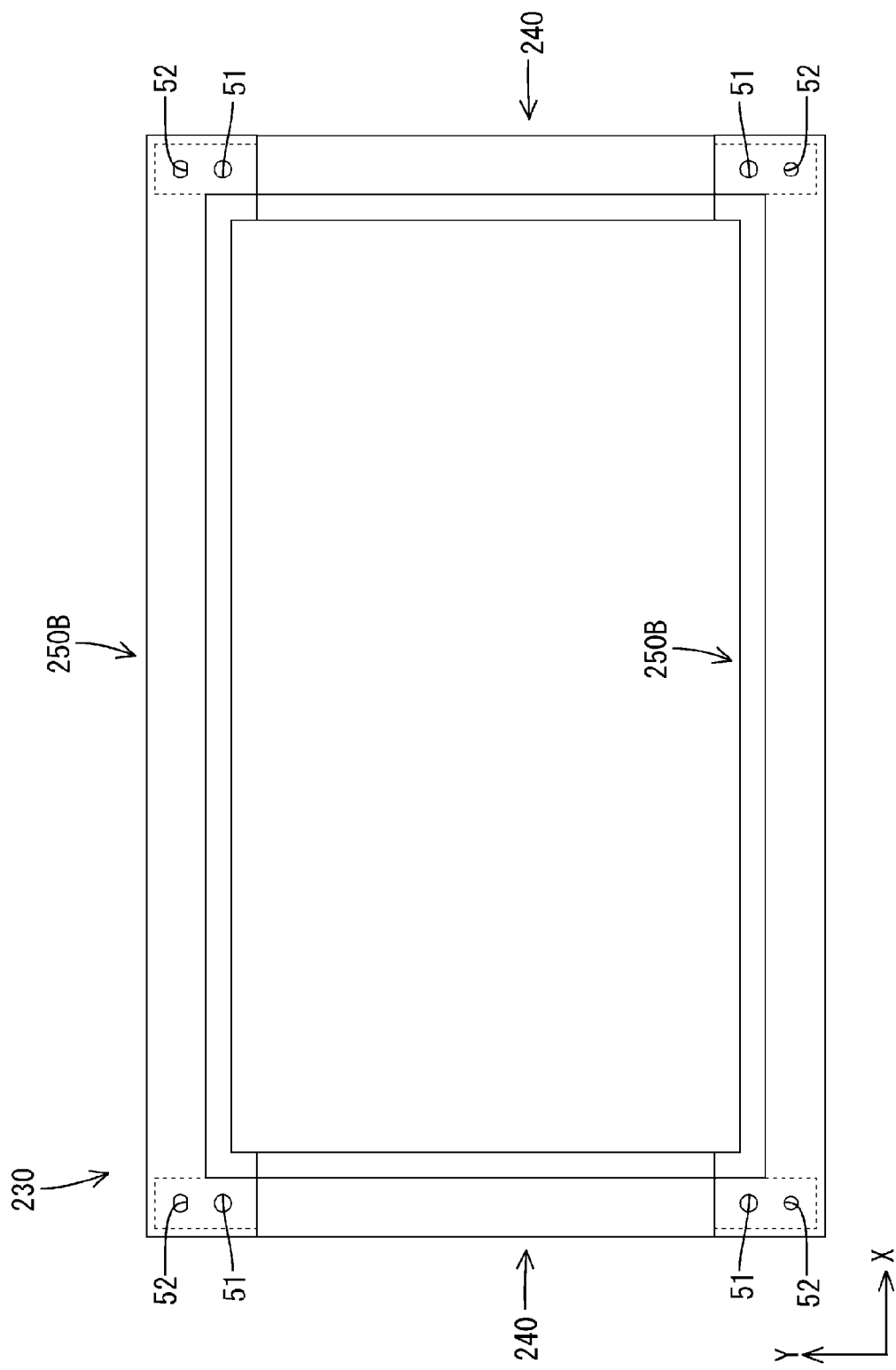
FIG. 25 is a plan view of the bezel in FIG. 23 illustrating when the bezel is extended on the long sides.

As further illustrated in FIG. 25, using the bezel long side 250B instead of the bezel long side 250 increases the length of the bezel 230 in the long side direction (X-axis direction); the bezel long side 250B is longer than the bezel long side 250 in the X-axis direction.

Figure 26:
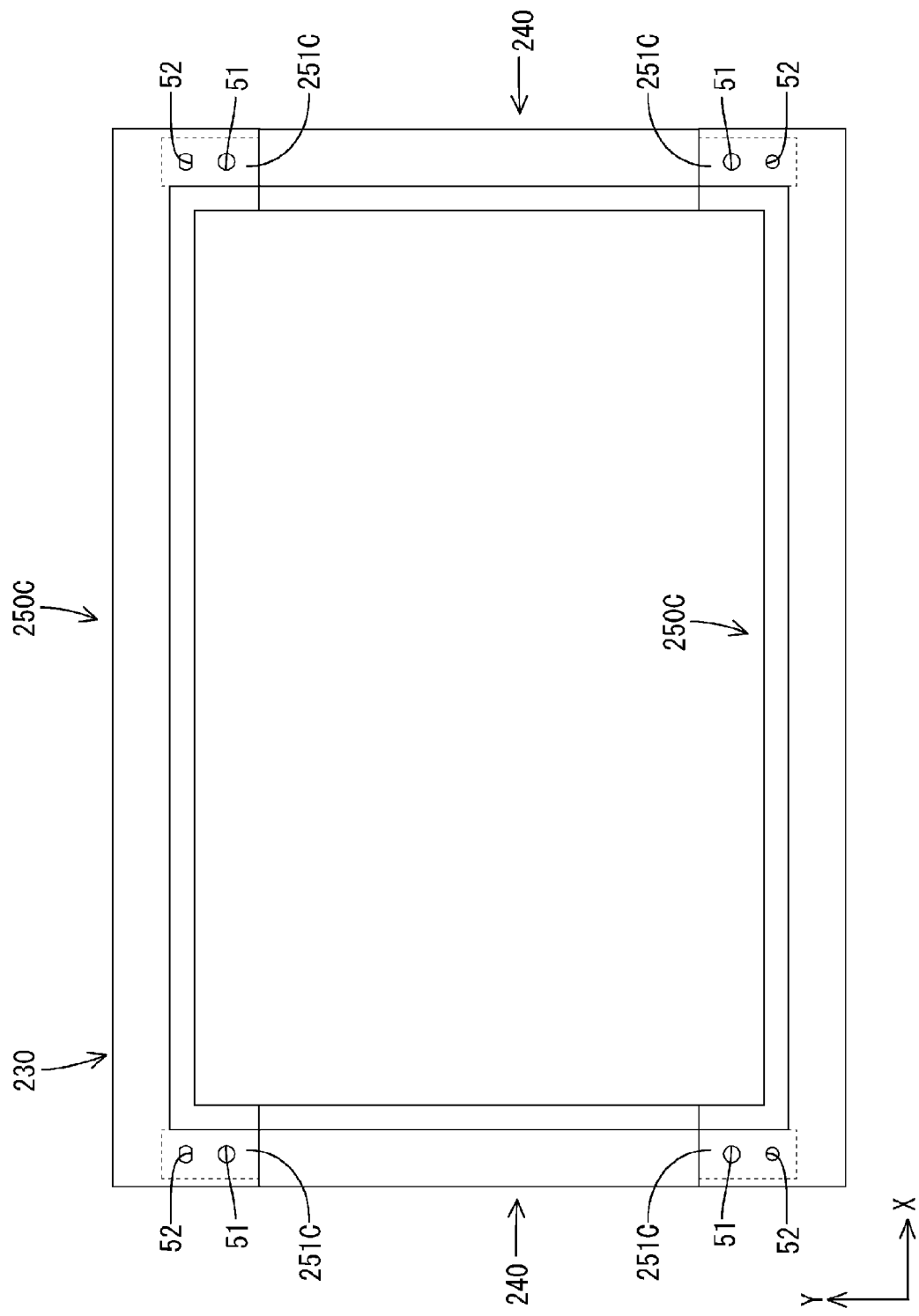
FIG. 26 is a plan view of the bezel in FIG. 23 illustrating when the bezel is extended on the long and the short sides.

As further illustrated in FIG. 26, using the bezel long side 250C instead of the bezel long side 250 illustrated in FIG. 23 increases the length of the bezel 230 in the long side direction (X-axis direction) and in the short side direction (Y-axis direction); the bezel long side 250C is longer in the X-axis direction, and at each of the end portions 251C, 251C thereof in the Y-axis direction than the bezel long side 250.

In this manner, in Embodiment 3, the bezel long sides 250, 250A, 250B, 250C of different lengths are prepared; the bezel long sides are appropriately selected in accordance with the size of the liquid crystal panel 11 to be used so that the bezel corresponds to the different sizes of the liquid crystal panel 11. Additionally, according to Embodiment 3, only the bezel long sides 250 are exchanged to change the size of the bezel 230. In other words, it is preferable that there is no need to change the bezel short sides 240.

Similar to the bezel 230, in Embodiment 3, each of the sides (frame long side 280) configuring the frame 260 may be exchanged to allow the length of the frame 260 in the short side direction and the long side direction to be variable.

Figure 27:
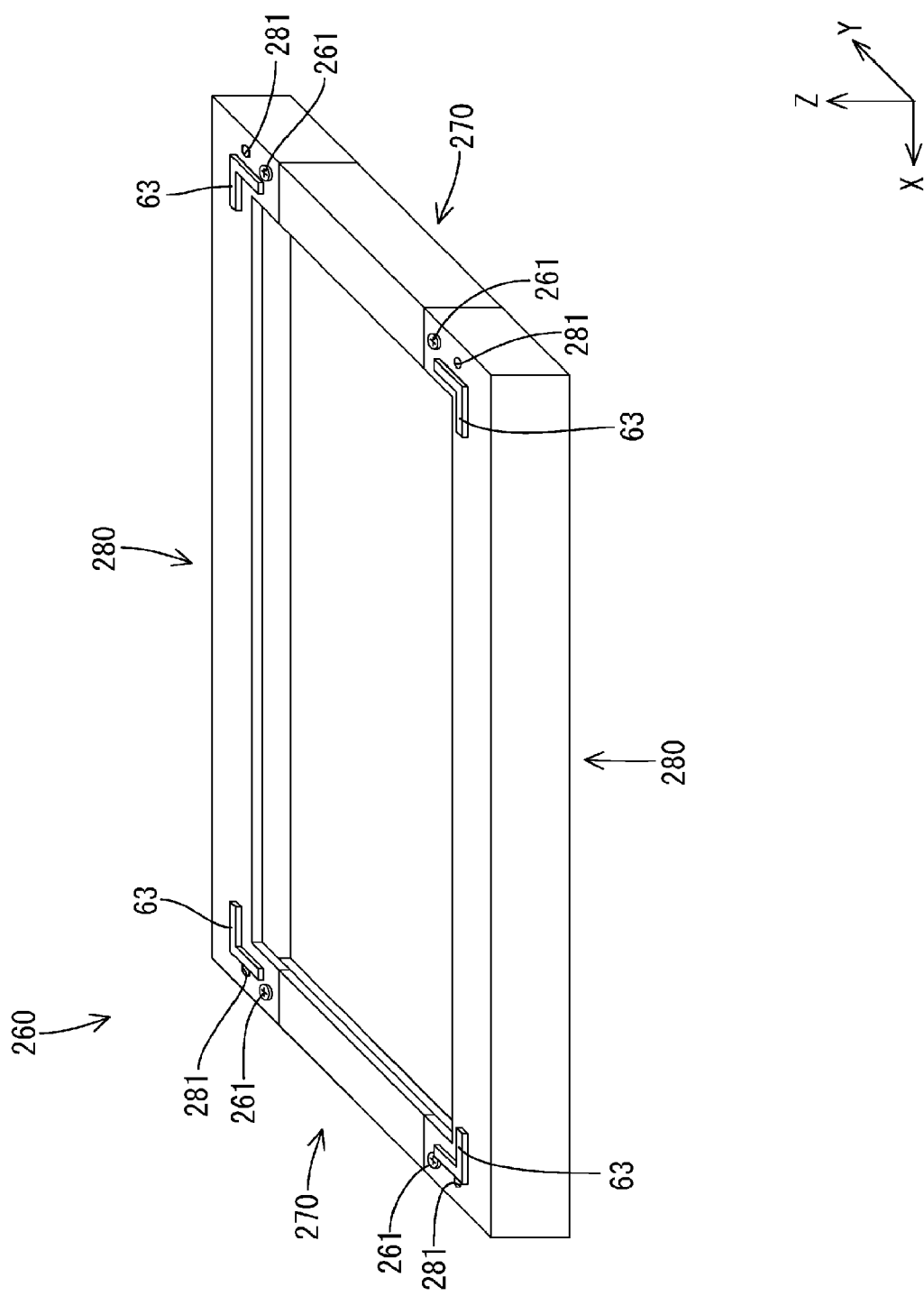
FIG. 27 is a perspective view illustrating a frame according to Embodiment 3 of the present invention.
Figure 28:
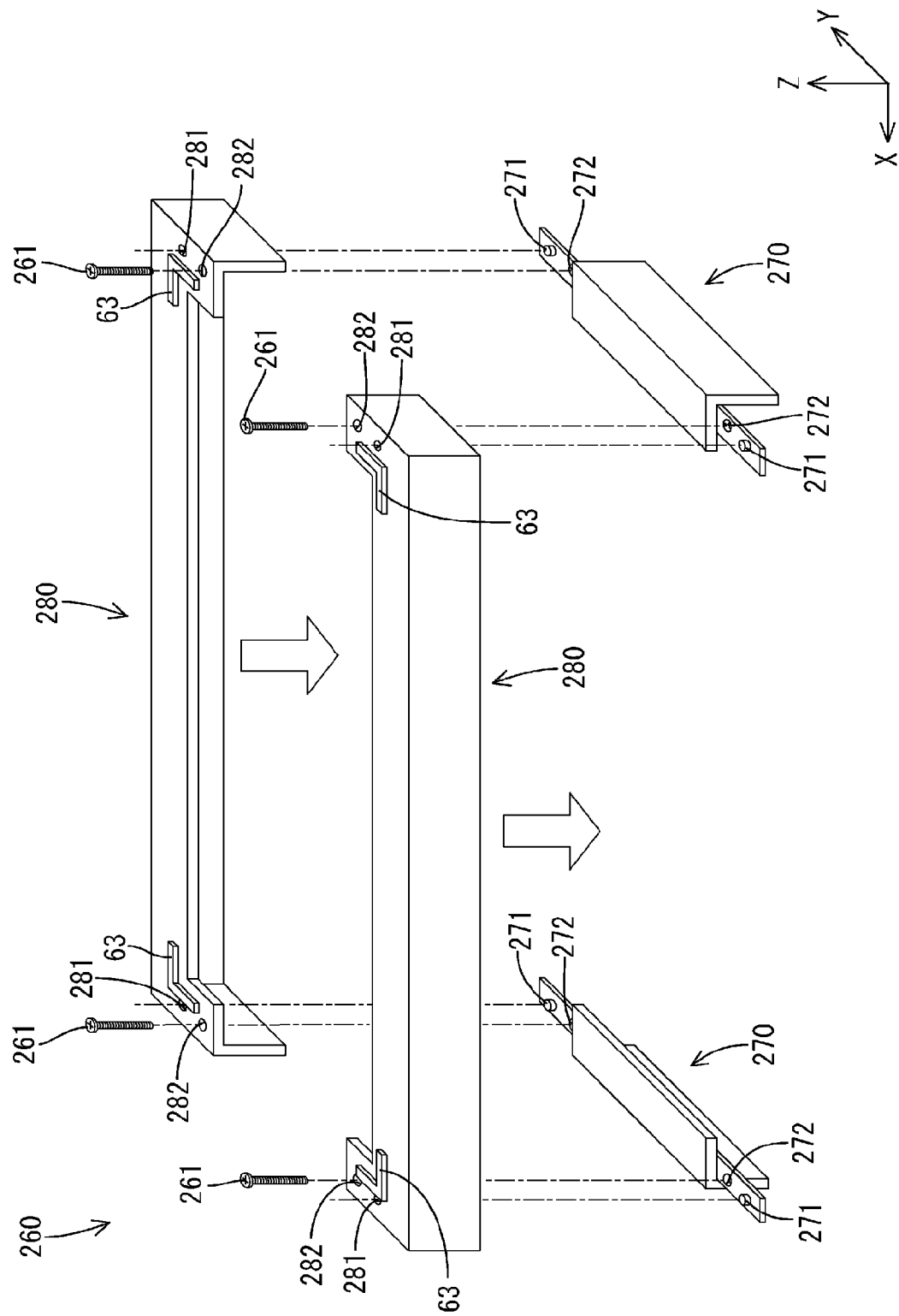
FIG. 28 is an exploded perspective view illustrating the frame according to Embodiment 3.

As illustrated in FIG. 27 and FIG. 28, the frame 260 is modularly configured from a pair of frame short sides 270, and a pair of frame long sides 280. As illustrated in FIG. 28, each of the end portions in the extension direction of the frame short sides 270 includes protrusions 271 formed therein; the protrusions 271 protrude toward the frame long sides 280. Similarly, each of the end portions of the frame long sides 280 include a protrusion through hole 281 formed passing therethrough. The protrusion through hole 281 is for receiving the protrusion 271.

An adjacent frame short side 270 and frame long side 280 are coupled to each other by inserting the protrusion 271 into the protrusion through hole 281, and then inserting a coupling screw 261 into both a screw insertion hole 282 provided in the frame long side 280 and a screw insertion hole 272 provided in the frame short side 270. The screw insertion hole 282, and the screw insertion hole 272 may be configured to receive the coupling screw 35 used in the bezel 230; the bezel 230 and the frame 260 may be configured to fasten together via the coupling screw 35.

In Embodiment 3 exchanging the pair of frame long sides 280 varies the length of the frame 260 in the short side direction and the long side direction respectively.

Figure 29:
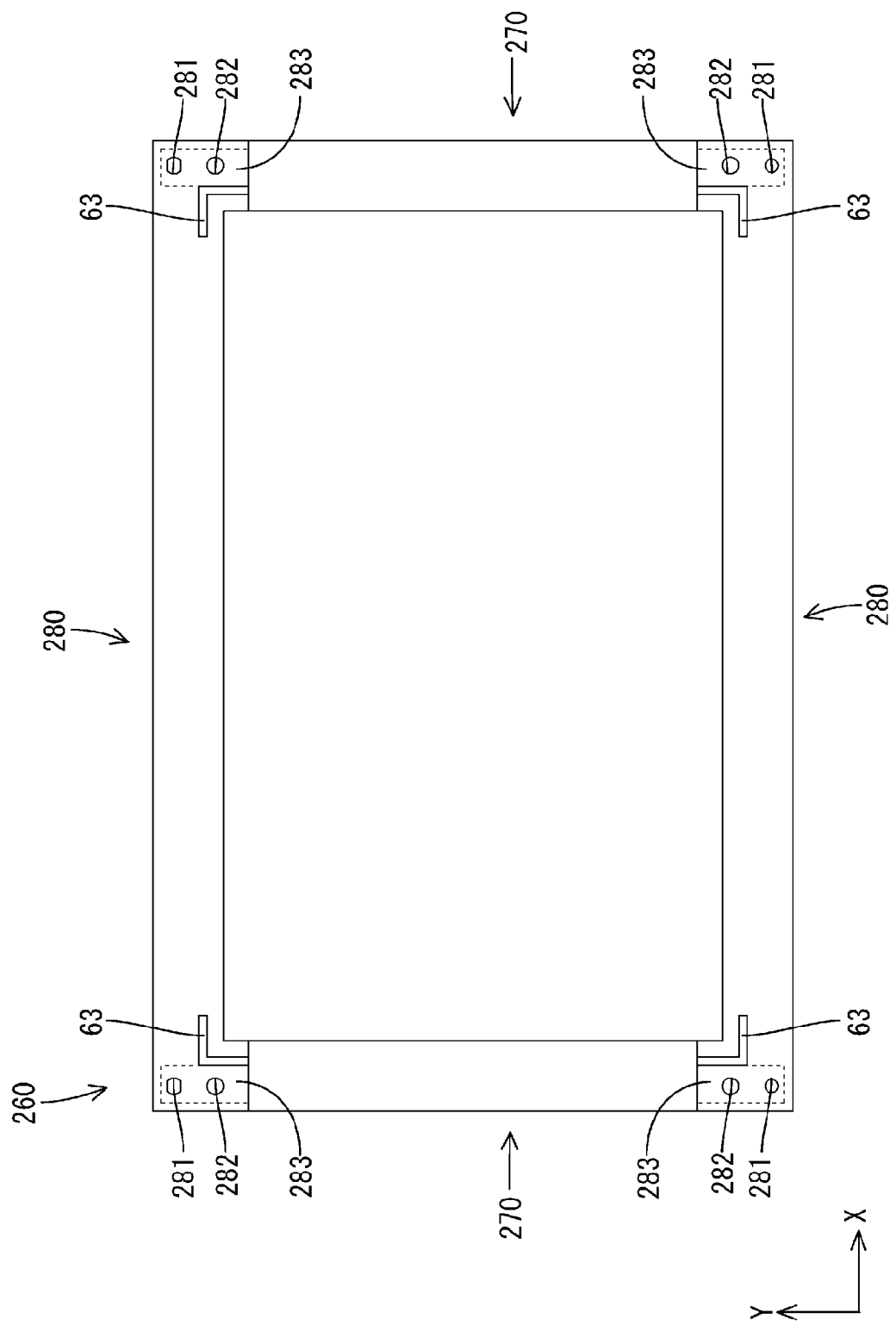
FIG. 29 is a plan view of the frame according to Embodiment 3 when viewed from the front.
Figure 30:
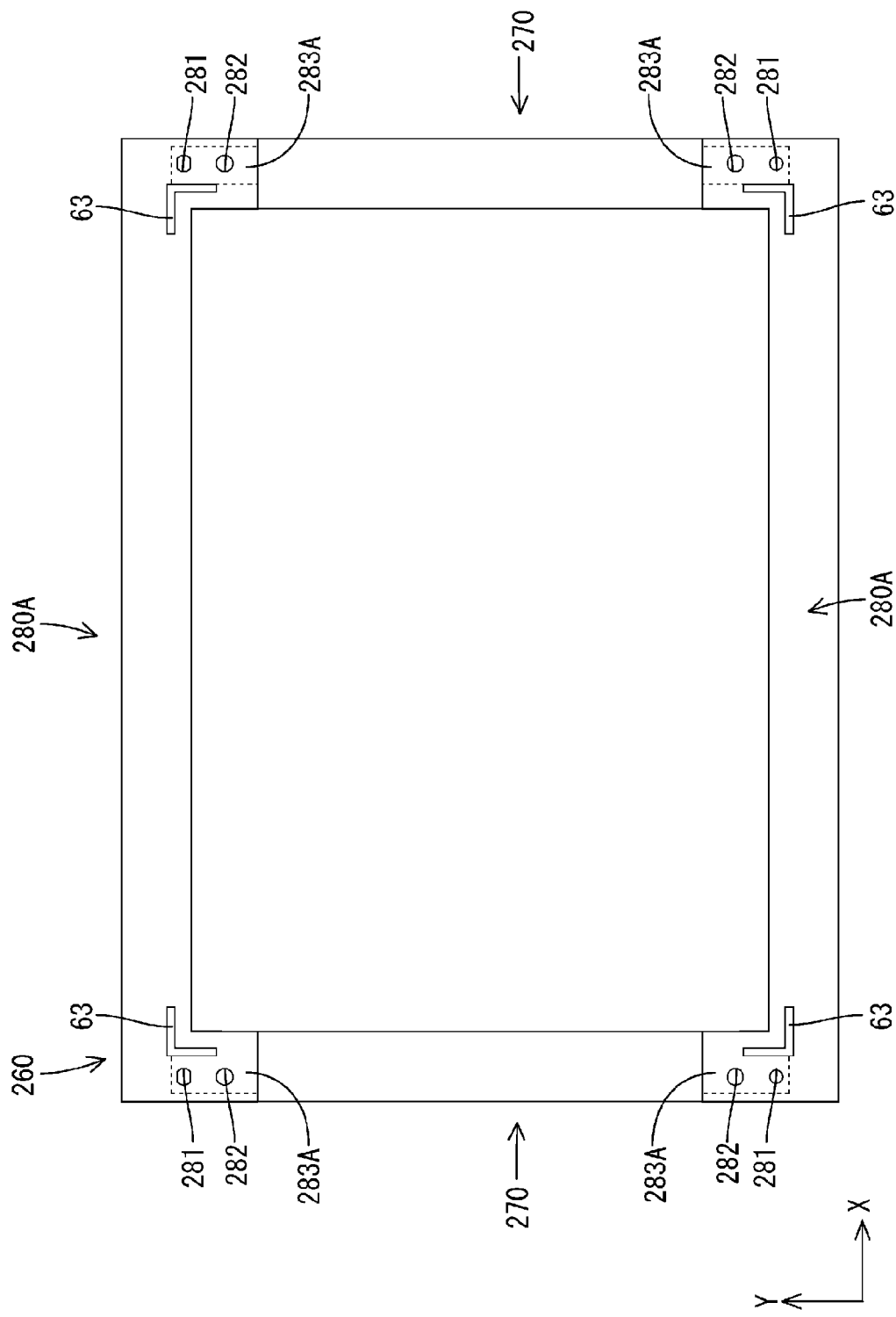
FIG. 30 is a plan view of the frame in FIG. 29 illustrating when the frame is extended on the short sides.

For instance, with the size of the frame 260 illustrated in FIG. 29 as a standard size, the length of the frame 260 in the short side direction (Y-axis direction) can be increased by using the frame long sides 280A illustrated in FIG. 30 instead of the frame long sides 280 illustrated in FIG. 29.

In plan view, each of the end of portions of the frame long sides 280 and the frame long sides 280A in the X-axis direction are bent with respect to the center portion. Each of the end portions 283A, 283A (bent portions) of the frame long side 280A in the X-axis direction are longer in the Y-axis direction than each of the end portions 283, 283 of the frame long side 280A in the X-axis direction.

Figure 31:
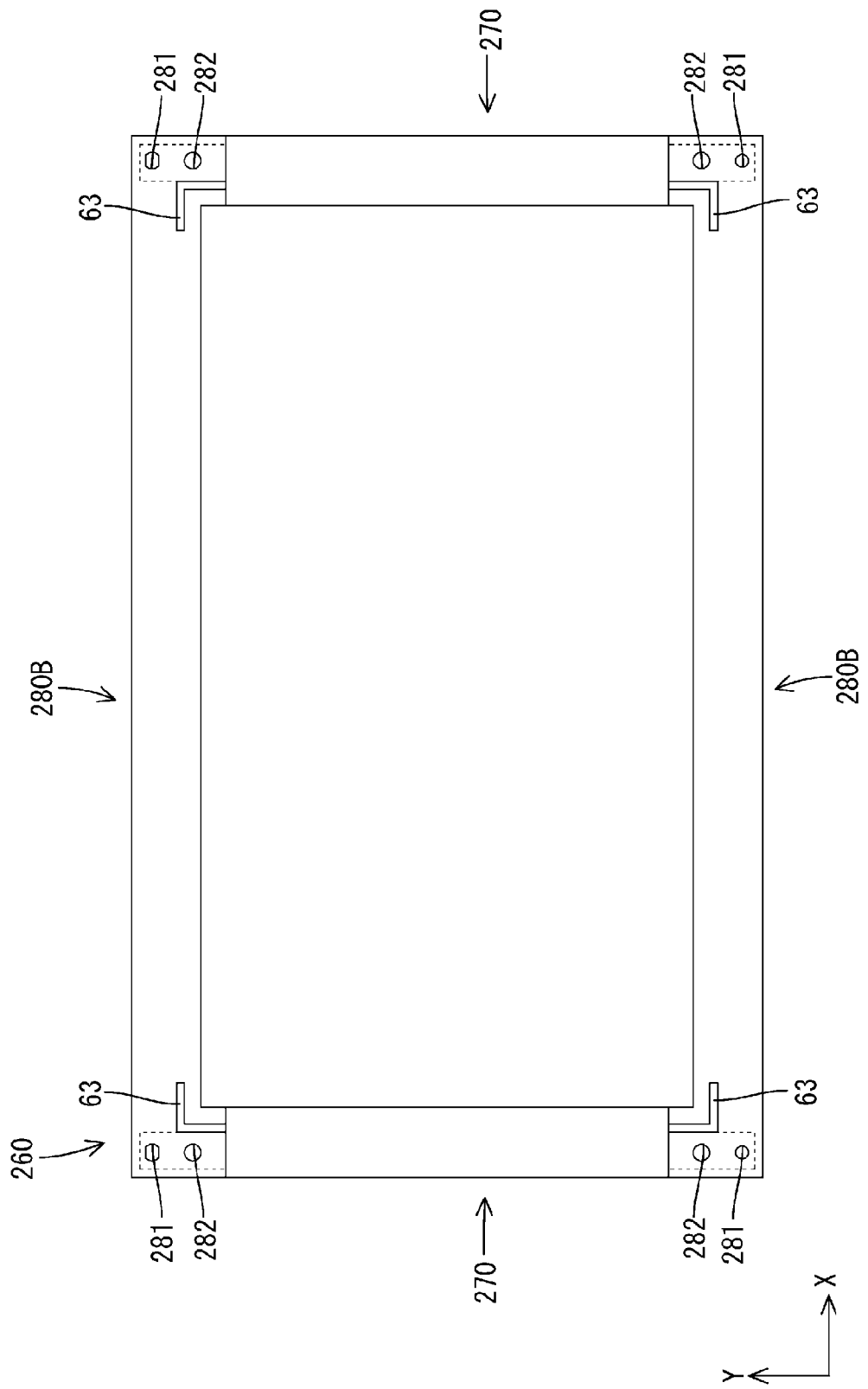
FIG. 31 is a plan view of the frame in FIG. 29 illustrating when the frame is extended on the long sides.

Additionally, as illustrated in FIG. 31, using the frame long side 280B instead of the frame long side 280 increases the length of the frame 260 in the long side direction (X-axis direction); the frame long side 280B is longer than the frame long side 280 in the X-axis direction.

Figure 32:
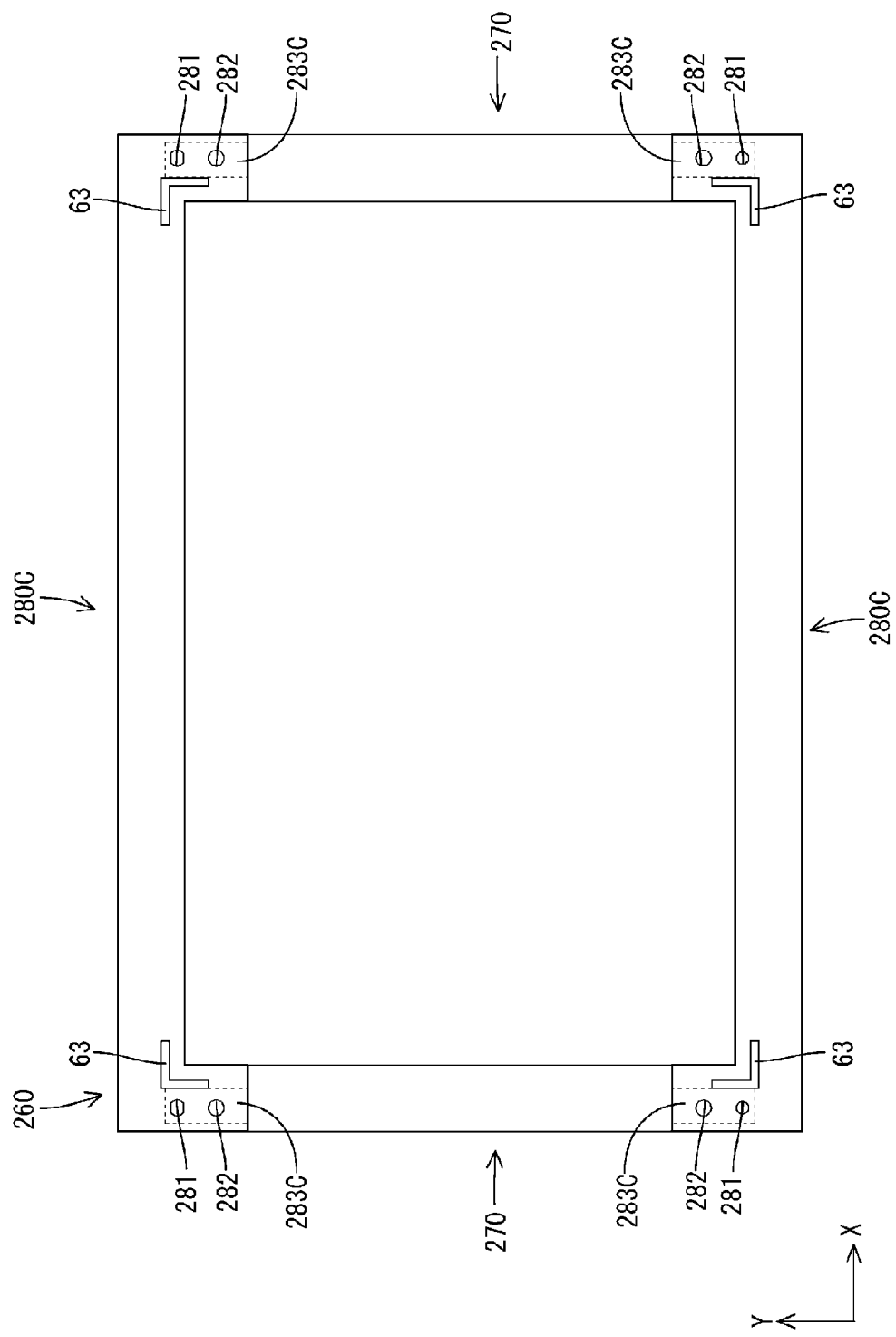
FIG. 32 is a plan view of the frame in FIG. 29 illustrating when the frame is extended on the long and the short sides.

As further illustrated in FIG. 32, using the frame long side 280C instead of the frame long side 280 increases the length of the frame 260 in the long side direction (X-axis direction) and in the short side direction (Y-axis direction); the frame long side 280C is longer in the X-axis direction, and at each of the end portions 283C, 283C thereof in the Y-axis direction than the frame long side 280.

In this manner, in Embodiment 3, the frame long sides to 280, 280A, 280B, 280C of different lengths are prepared; the frame long side is appropriately selected in accordance with the size of the liquid crystal panel 11 to be used so that the frame corresponds to the different sizes of the liquid crystal panel 11. Additionally, only the frame long sides 280 are exchanged to change the size of the frame 260. In other words, it is preferable that there is no need to change the frame short sides 270.

Embodiment 4

Embodiment 4 of the present invention is described using FIGS. 33 to 44. In the above-mentioned Embodiment 3 exchanging the bezel long sides 250 (or the frame long sides 280) allows the length of the bezel 230 (or the frame 260) in the short side direction and the long side direction to be variable. In contrast, Embodiment 4 provides an example of exchanging the short sides of the bezel (or frame) to vary the length of the bezel (or frame) in the short side direction and the long side direction respectively.

Figure 33:
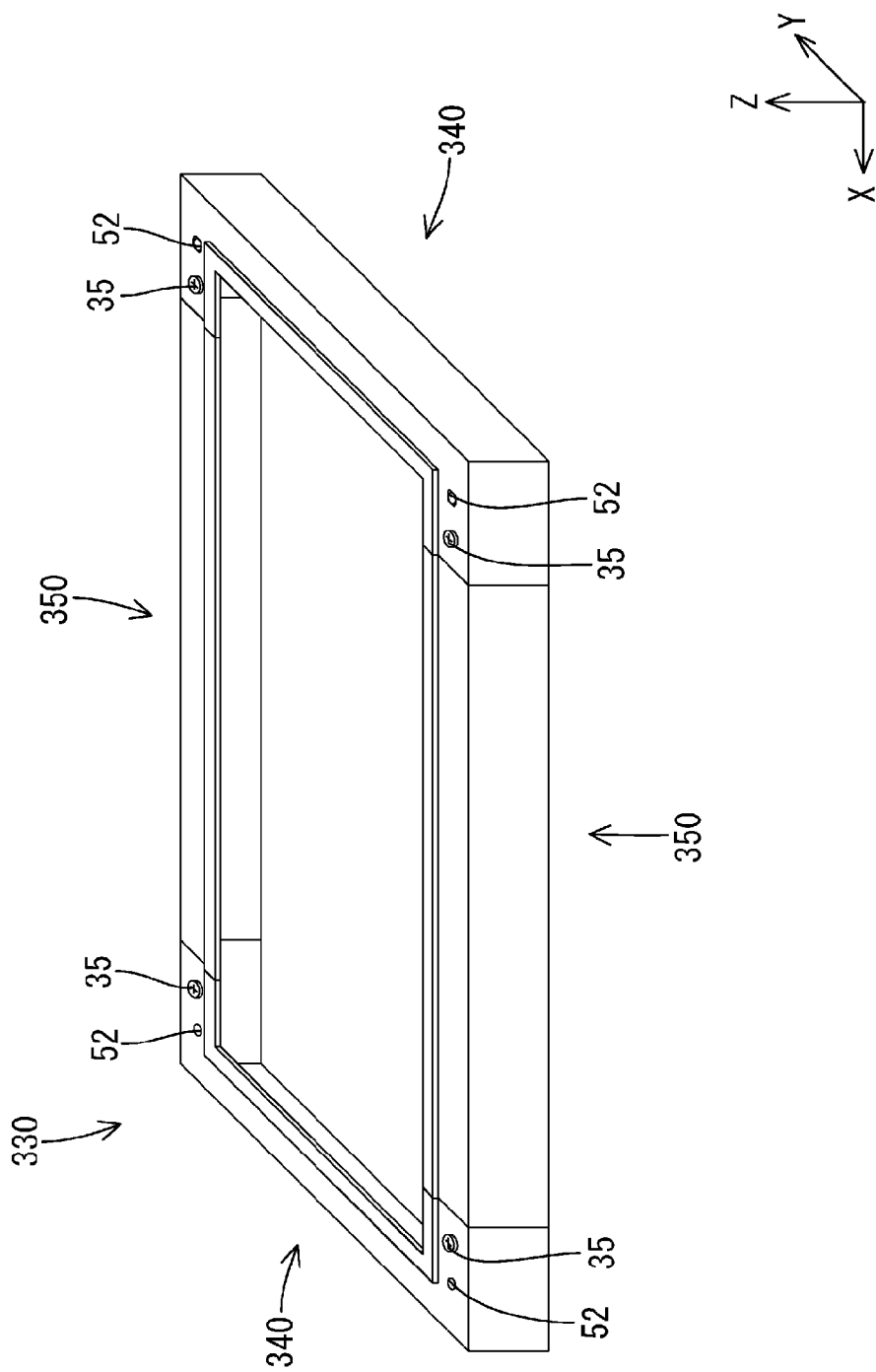
FIG. 33 is a perspective view illustrating a bezel according to Embodiment 4 of the present invention.
Figure 34:
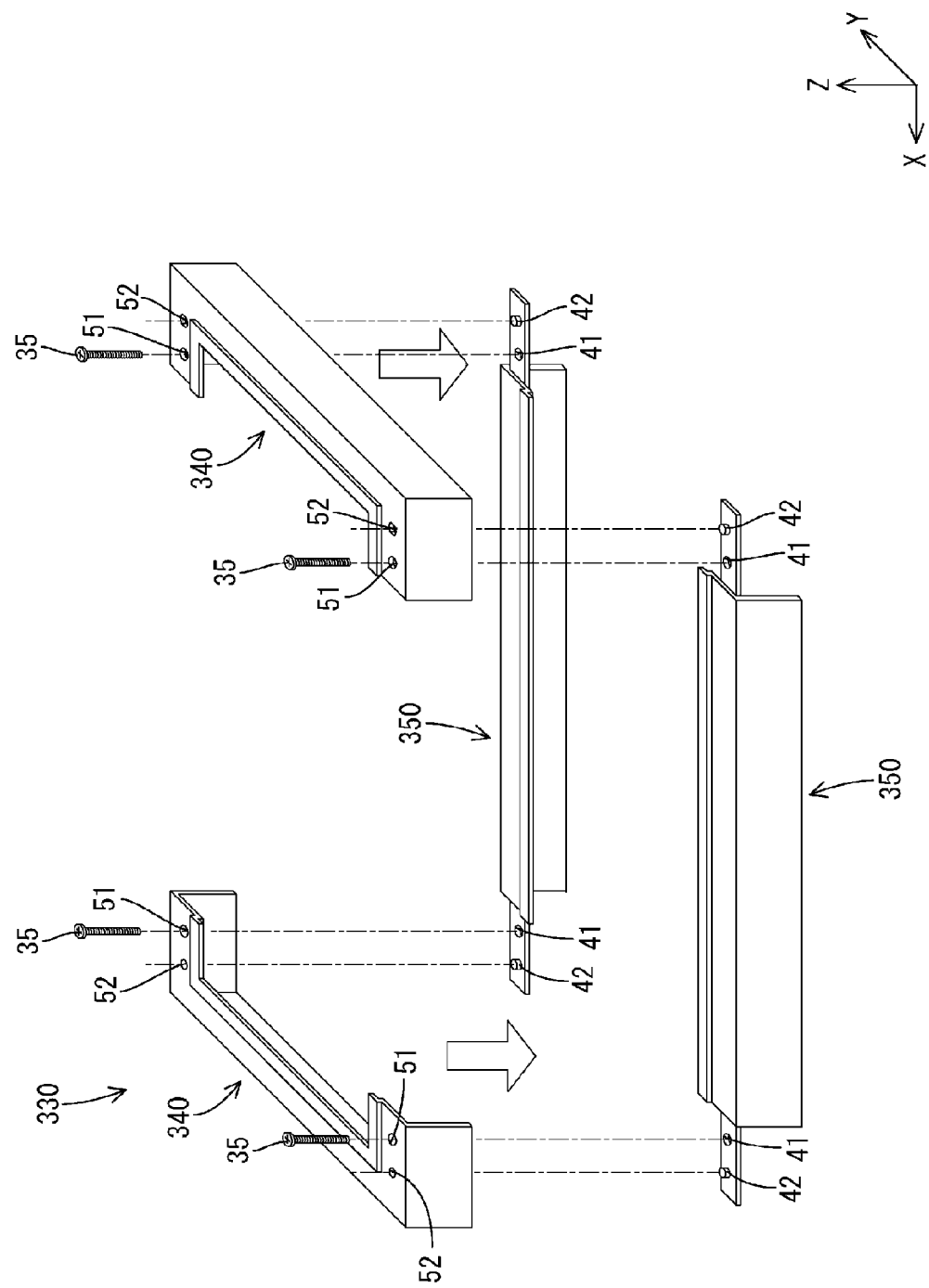
FIG. 34 is an exploded perspective view illustrating the bezel according to Embodiment 4.

The bezel 330 in Embodiment 4 is modularly configured from a pair of bezel short sides 340, and a pair of bezel long sides 350 as illustrated in FIG. 33 and FIG. 34. As illustrated in FIG. 34, each of the end portions in the extension direction of the bezel long sides 350 includes protrusions 42 formed therein; the protrusions 42 protrude toward the bezel short sides 340. Similarly, a protrusion through hole 52 is formed in each end portion in the extension direction of the bezel short sides 340 and is configured to receive a protrusion 42.

An adjacent bezel short side 340 and bezel long side 350 are coupled to each other by inserting the protrusion 42 into the protrusion through hole 52, and then inserting a coupling screw 35 into both a screw insertion hole 51 provided in the bezel short side 340 and a screw insertion hole 41 provided in the bezel long side 350.

Figure 35:
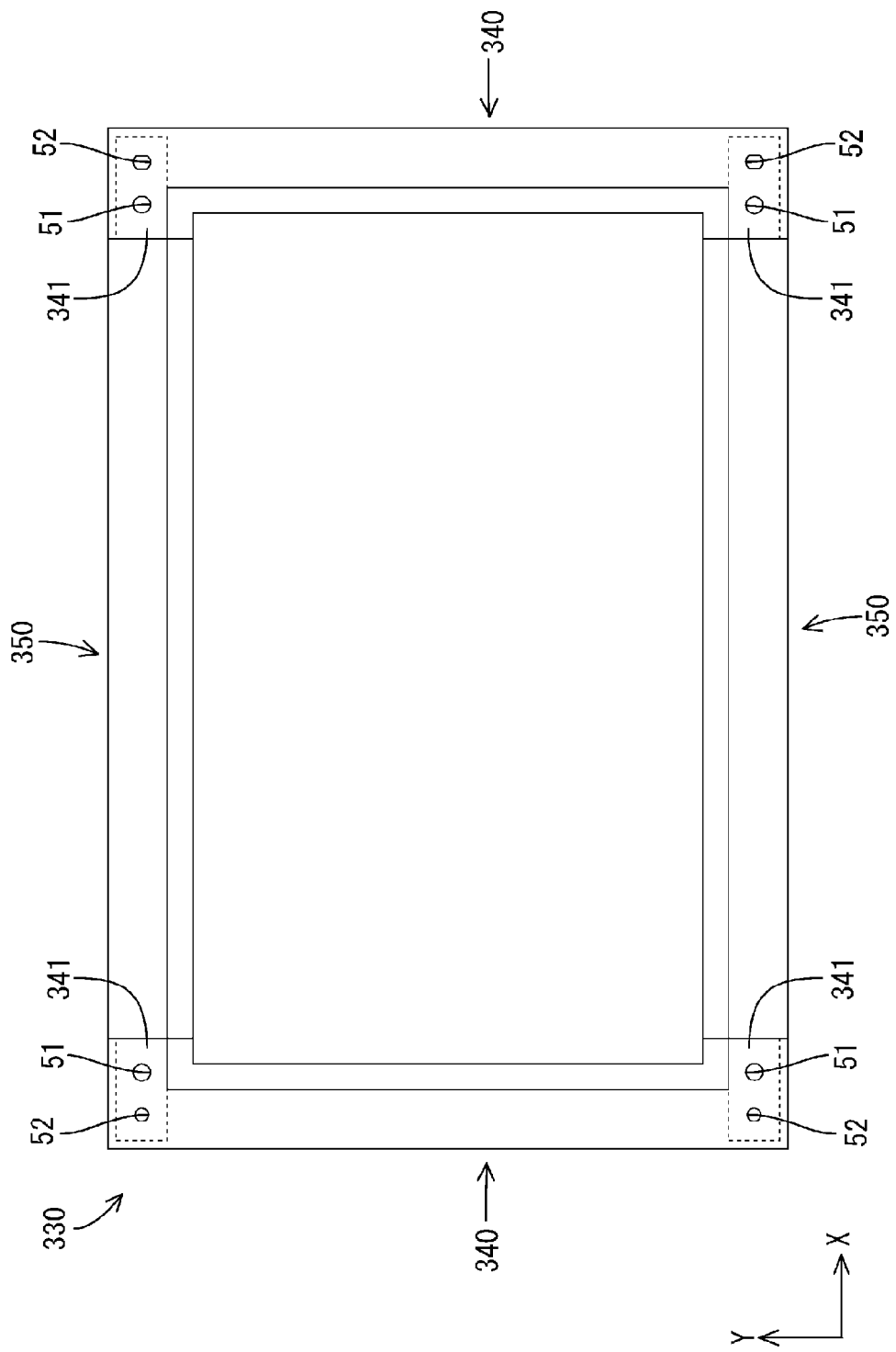
FIG. 35 is a plan view of the bezel according to Embodiment 4 when viewed from the front.

In Embodiment 4, the pair of bezel short sides 340 illustrated in FIG. 35 is exchanged to vary the length of the bezel 330 in the short side direction and the long side direction respectively.

Figure 36:
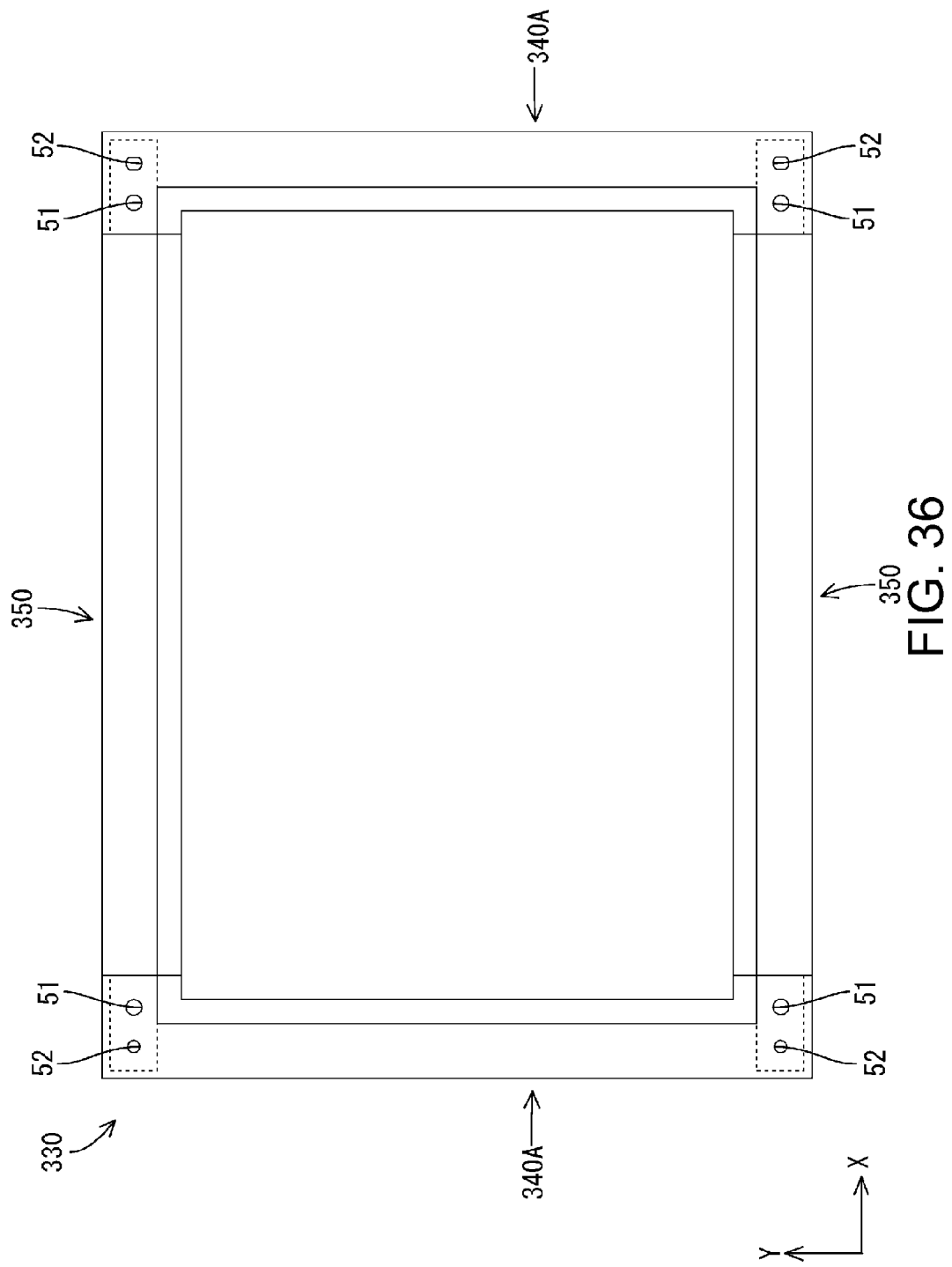
FIG. 36 is a plan view of the bezel in FIG. 35 illustrating when the bezel is extended on the short sides.

For example, as illustrated in FIG. 36, using the bezel short side 340A instead of the bezel short side 340 increases the length of the bezel 330 in the short side direction (Y-axis direction); the bezel short side 340A is longer than the bezel short side 340A in the Y-axis direction.

Figure 37:
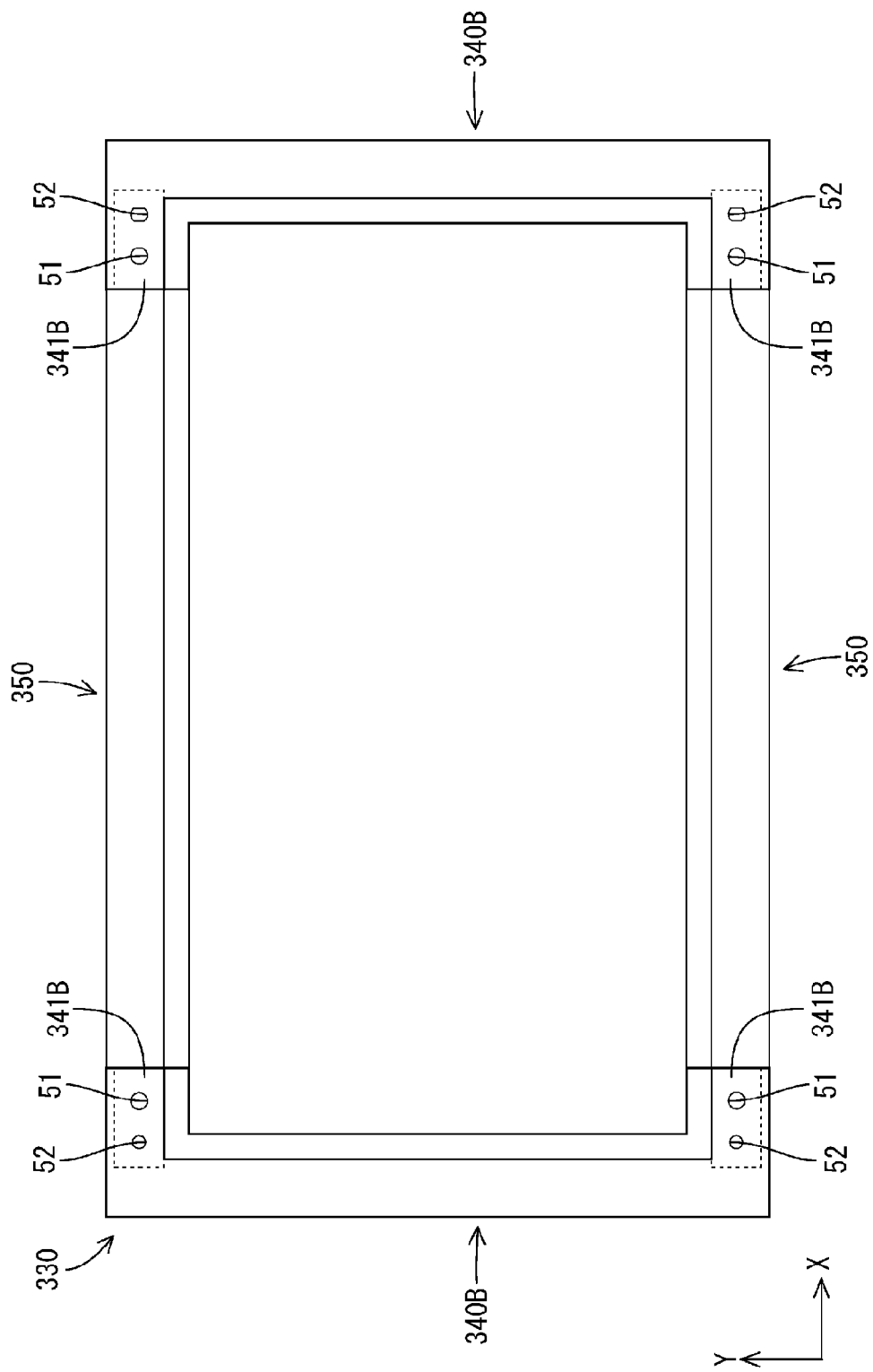
FIG. 37 is a plan view of the bezel in FIG. 35 illustrating when the bezel is extended on the long sides.

As further illustrated in FIG. 37, using the bezel short side 340B instead of the bezel short side 340 increases the length of the bezel 330 in the long side direction (X-axis direction). In plan view, each of the end portions of the bezel short side 340 and the bezel short side 340B in the Y-axis direction are bent with respect to the center portion of the bezel short sides to face the bezel long sides 350. Each of the end portions 341B, 341B (bent portions) of the bezel short side 340B in the Y-axis direction are longer in the X-axis direction than each of the end portions 341, 341 of the bezel short side 340 in the Y-axis direction.

Figure 38:
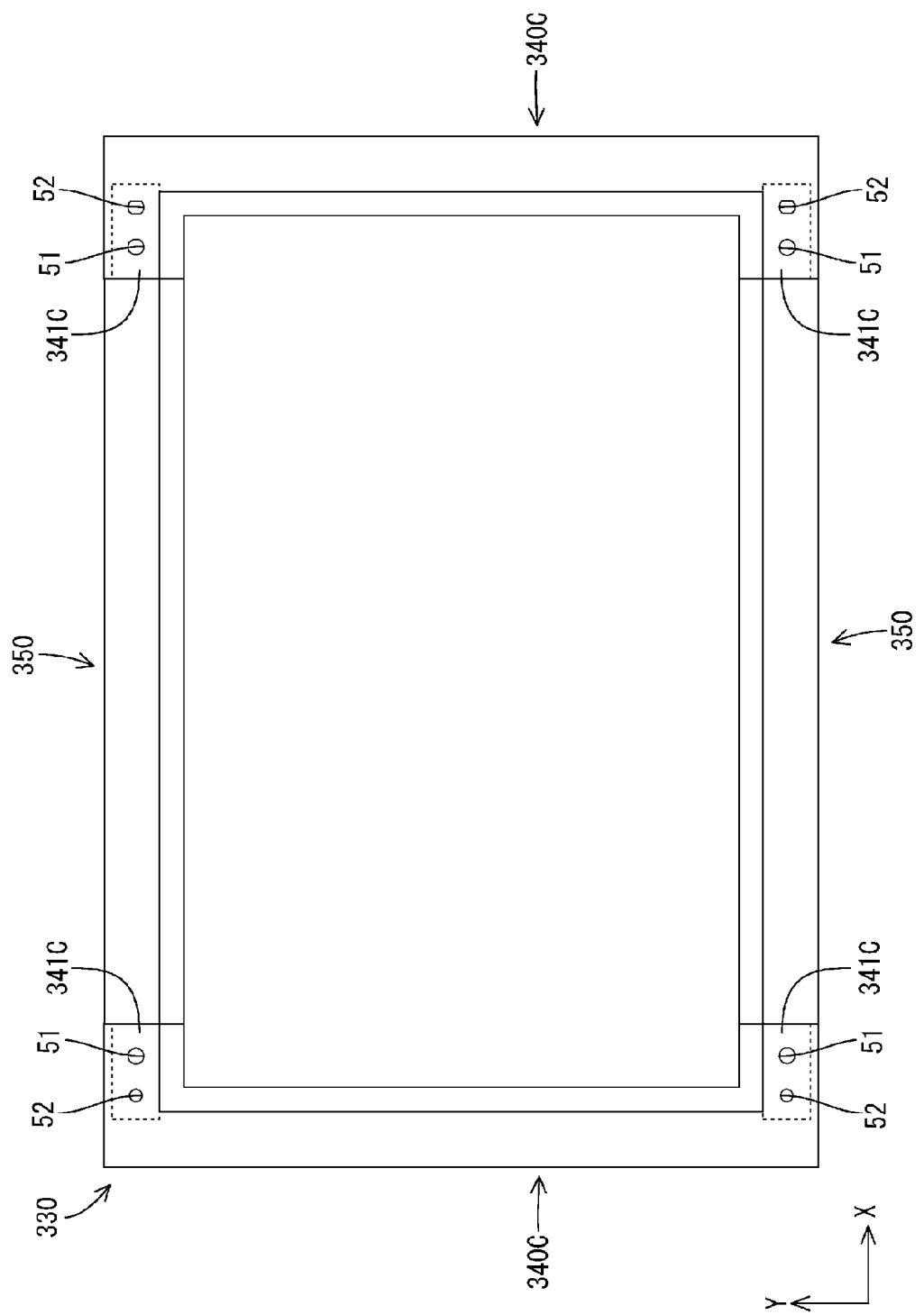
FIG. 38 is a plan view of the bezel in FIG. 35 illustrating when the bezel is extended on the long and the short sides.

As further illustrated in FIG. 38, using the bezel short sides 340C instead of the bezel short sides 340 increases the length of the bezel 330 in the long side direction (X-axis direction) and in the short side direction (Y-axis direction); the bezel short side 340C is longer in the Y-axis direction, and at each of the end portions 341C, 341C thereof in the X-axis direction than the bezel short side 340.

In this manner, in Embodiment 4, the bezel may correspond to the different sizes of liquid crystal display panel 11 by exchanging the bezel short side 340 with other bezel short sides 340A, 340B, 340C. Additionally, only the bezel short sides 340 are exchanged to change the size of the bezel 330. In other words, it is preferable that there is no need to change the bezel long sides 350.

Figure 39:
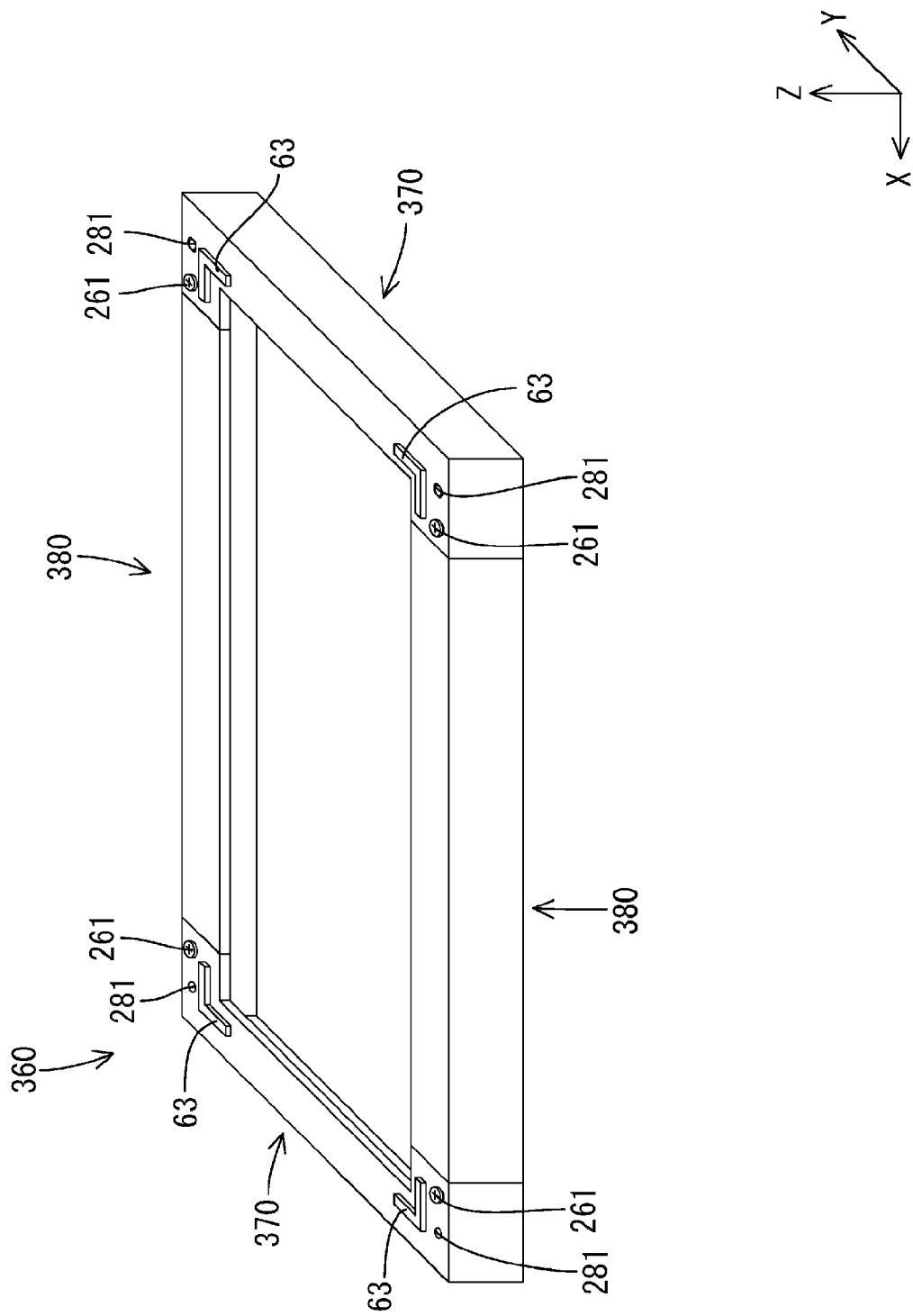
FIG. 39 is a perspective view illustrating a frame according to Embodiment 4 of the present invention.
Figure 40:
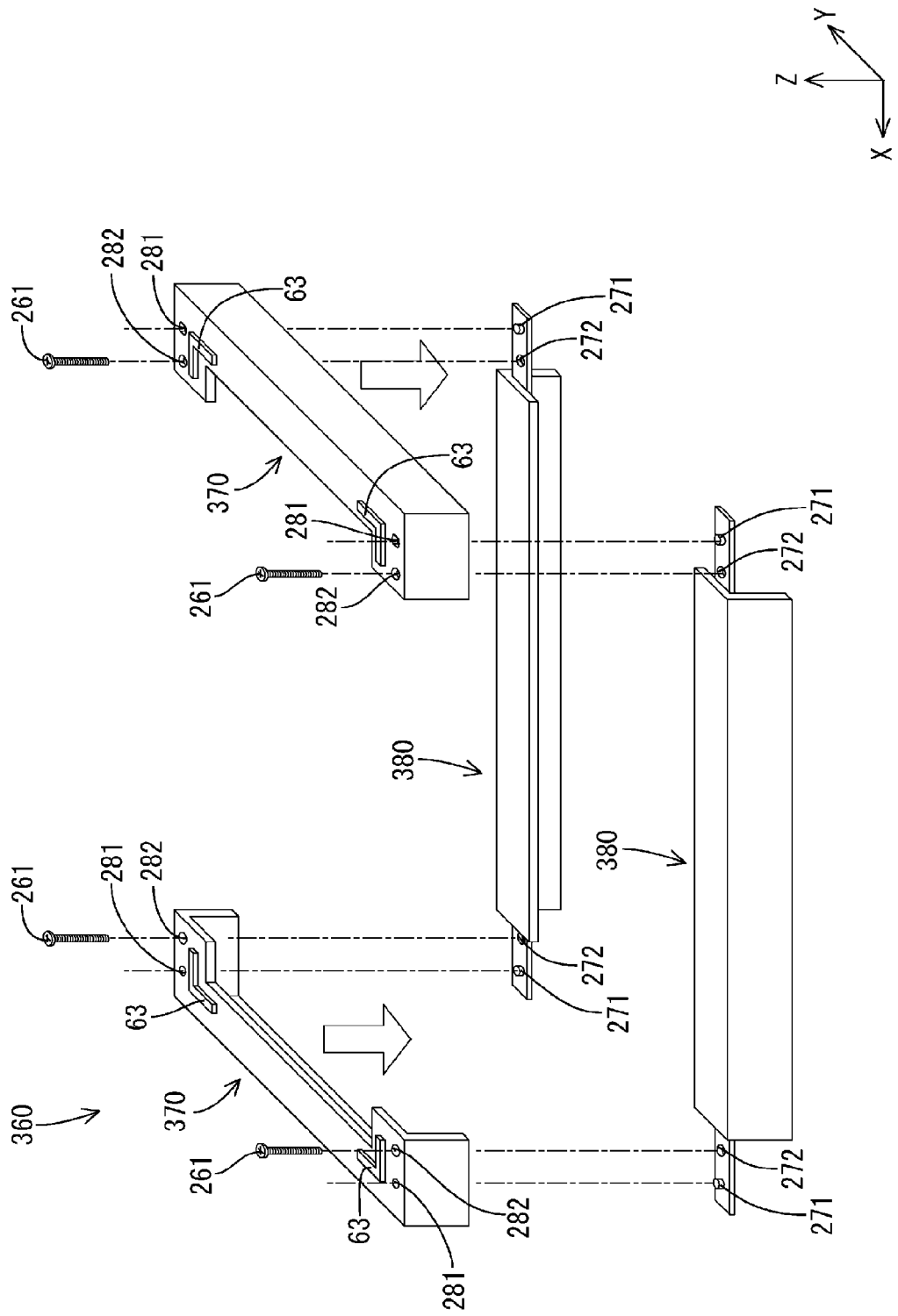
FIG. 40 is an exploded perspective view illustrating the frame according to Embodiment 4.

The frame 360 is modularly configured from a pair of frame short sides 370, and a pair of frame long sides 380 as illustrated in FIG. 39 and FIG. 40. As illustrated in FIG. 40, each of the end portions in the extension direction of the frame long sides 380 includes protrusions 271 formed therein; the protrusions 271 protrude toward the frame short sides 370. Similarly, each of the end portions of the frame short sides 370 include a protrusion through hole 281 formed passing therethrough. The protrusion through hole 281 is for receiving a protrusion 271.

An adjacent frame short side 370 and frame long side 380 are coupled to each other by inserting the protrusion 271 into the protrusion through hole 281, and then inserting a coupling screw 261 into both a screw insertion hole 282 provided in the frame short side 370 and a screw insertion hole 272 provided in the frame long side 380. The screw insertion hole 282, and the screw insertion hole 272 may be configured to receive the coupling screw 35 used in the bezel 330; the bezel 330 and the frame 360 may be configured to fasten together via the coupling screw 35.

In Embodiment 4, exchanging the pair of frame short sides 370 varies the length of the frame 360 in the short side direction and the long side direction respectively.

Figure 41:
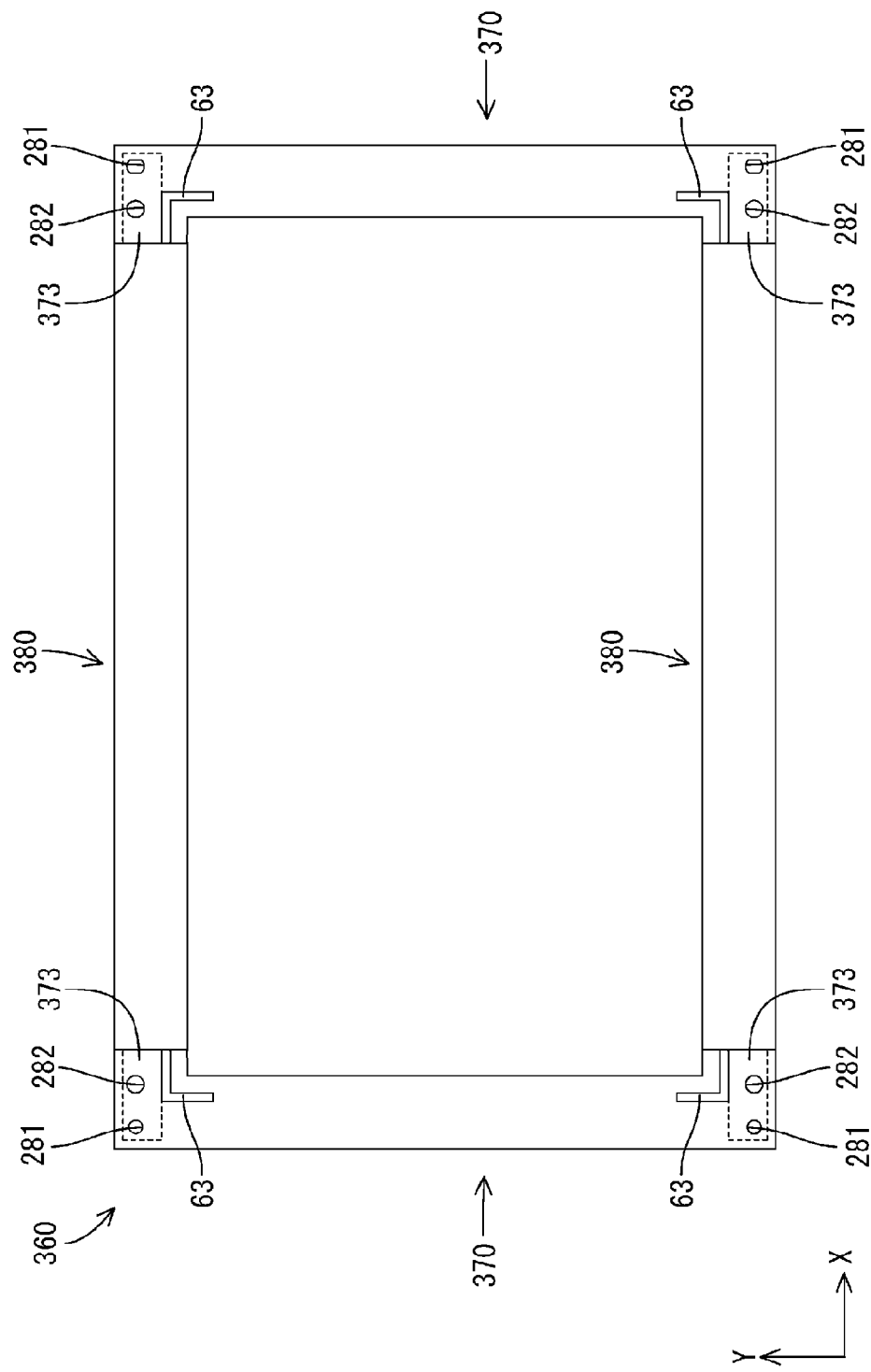
FIG. 41 is a plan view of the frame according to Embodiment 4 when viewed from the front.
Figure 42:
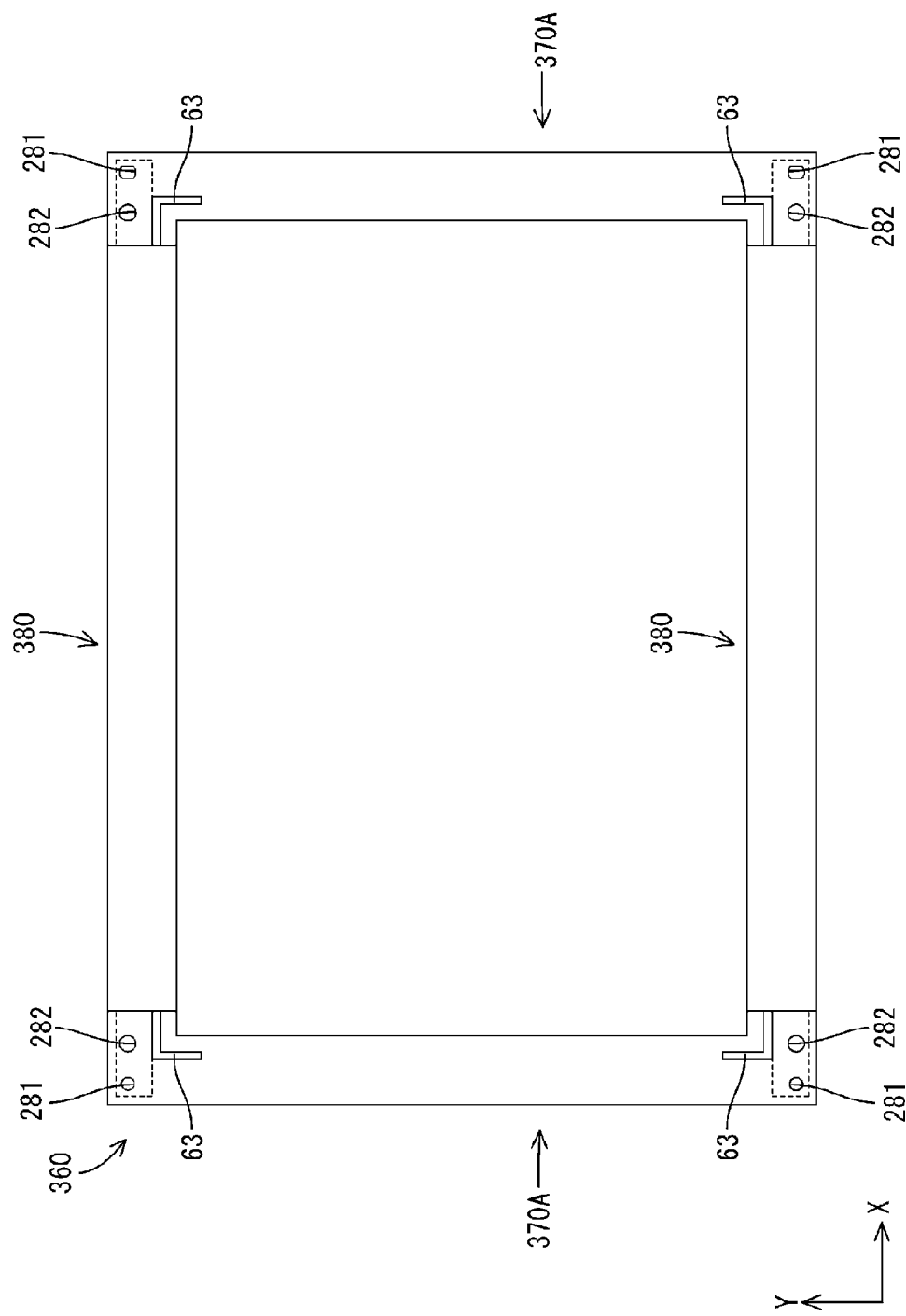
FIG. 42 is a plan view of the frame in FIG. 41 illustrating when the frame is extended on the short sides.

For instance, with the size of the frame 360 illustrated in FIG. 41 as a standard size, the length of the frame 360 in the short side direction (Y-axis direction) can be increased by using the frame short sides 370A illustrated in FIG. 42 instead of the frame short sides 370 illustrated in FIG. 41. The frame short sides 370A are longer in the Y-axis direction than the frame short sides 370.

Figure 43:
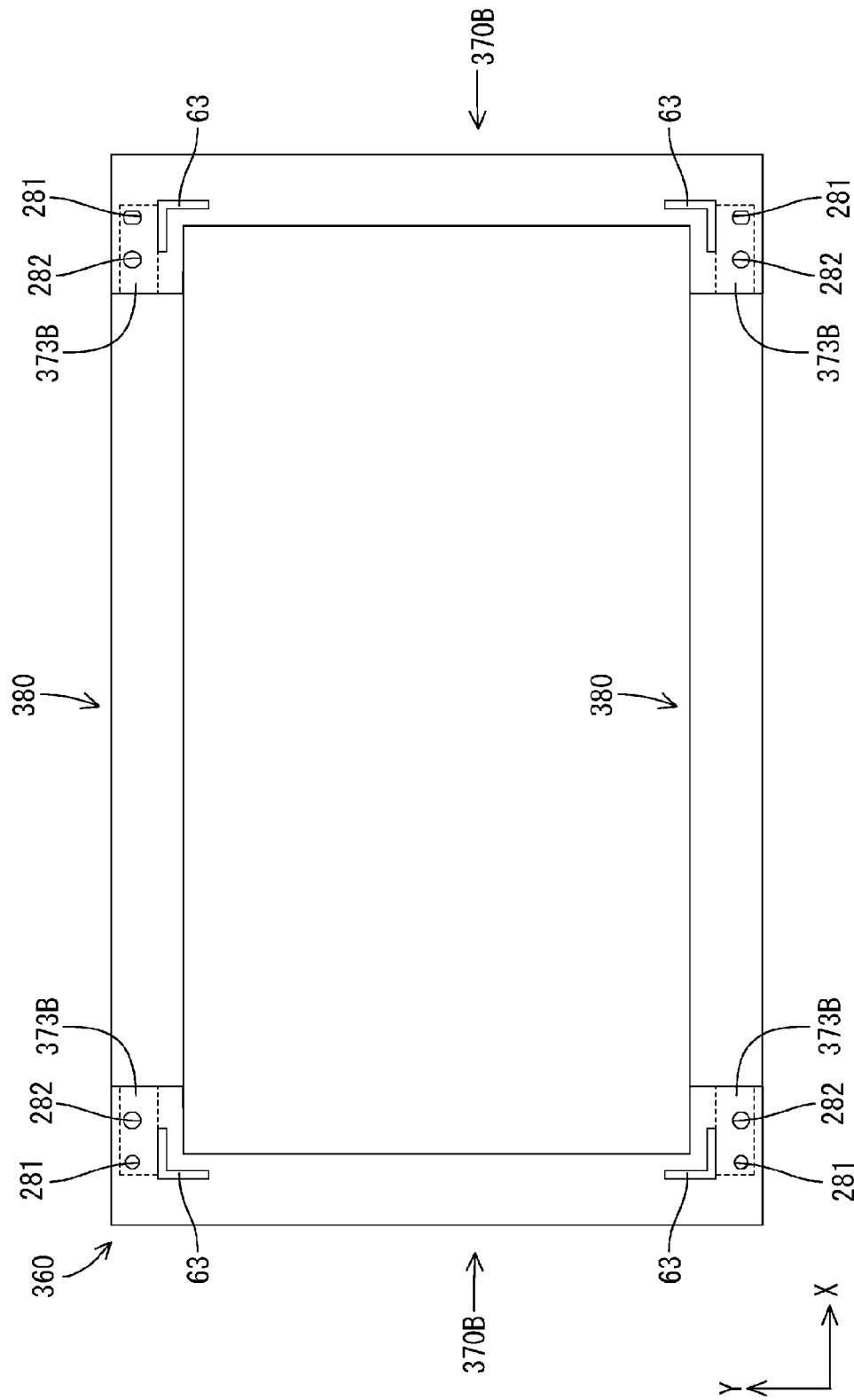
FIG. 43 is a plan view of the frame in FIG. 41 illustrating when the frame is extended on the long sides.

Further, using the frame short side 370B illustrated in FIG. 43 instead of the frame short side 370 increases the length of the frame 360 in the long side direction (X-axis direction).

In plan view, each of the end portions of the frame short sides 370 and the frame short sides 370B in the Y-axis direction are bent with respect to the center portion of the frame short sides to face the frame long sides 380. Each of the end portions 373B, 373B (bent portions) of the frame short side 370B in the X-axis direction are longer in the X-axis direction than each of the end portions 373, 373 of the frame short side 370 in the X-axis direction.

Figure 44:
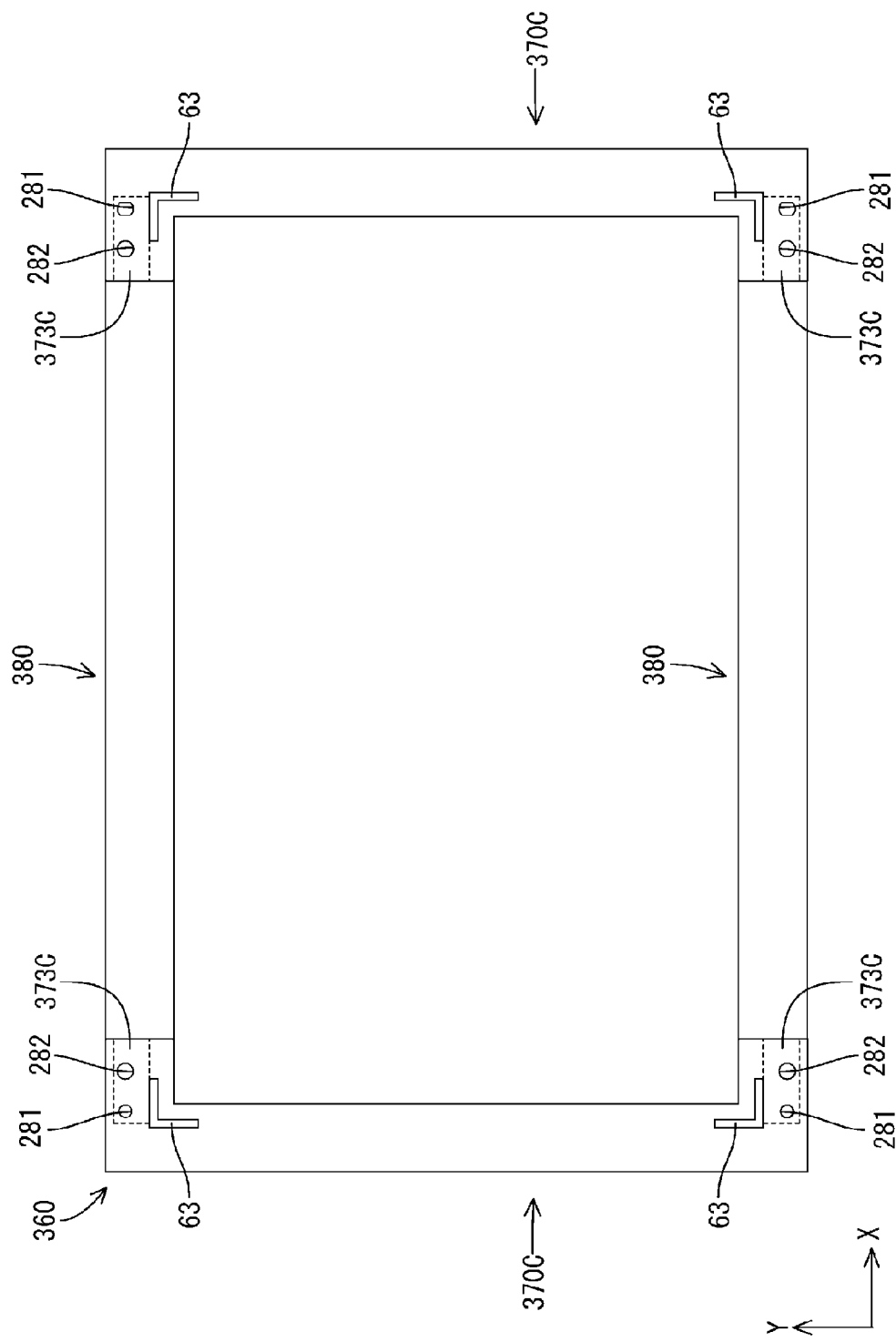
FIG. 44 is a plan view of the frame in FIG. 41 illustrating when the frame is extended on the long and the short sides.

As further illustrated in FIG. 44, using the frame short sides 370C instead of the frame short sides 370 increases the length of the frame 360 in the long side direction (X-axis direction) and in the short side direction (Y-axis direction); the frame short side 370C is longer in the Y-axis direction, and at each of the end portions 373C, 373C thereof in the X-axis direction than the frame short side 370.

In this manner, in Embodiment 4, the frame may correspond to the different sizes of liquid crystal display panel 11 by exchanging the frame short side 370 with other frame short sides 370A, 370B, 370C. Additionally, only the frame short sides 370 are exchanged to change the size of the frame 360. In other words, it is preferable that there is no need to change the frame long sides 380.

OTHER EMBODIMENTS

The present invention is not limited to the embodiments described on the basis of the above explanations and drawings; for instance, the following kinds of embodiments are also within the technical scope of the present invention.

(1) The bezels and the frames in the above described embodiments are respectively configured to be variable in length along the long side directions and short side directions thereof; the configurations of the bezels and frames are not limited thereto. For example, the configuration may be such that only the bezel has a variable length in the long side direction and the short side direction, or the configuration may be such that only the frame has a variable length in the long side direction and the short side direction. Additionally, while the bezel is presented as an example of the first frame member, the frame may also be an example of the first frame member. Furthermore, the bezel and the frame may be configured such that the length thereof is variable in only the first direction (any one of the long side direction and the short side direction).

(2) The liquid crystal panel 11 is not limited to being rectangular, and may be for example a square. Additionally, the bezel and frame are not limited to being rectangular frames so long as the bezel and the frame correspond to the contours of the liquid crystal panel 11.

(3) The above-mentioned Embodiment 1 presents an example where the LED substrate (and the LEDs) is arranged facing one end face on the short side of the light guide plate; however, the LED substrate is not limited to this arrangement location. For example, the LED substrate may be arranged facing each of the pair of end faces on the short sides of the light guide plate. Configurations where the LED substrates is arranged facing one end face on the long side of the light guide plate, or where the LED substrate is arranged facing one end face on the short side of the light guide plate are also included in the scope of the present invention. Still, configurations where the LED substrate is arranged facing any of the three end faces of the light guide plate, or where the LED substrate is arranged facing all four end faces of the light guide plate are also included in the scope of the present invention.

(4) The above-mentioned embodiments present an example where the first short-side end 43 and second short-side end 46 of the bezel 30 are coupled by a fixing screw 36; however, the means of coupling the first short-side end 43 and the second short-side end 46 is not limited to a fixing screw. For instance, a nut and bolt may be used instead of the fixing screw. Additionally, the means of coupling the first long-side end 53 and the second long-side end 56, and the means of coupling the two adjacent frame components are not limited to using a fixing screw, and may be modified as appropriate.

(5) The above-mentioned embodiments illustrate using LEDs as a light source; however, other light sources such as a cold cathode tube, or an organic EL may be used as the light source.

(6) The above-mentioned embodiments present an example of equipping the light guide plate with an edge-lit backlight device; however, the configuration of the backlight device may be modified as appropriate. For instance, the backlight device may be configured to supply light directly from the rear surface thereof to the liquid crystal panel 11 without being equipped with a light guide plate (a so-called direct-lit backlight device).

(7) Each of the above-mentioned embodiments use a TFT as the switching element in the liquid crystal display device; however a non-TFT switching element (such as a thin-film diode: TFD) may also be adopted in the liquid crystal display device. Further, the present invention may also be adopted in a black and white liquid crystal display device and not only to a color display liquid crystal display device.

(8) Each of the above-mentioned embodiments present an example of a liquid crystal display device that uses a liquid crystal panel as the display panel; however, the present invention may be adopted in a display device using other kinds of display panels.

(9) Each of the above-mentioned embodiments present an example of a television receiver equipped with a tuner; however the present invention may be adopted in a display device not equipped with a tuner. More specifically, the present invention may also be adopted in an electronic billboard (digital signage), or a liquid crystal display device used as an electronic blackboard.

| Description of Reference Characters | |
|---|---|
| 10 | liquid crystal display device (display device) |
| 11 | liquid crystal panel (display panel) |
| 17 | LED (light source) |
| 30, 130, 230 | bezel (first frame member) |
| 36 | fixing screw |
| 40, 240, 340, 340A, 340B, 340C | bezel short side (extension portions) |
| 43 | first short-side end (first extending end portion) |
| 43B | first screw insertion hole |
| 46 | second short-side end (second extending end portion) |
| 46A | second screw insertion hole |
| 50, 250, 250A, 250B, 250C, 350 | bezel long side (second extension portions) |
| 60, 160, 260, 360 | frame (second frame member) |
| TV | television receiver |

What is claimed is:

1. A display device, comprising:
a light source;
a display panel having a rectangular shape and using light from the light source for display;
a first frame member having a rectangular frame-shape along peripheral edges of the display panel and configured such that a length thereof is variable in a first direction; and
a second frame member having a rectangular frame-shape along the peripheral edges of the display panel, the second frame member and the first frame member clamping the peripheral edges of the display panel therebetween,
wherein the first frame member comprises a pair of extension portions extending in the first direction and respectively forming sides of the first frame member, the extension portions being configured to extend and retract in the first direction, and
wherein each of the extension portions comprises:
a first extending end portion extending in the first direction; and
a second extending end portion extending in the first direction and being attached to the first extending end portion so as to be slidable relative to the first extending end portion in the first direction,
wherein the second extending end portion has a recess extending in the first direction that is covered by the first extending end portion when the second extending end portion is fully retracted and that is exposed from the first extending end portion when the second extending end portion is partially drawn out from the first extending end portion,
wherein the second extending end portion is being partially drawn out from the first extending end portion by a prescribed distance, exposing a portion of the recess in the second extending end portion and creating a gap in a surface profile of the extension portion, and
wherein each of the extension portions further includes a cover that fits into the exposed portion of the recess of the second extending end portion and that covers the gap along the first direction, a length of the cover in the first direction being equal to the prescribed distance by which the second extending end portion is partially drawn out from the first extending end portion so as to cover an entire length of a portion of the second extending end portion that has been drawn out from the first extending end portion.

2. The display device according to claim 1, further comprising:
a fixing screw for securing the second extending end portion to the first extending end portion;
wherein the first extending end portion includes a first screw insertion hole formed therethrough and extending along the first direction, said first screw insertion hole being configured to receive the fixing screw, and
wherein the second extending end portion includes a second screw insertion hole formed therethrough to which the fixing screw is configured to engage.

3. The display device according to claim 1, wherein a section of the first extending end portion near the second extending end portion is provided with a folded-back portion configured to fold inward such that one end of the second extending end portion fits inside the folded-back portion.

4. The display device according to claim 1, wherein the first frame member comprises:
said pair of extension portions; and
a pair of second extension portions extending in a second direction and respectively forming second sides of the first frame member, said pair of extension portions and said pair of second extension portion being detachable from each other,
wherein the adjacent extension portions and second extension portions are coupled at corners of the first frame member.

5. The display device according to claim 1, wherein the first frame member is configured such that the length thereof is variable in a second direction.

6. The display device according to claim 1, wherein the second frame member is configured such that a length thereof is variable in the first direction.

7. The display device according to claim 6, wherein the second frame member is configured such that the length thereof is variable in a second direction.

8. The display device according to claim 1,
wherein the first frame member is a bezel disposed on a display surface side of the display panel, and
wherein the second frame member is a frame disposed on a light source side of the display panel.

9. The display device according to claim 1, wherein the display panel is a liquid crystal panel that uses liquid crystal.

10. A television receiver, comprising: the display device according to claim 1.

* * * * *